US011951705B2

(12) United States Patent
Hartung

(10) Patent No.: US 11,951,705 B2
(45) Date of Patent: Apr. 9, 2024

(54) COMPACTOR ARRANGEMENT AND METHOD FOR OPERATING A COMPACTOR ARRANGEMENT

(71) Applicant: Wincor Nixdorf International, GmbH, Paderborn (DE)

(72) Inventor: Domenic Hartung, Molsdorf (DE)

(73) Assignee: Wincor Nixdorf International GmbH, Paderborn (DE)

( * ) Notice: Subject to any disclaimer, the term of this patent is extended or adjusted under 35 U.S.C. 154(b) by 933 days.

(21) Appl. No.: 16/758,754

(22) PCT Filed: Oct. 22, 2018

(86) PCT No.: PCT/EP2018/078894
§ 371 (c)(1),
(2) Date: Mar. 22, 2021

(87) PCT Pub. No.: WO2019/081431
PCT Pub. Date: May 2, 2019

(65) Prior Publication Data
US 2021/0206133 A1    Jul. 8, 2021

(30) Foreign Application Priority Data

Oct. 23, 2017  (EP) .................................... 17197697

(51) Int. Cl.
*B30B 15/30* (2006.01)
*B07C 5/12* (2006.01)
(Continued)

(52) U.S. Cl.
CPC .............. *B30B 15/30* (2013.01); *B07C 5/122* (2013.01); *B07C 5/36* (2013.01); *B30B 9/321* (2013.01);
(Continued)

(58) Field of Classification Search
CPC . B30B 15/30; B30B 9/321; B65G 2210/0244; B65G 15/14; G07F 7/0609; B07C 5/36; B07C 5/122
See application file for complete search history.

(56) References Cited

U.S. PATENT DOCUMENTS

2016/0288996 A1  10/2016  Arsovic
2017/0140600 A1   5/2017  Halsey, Jr.

FOREIGN PATENT DOCUMENTS

DE         19707464 A1    11/1997
DE    102014110284 A1 *   1/2016  ............. B07C 5/122
(Continued)

*Primary Examiner* — Jimmy T Nguyen
(74) *Attorney, Agent, or Firm* — Black McCuskey

(57) ABSTRACT

A compactor arrangement (202) includes a compactor; an empty-container transport device for transporting empty containers in the compactor arrangement in a transport region above the empty-container transport device; a first anti-encroachment guard structure which laterally delimits the transport region and which is provided between the transport region and the compactor, wherein the first anti-encroachment guard structure defines a feed region through which empty containers can be fed laterally out of the transport region to the compactor; and a guard device having a second anti-encroachment guard structure which is configured such that, selectively, an encroachment from the direction of the transport region into the feed region can be prevented.

20 Claims, 31 Drawing Sheets

(51) Int. Cl.
*B07C 5/36* (2006.01)
*B30B 9/32* (2006.01)
*B65G 15/14* (2006.01)

(52) U.S. Cl.
CPC ...... *B65G 15/14* (2013.01); *B65G 2201/0244* (2013.01)

(56) References Cited

FOREIGN PATENT DOCUMENTS

| | | | | |
|---|---|---|---|---|
| EP | 2249320 | A1 | 11/2010 | |
| EP | 2521104 | A1 | 11/2012 | |
| EP | 2704109 | A1 * | 3/2014 | ............. B07C 5/122 |
| EP | 3166089 | A1 | 5/2017 | |
| EP | 3208214 | A1 | 8/2017 | |
| EP | 3355284 | A1 * | 8/2018 | ............. B07C 5/122 |
| WO | 2005003003 | A1 | 1/2005 | |
| WO | 2014106687 | A1 | 7/2014 | |
| WO | 2017060288 | A1 | 4/2017 | |

* cited by examiner

FIG. 4C
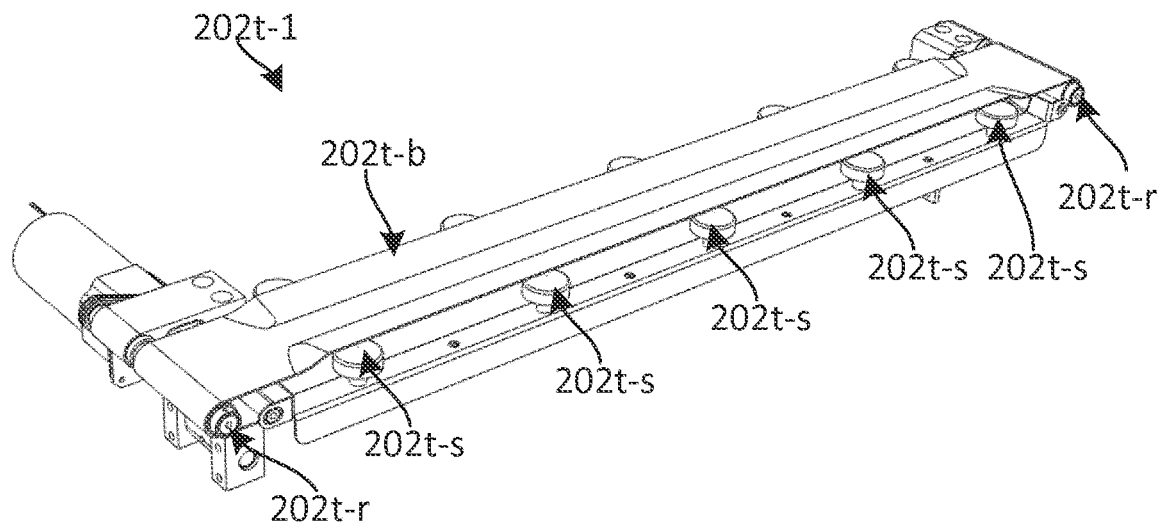
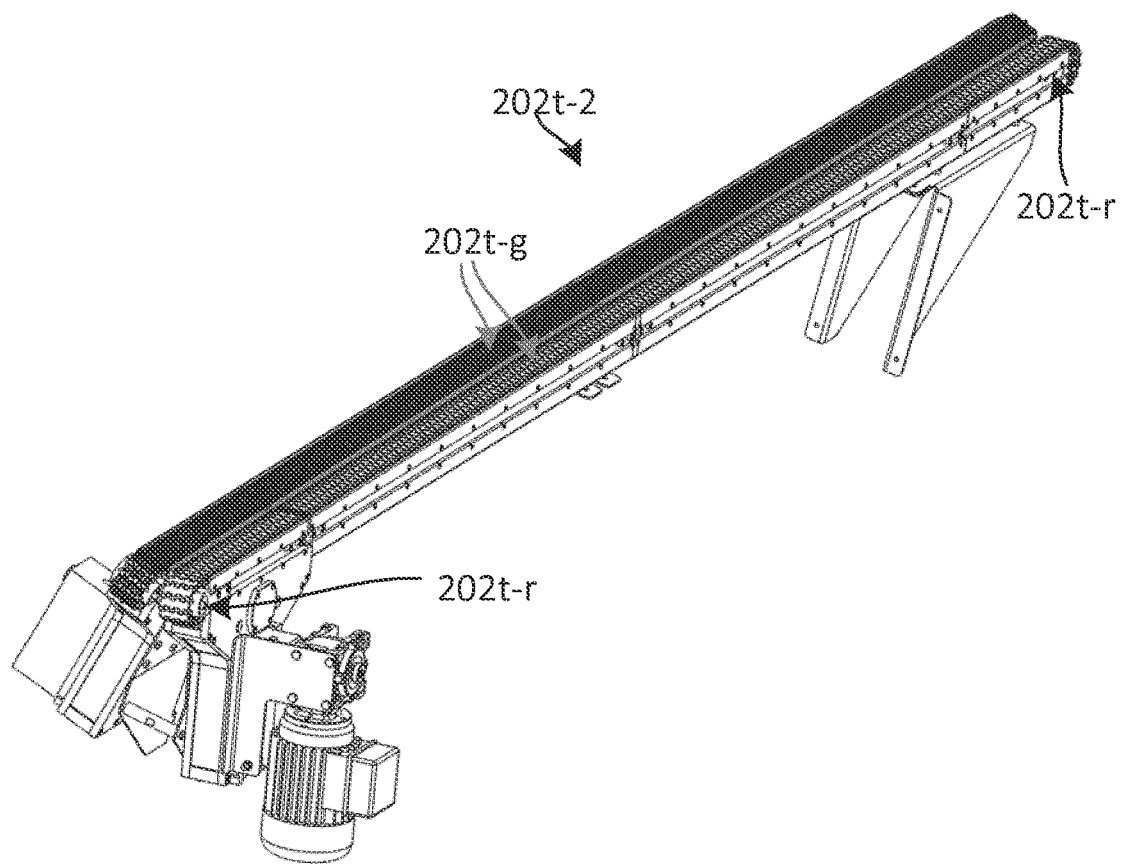

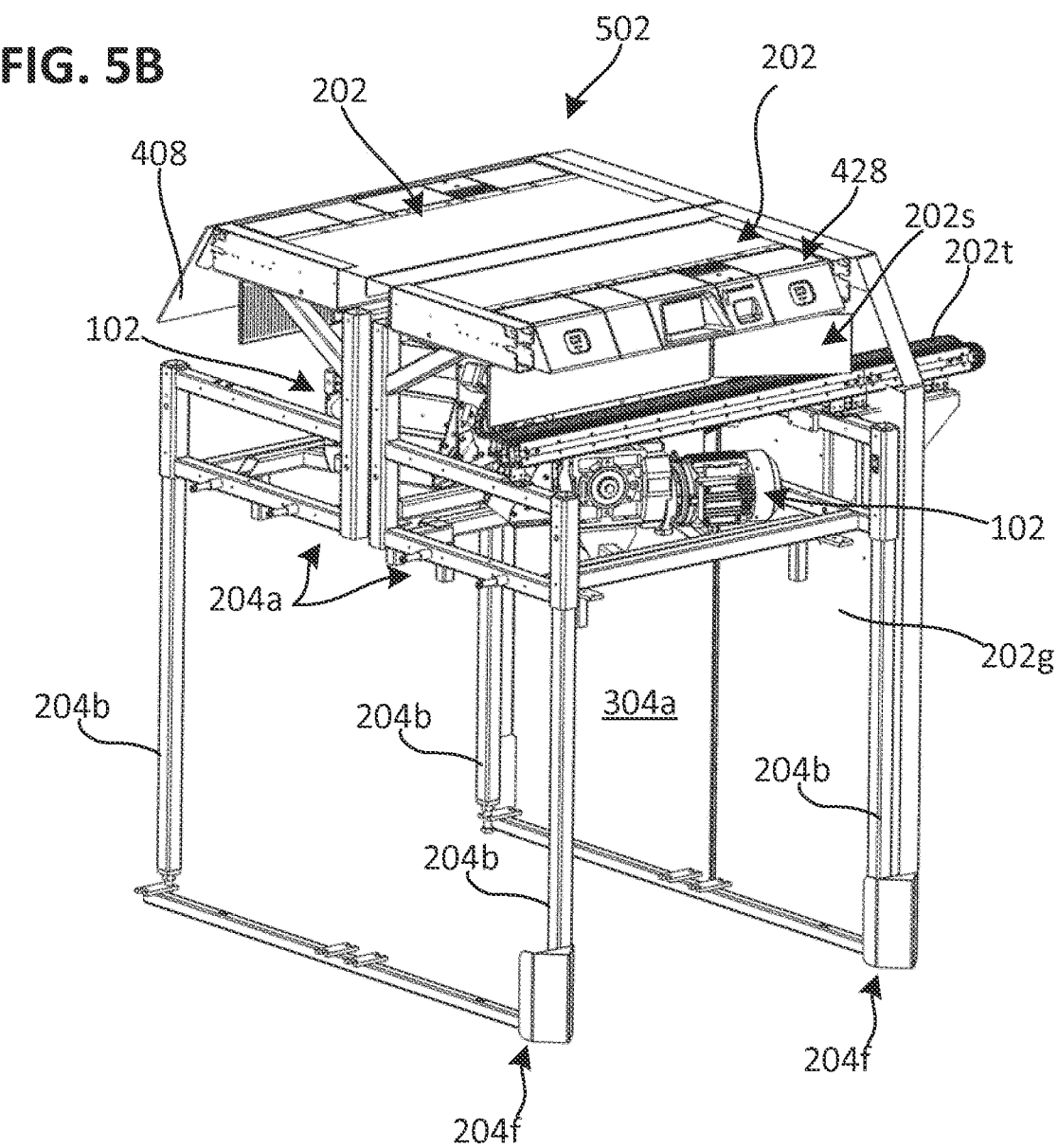

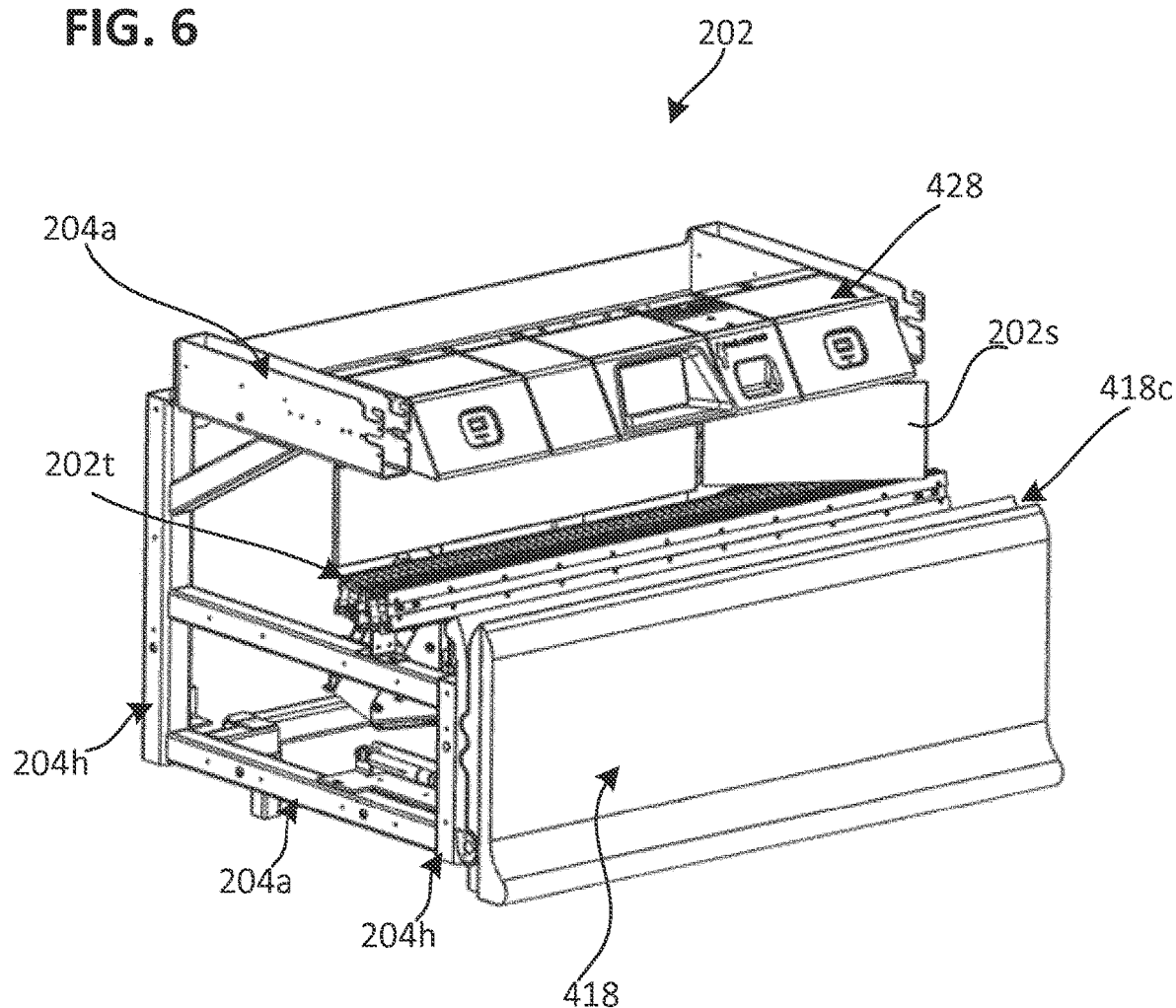

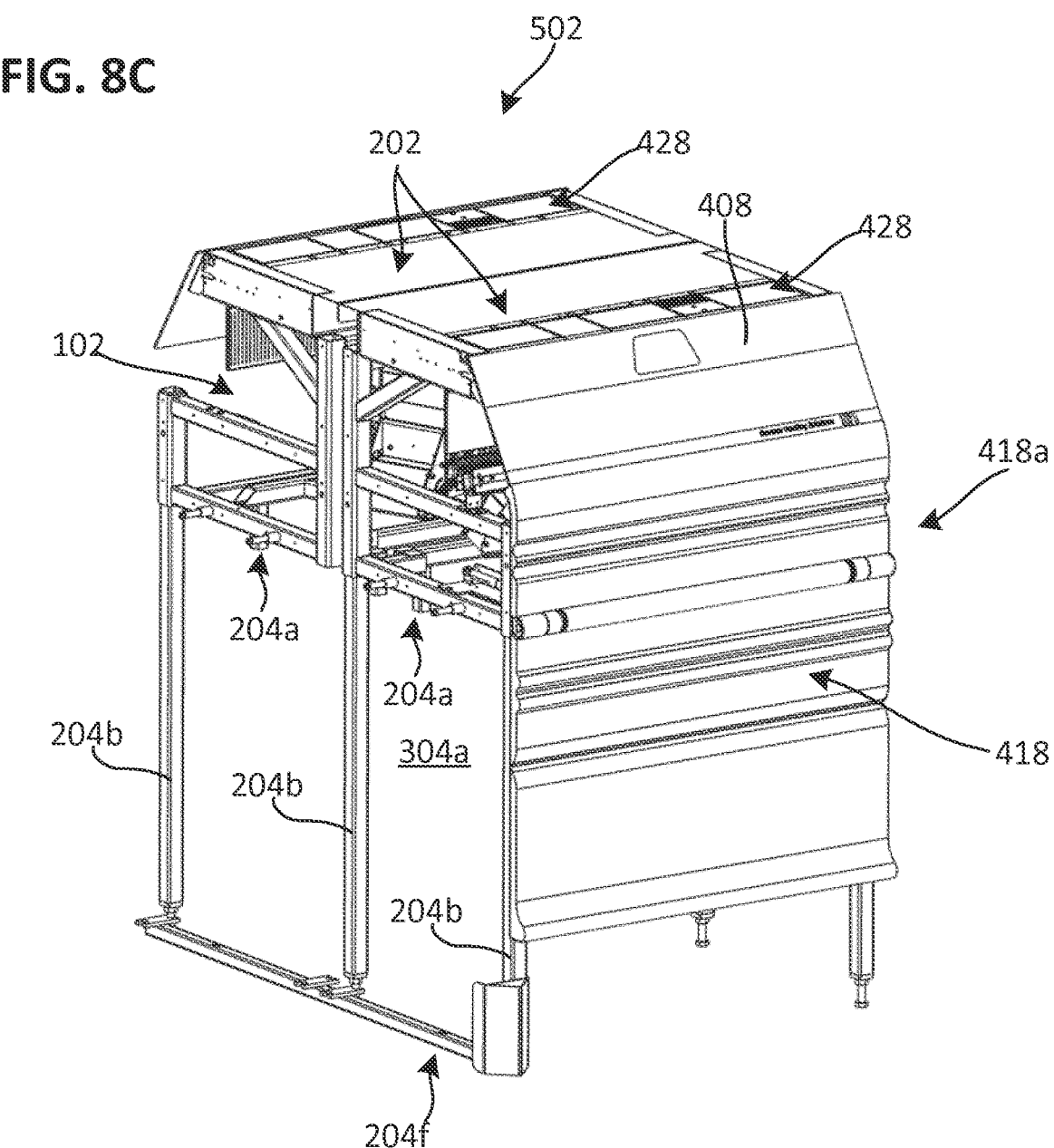

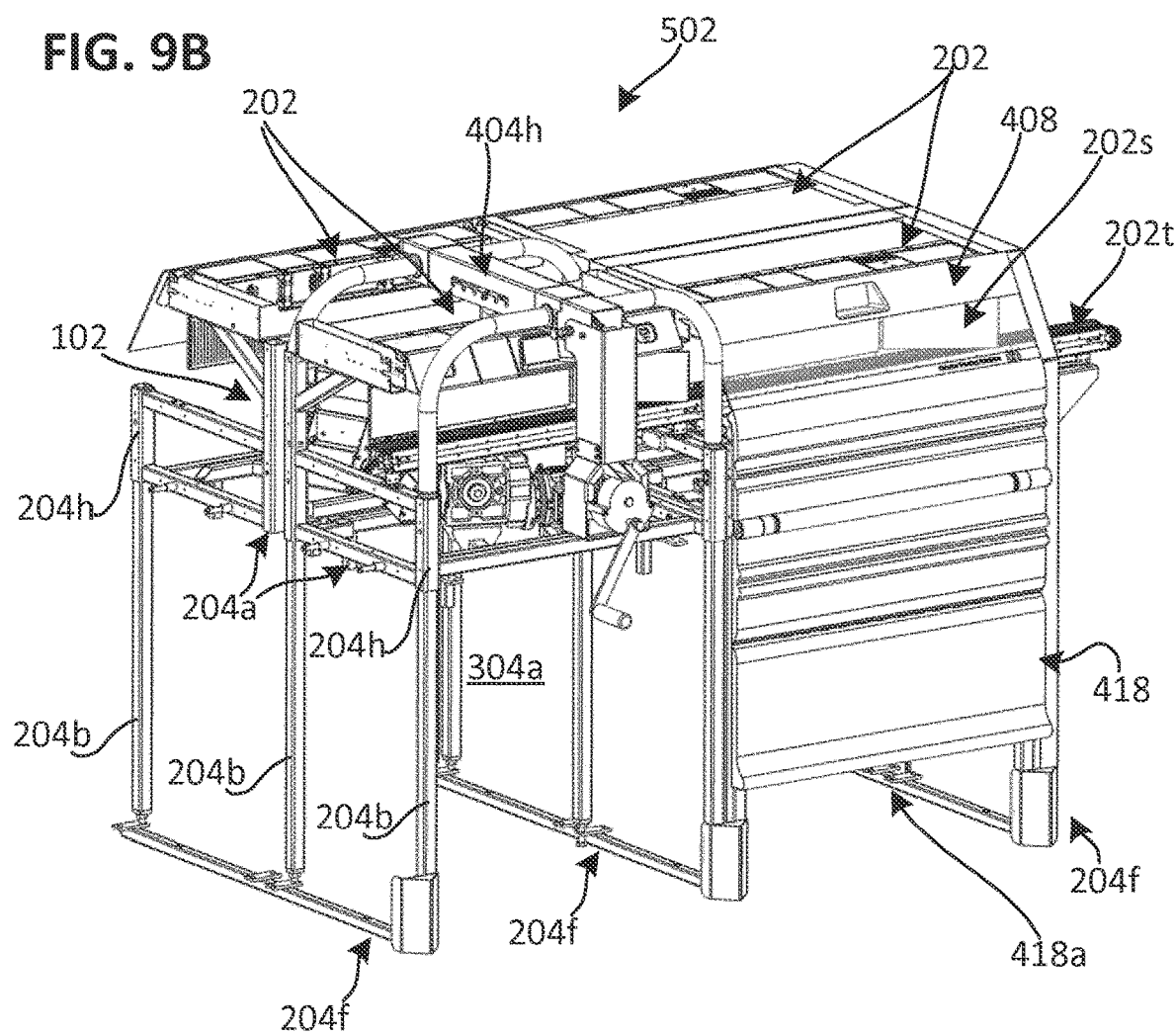

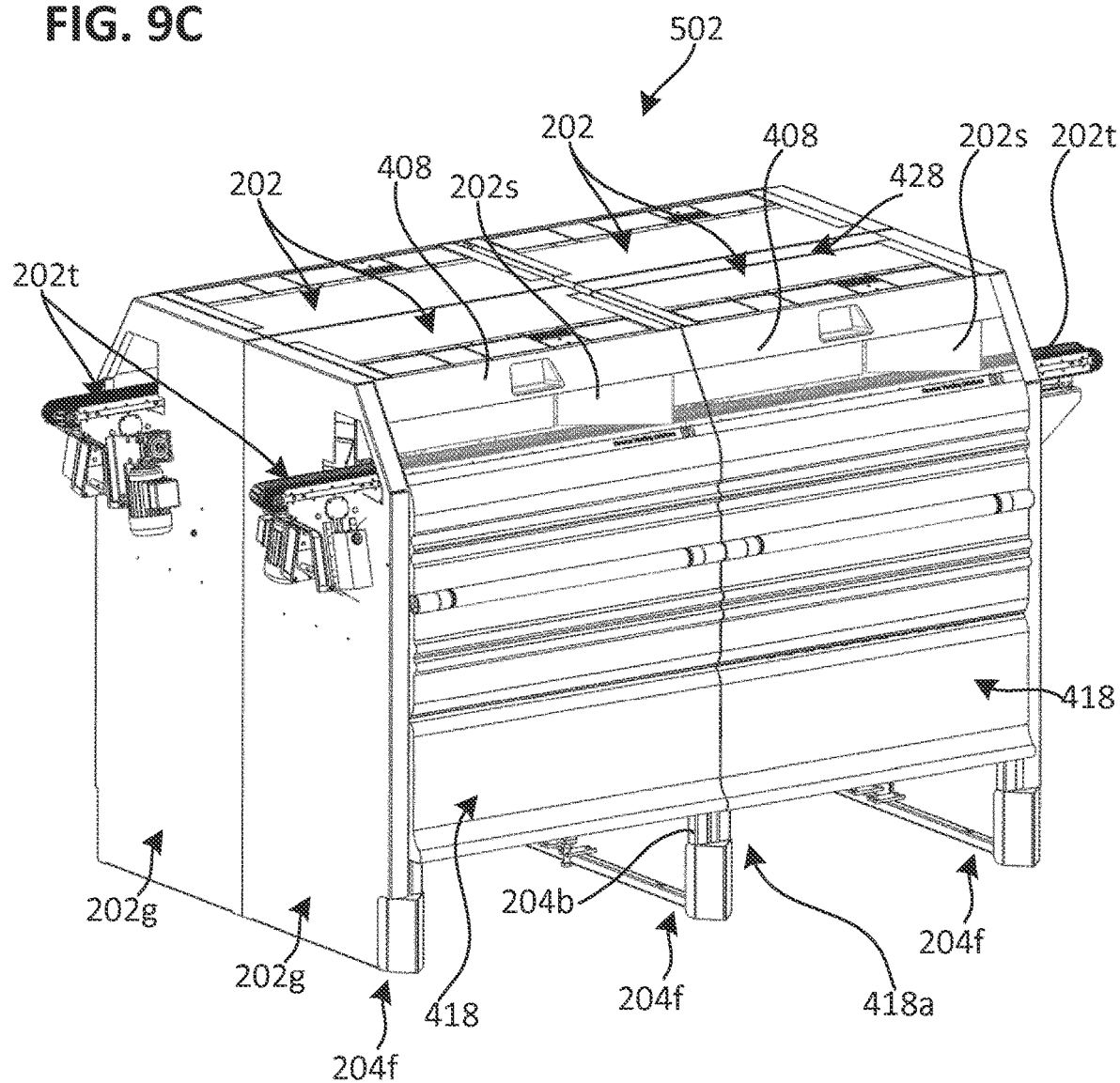

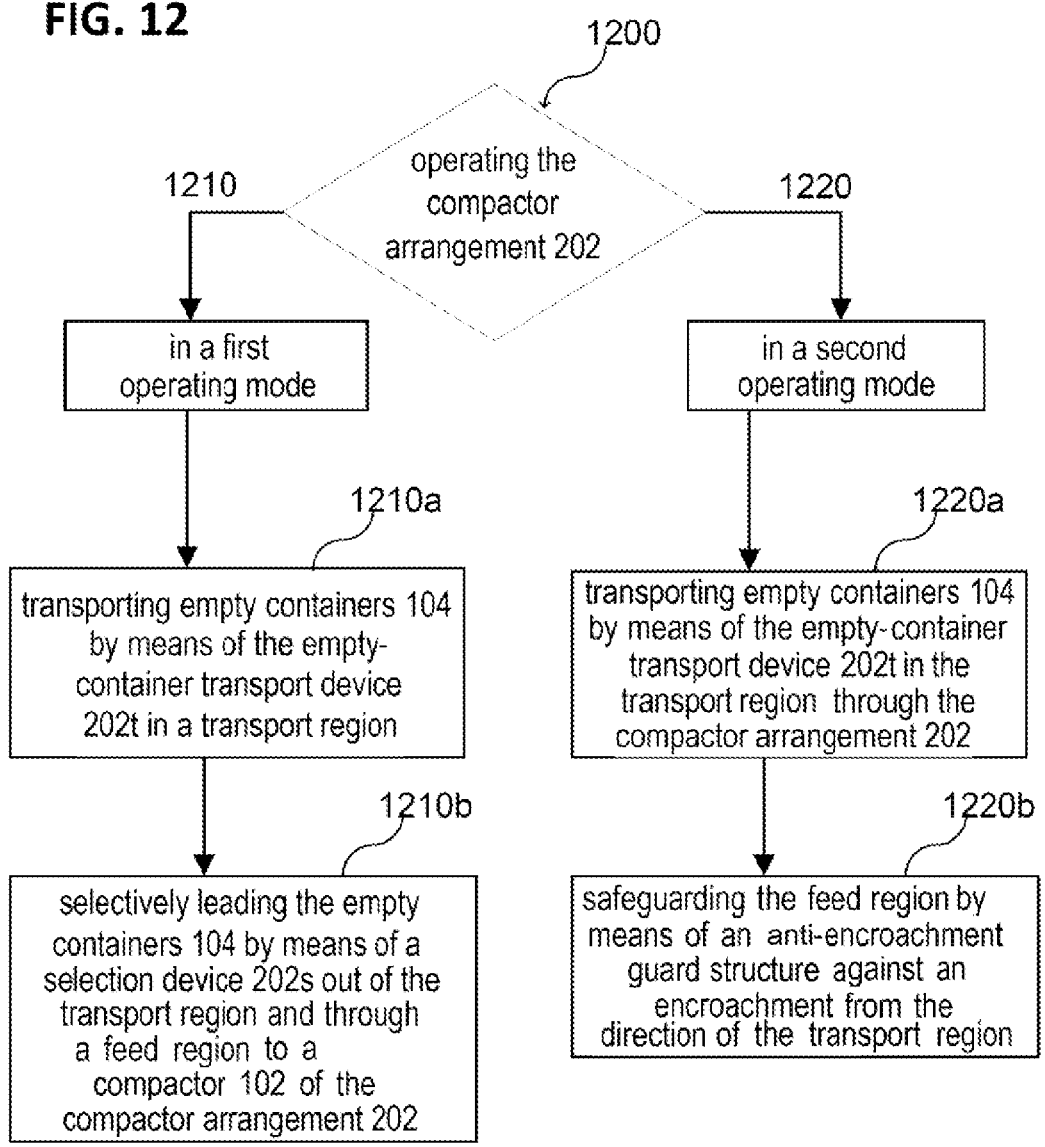

COMPACTOR ARRANGEMENT AND METHOD FOR OPERATING A COMPACTOR ARRANGEMENT

BACKGROUND OF THE INVENTION

Various exemplary embodiments relate to a compactor arrangement, a compactor means, a function module arrangement, and a method for operating a compactor arrangement.

In general, different concepts are used for compacting objects, wherein the objects are broken up, pressed, and/or deformed in some other way in order to reduce the space requirement thereof. Owing to the introduced deposit system for single-use and reusable vessels (e.g. bottles, cans, glasses, etc.), automated return systems are increasingly being used to make the return of large quantities of vessels logistically easy. Such return systems can be used to sort the vessels for example according to type, material, etc. Furthermore, various options may be provided for the return of individual vessels or packagings (e.g. a box, etc.). In general, it may be necessary or helpful to comminute at least some of the returned vessels in order to enable them to be transported away efficiently. Here, it is for example possible for not only single-use plastics vessels but also single-use glass vessels etc. to be compacted. Reusable vessels and reusable packagings are generally collected separately and transported away without being compacted. In the food industry, the empty vessels are also referred to as empty containers, and the return system is also referred to as an empty-container return installation or empty-container return machine.

SUMMARY OF THE INVENTION

Various embodiments relate to a compactor arrangement, for example in use in an empty-container return installation or an empty-container return machine. According to various embodiments, the compactor arrangement may have a modular arrangement of multiple function modules which define the operation of the compactor arrangement.

According to various embodiments, a compactor arrangement may have the following: a compactor; an empty-container transport device for transporting empty containers in the compactor arrangement in a transport region above the empty-container transport device; a first anti-encroachment guard structure which laterally delimits the transport region and which is provided between the transport region and the compactor, wherein the first anti-encroachment guard structure defines a feed region through which empty containers can be fed laterally out of the transport region to the compactor; and a guard device having a second anti-encroachment guard structure which is configured such that, selectively, an encroachment from the direction of the transport region into the feed region can be prevented.

According to various embodiments, a compactor arrangement may have a function module arrangement, wherein the function module arrangement has: a module receptacle for receiving multiple function modules, the multiple function modules, which are designed to match the module receptacle in such a way that the multiple function modules can each be selectively received in the module receptacle, wherein the selection device is provided as a selection module of the multiple function modules, and wherein the second anti-encroachment guard structure is provided as a guard module of the multiple function modules.

According to various embodiments, a function module arrangement may have the following: a module receptacle, multiple function modules of different function module type, which are configured such that they can be selectively received in the module receptacle, and at least one processor which is configured to ascertain the function module type of at least one function module received in the module receptacle, and to operate the function module arrangement selectively in one operating mode of multiple operating modes on the basis on the ascertained function module type.

According to various embodiments, a compactor device may have one or more compactor arrangements. In this case, for example, one of the compactor arrangements can be in a first operating mode, for example a normal operating mode, and the second compactor arrangement can be in a second operating mode, for example in an emergency operating mode. Here, it is for example possible for empty containers to be led through the second compactor arrangement into the first compactor arrangement and compacted in the first compactor arrangement.

According to various embodiments, a method for operating a compactor arrangement may comprise the following: operating the compactor arrangement in a first operating mode, comprising: transporting empty containers by means of the empty-container transport device in a transport region, and selectively leading the empty container by means of a selection device out of the transport region and through a feed region to a compactor of the compactor arrangement; and, previously and/or subsequently, operating the compactor arrangement in a second operating mode, comprising: transporting empty containers by means of the empty-container transport device in the transport region through the compactor arrangement, and safeguarding the feed region against an encroachment from the direction of the transport region by means of an anti-encroachment guard structure.

Exemplary embodiments are illustrated in the figures and will be described in more detail below.

BREIF DESCRIPTION OF THE DRAWING

Figure 5A:
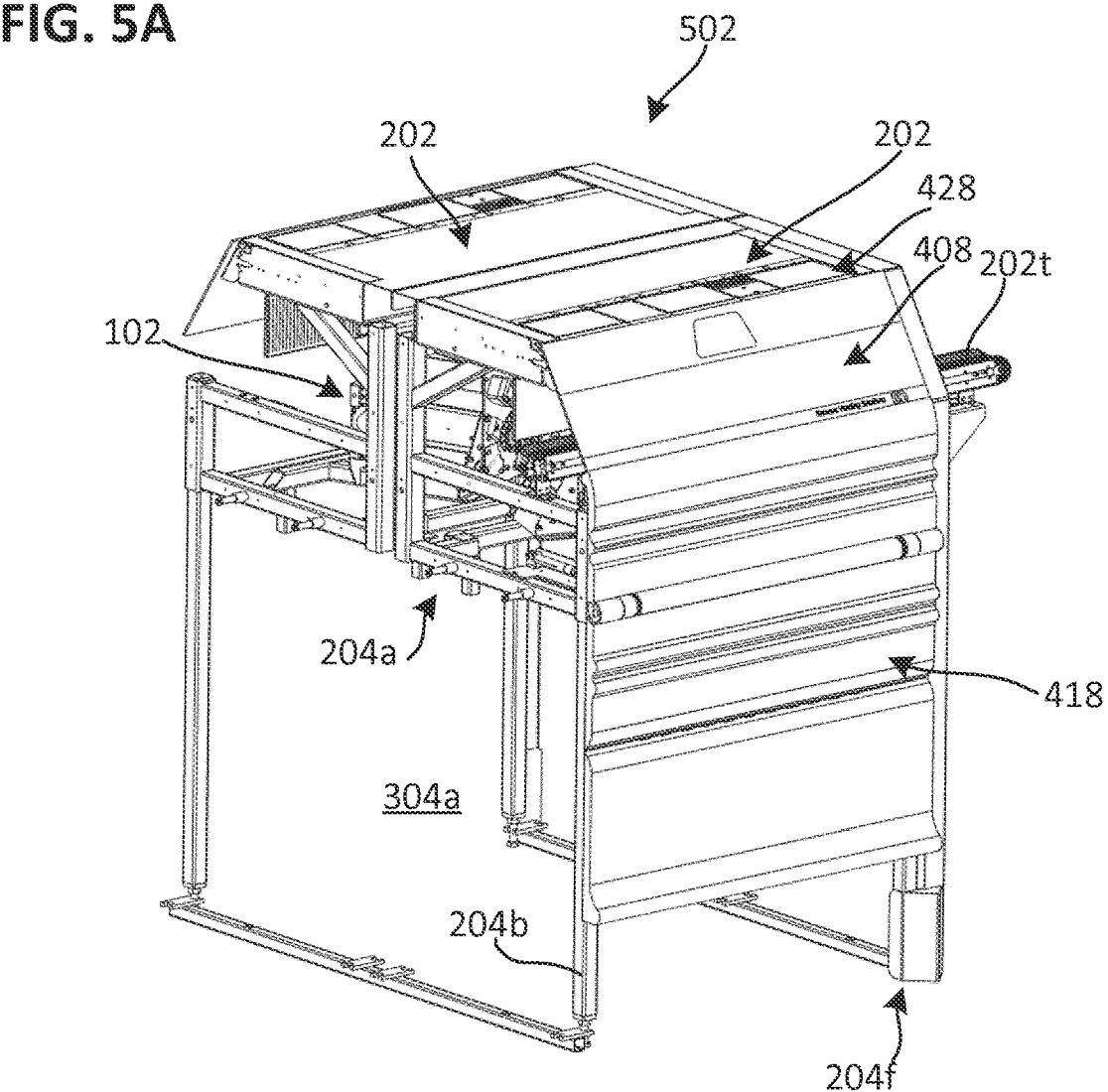
Figure 5C:
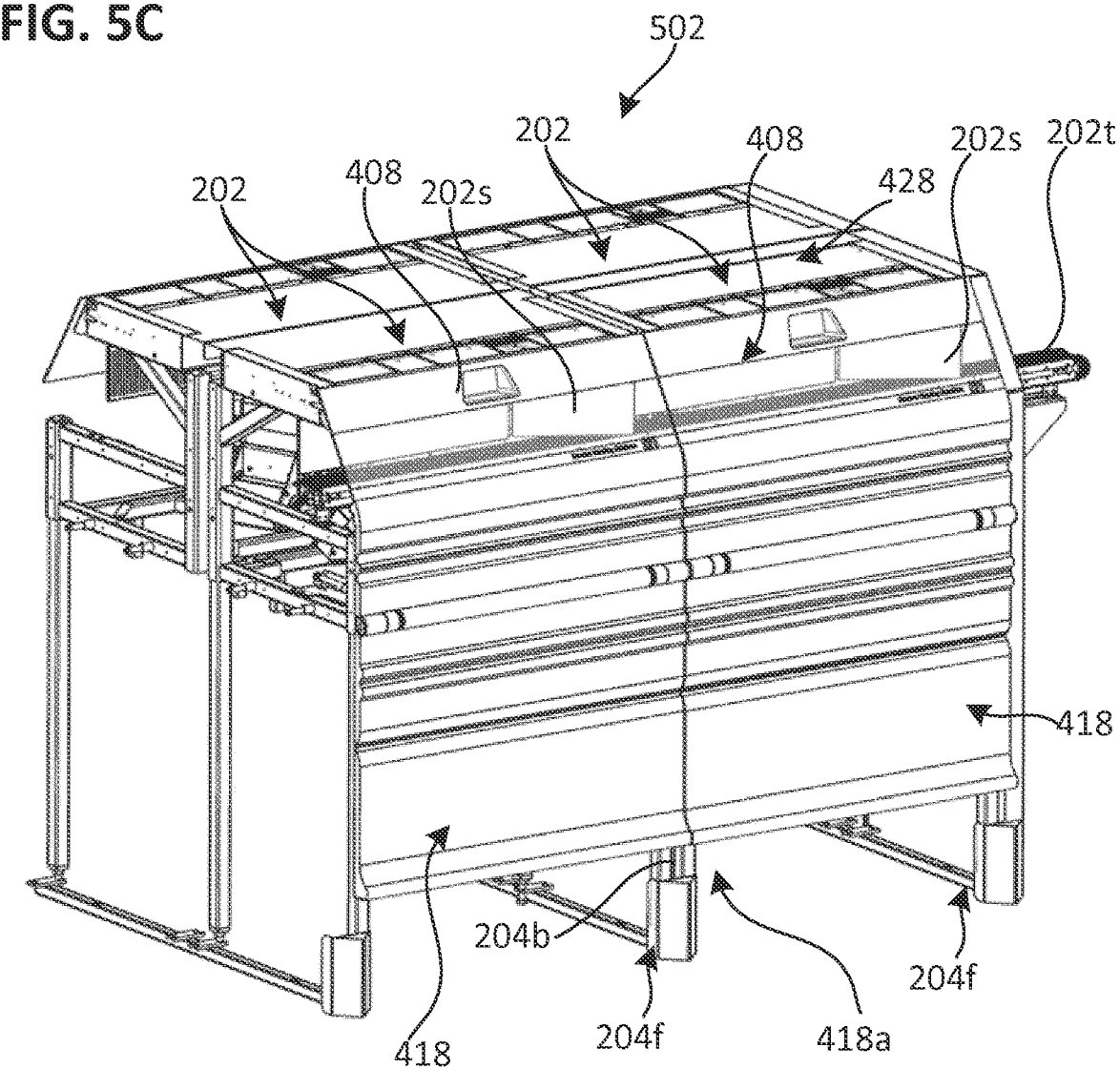
Figure 7A:
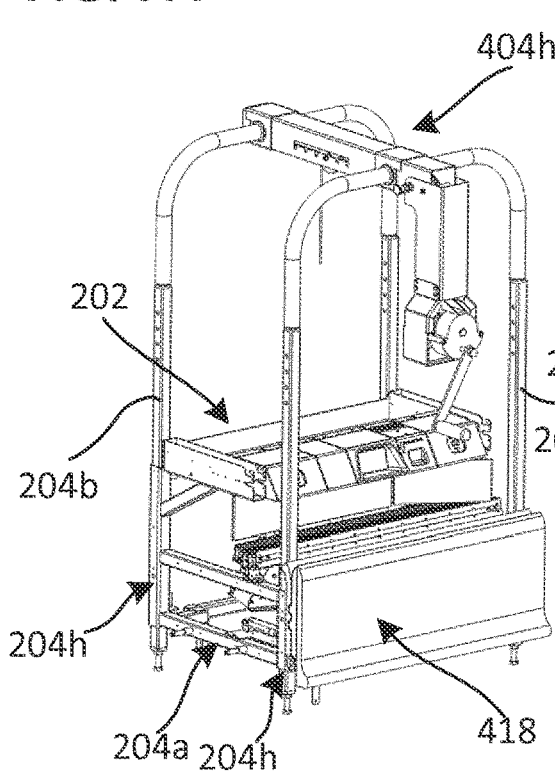
Figure 7B:
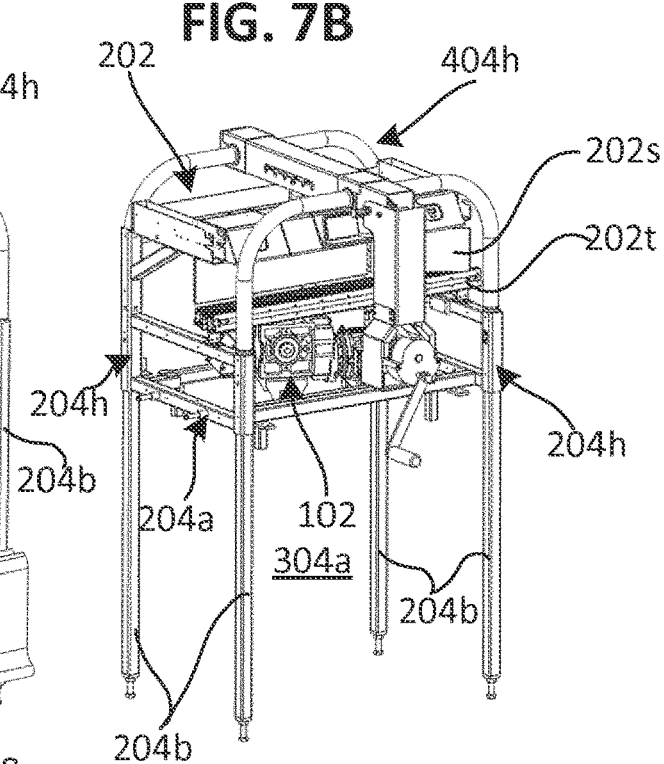
Figure 7C:
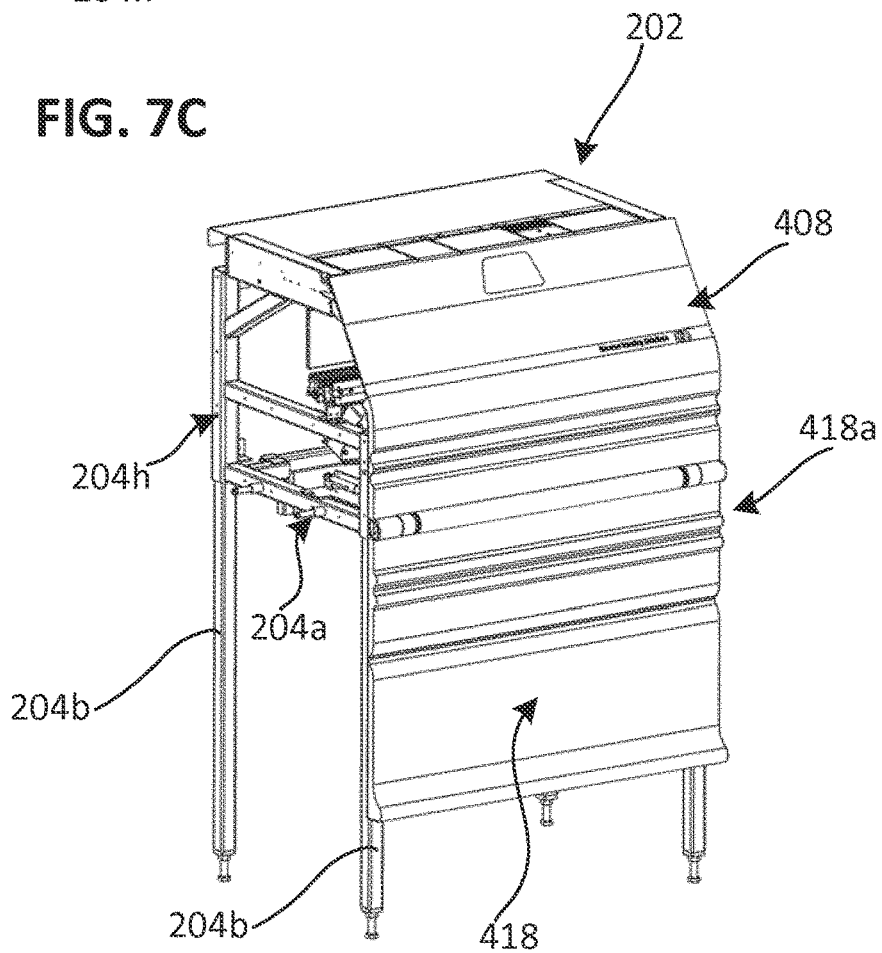
Figure 8A:
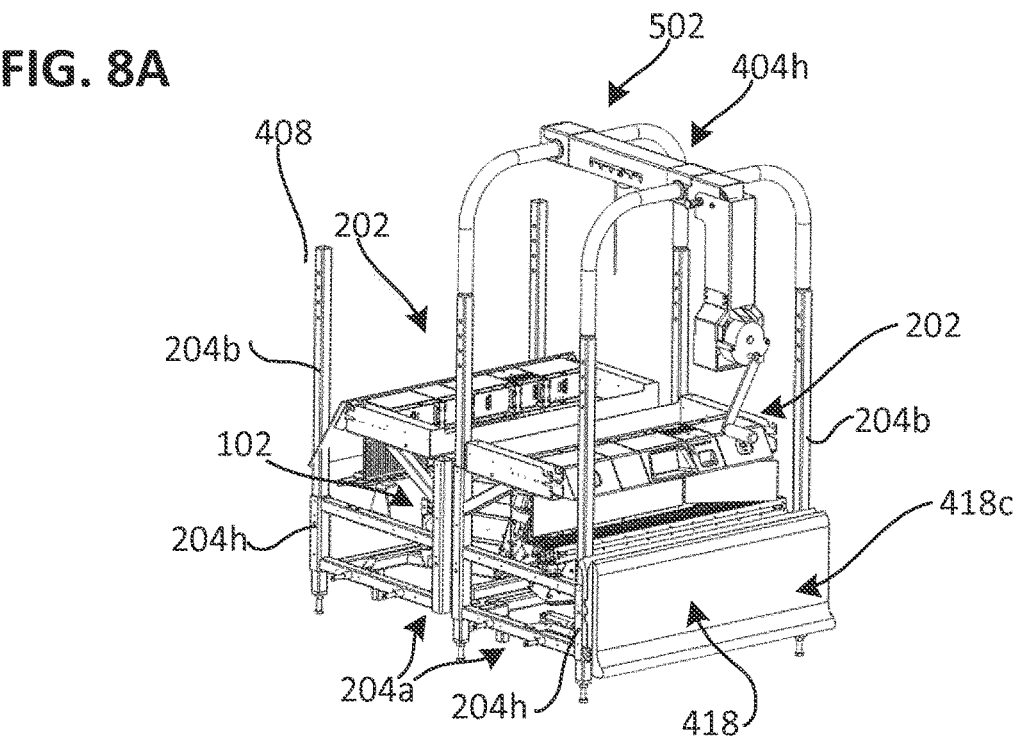
Figure 8B:
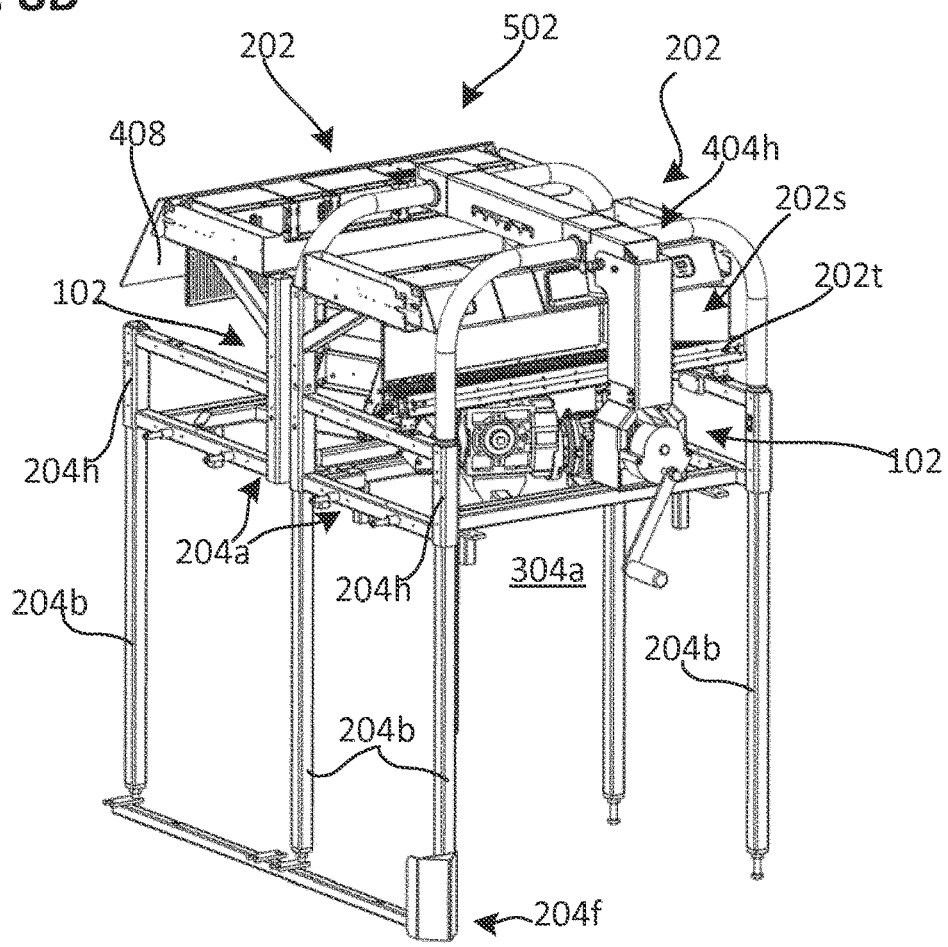
Figure 9A:
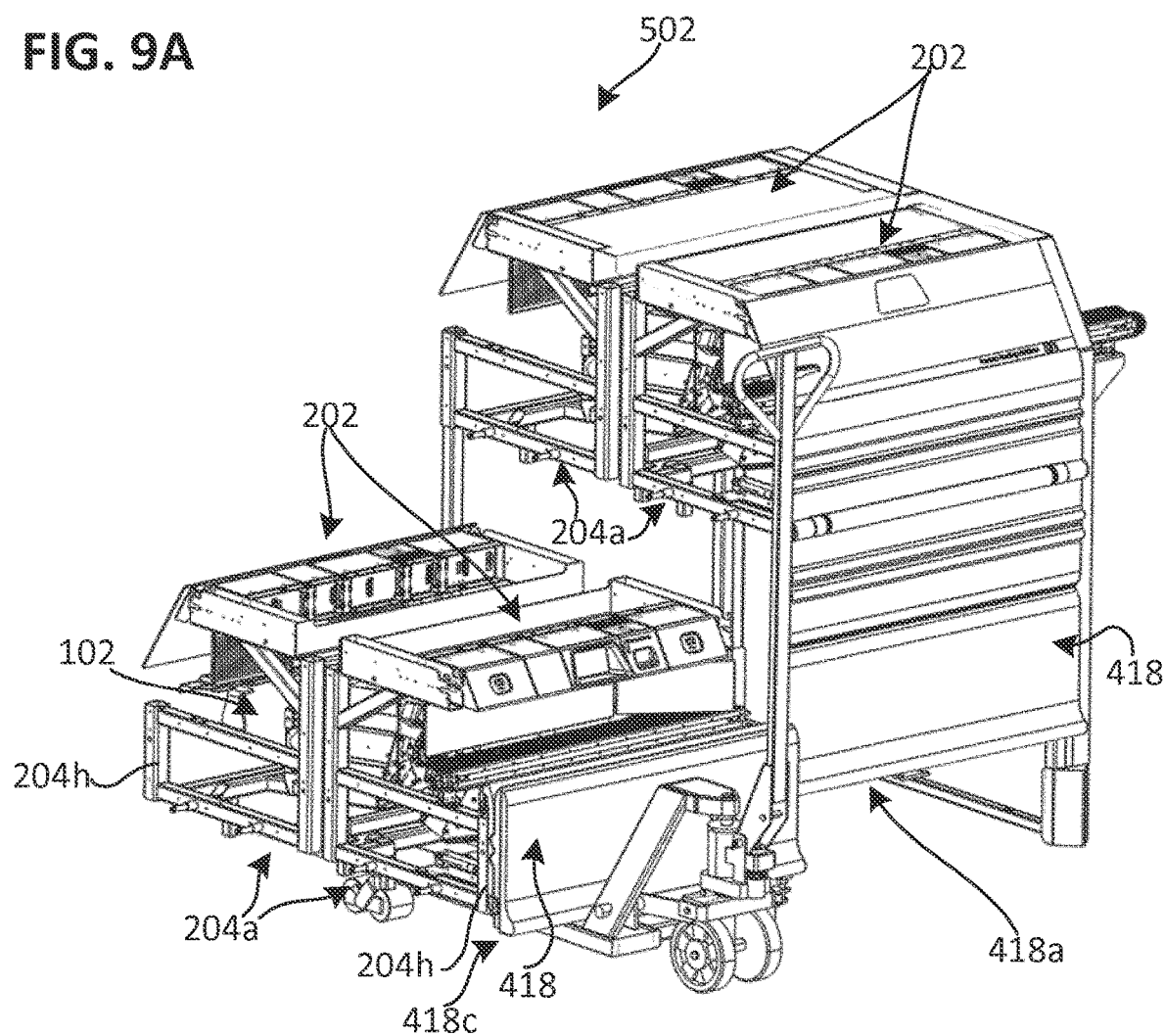
Figure 14:
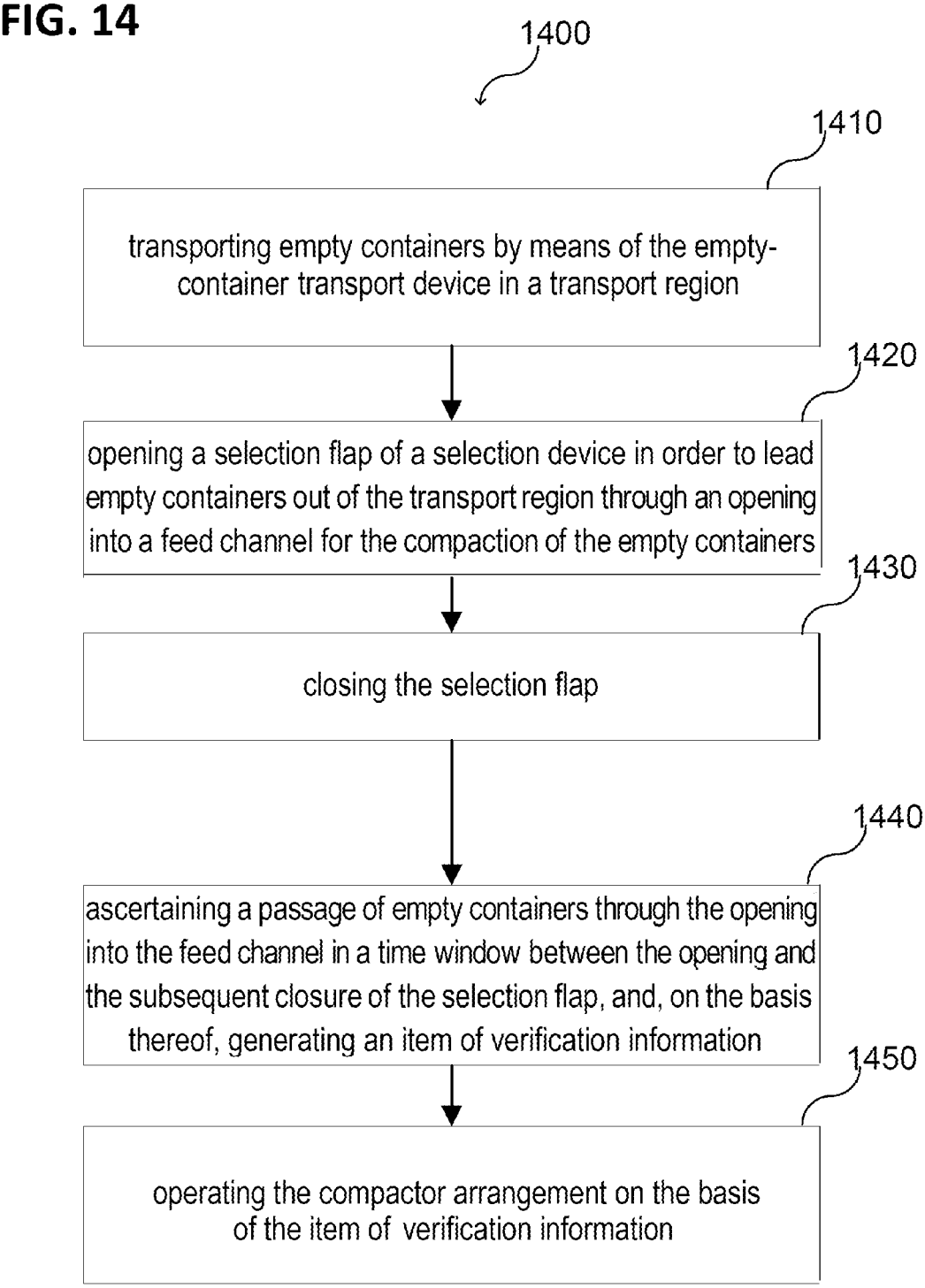
Figure 15A:
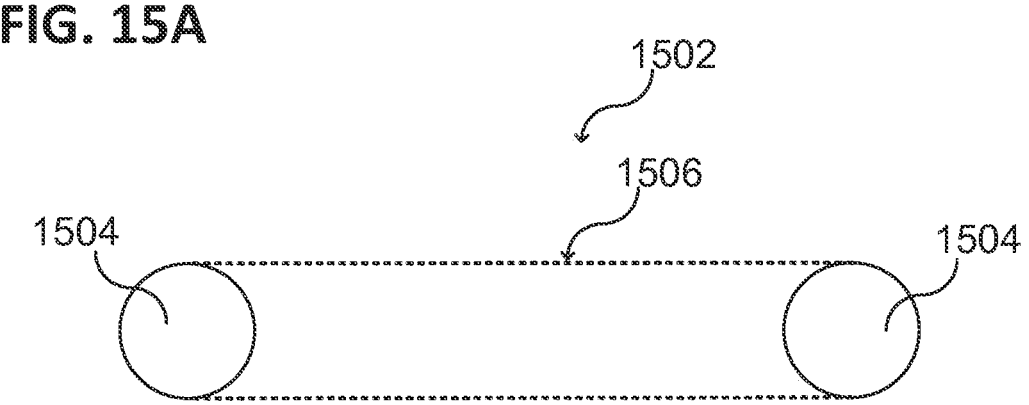
Figure 15B:
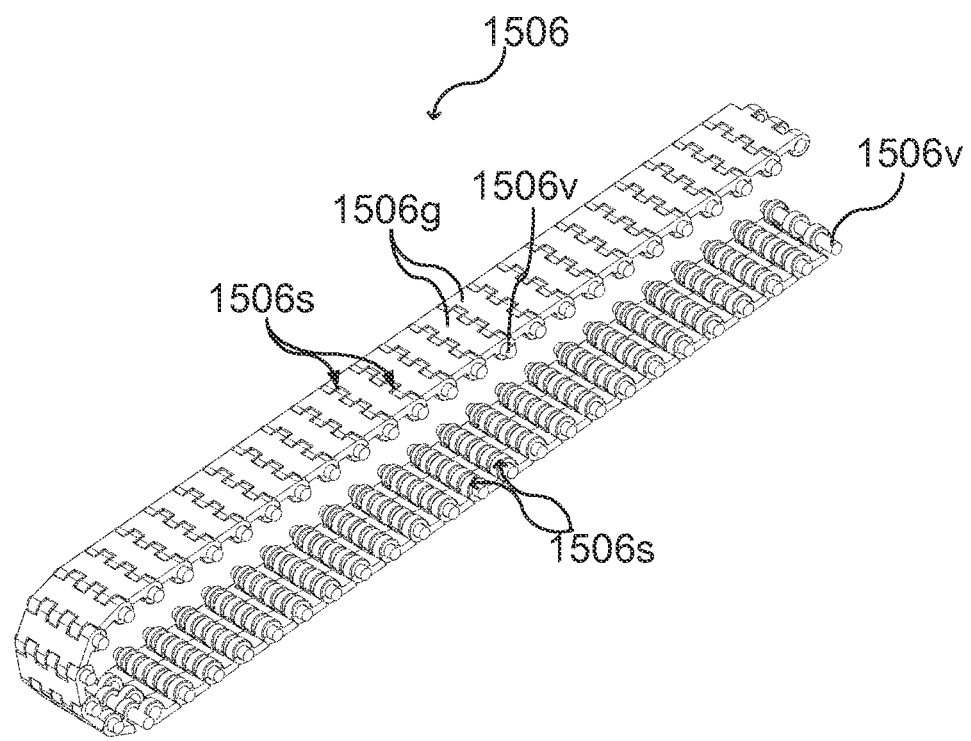
Figure 15C:
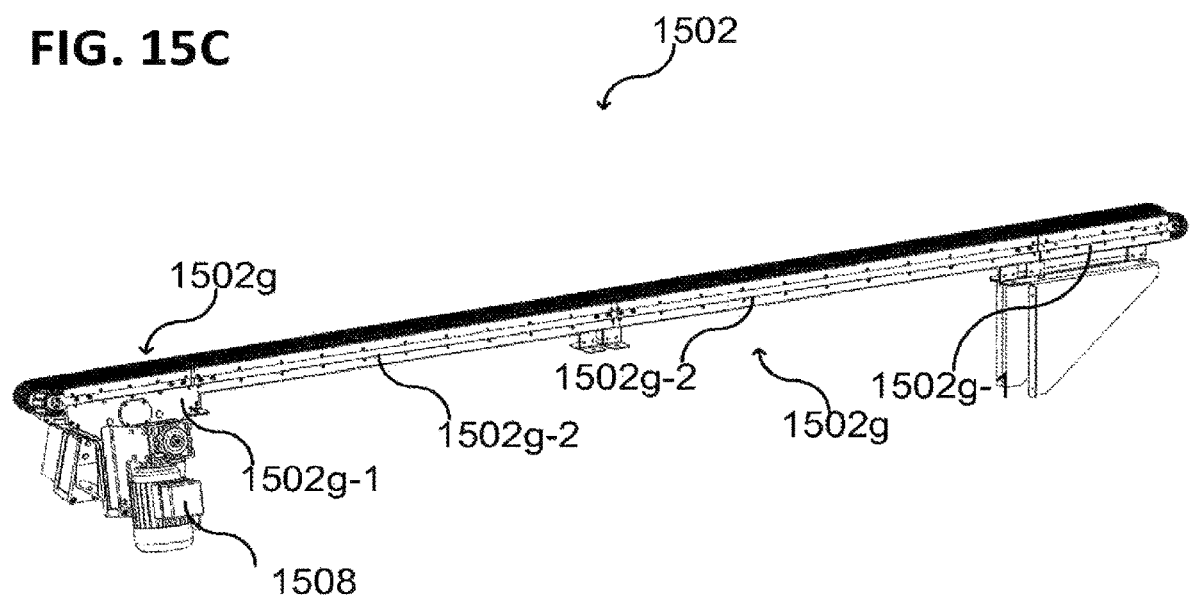
Figure 15D:
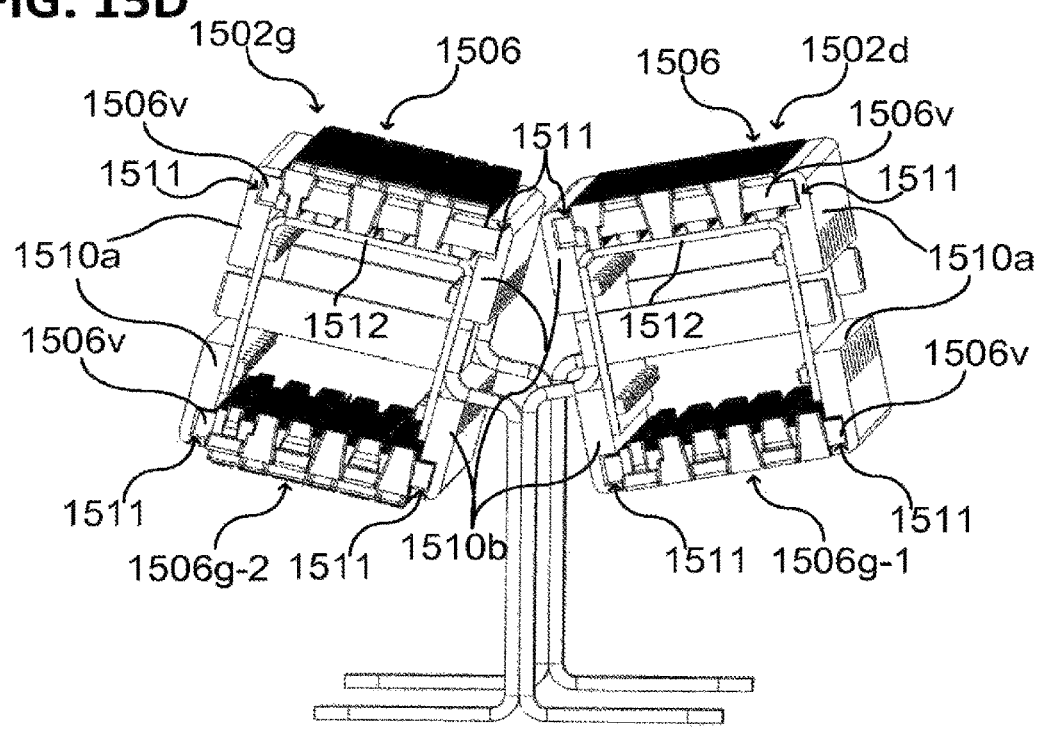
Figure 15E:
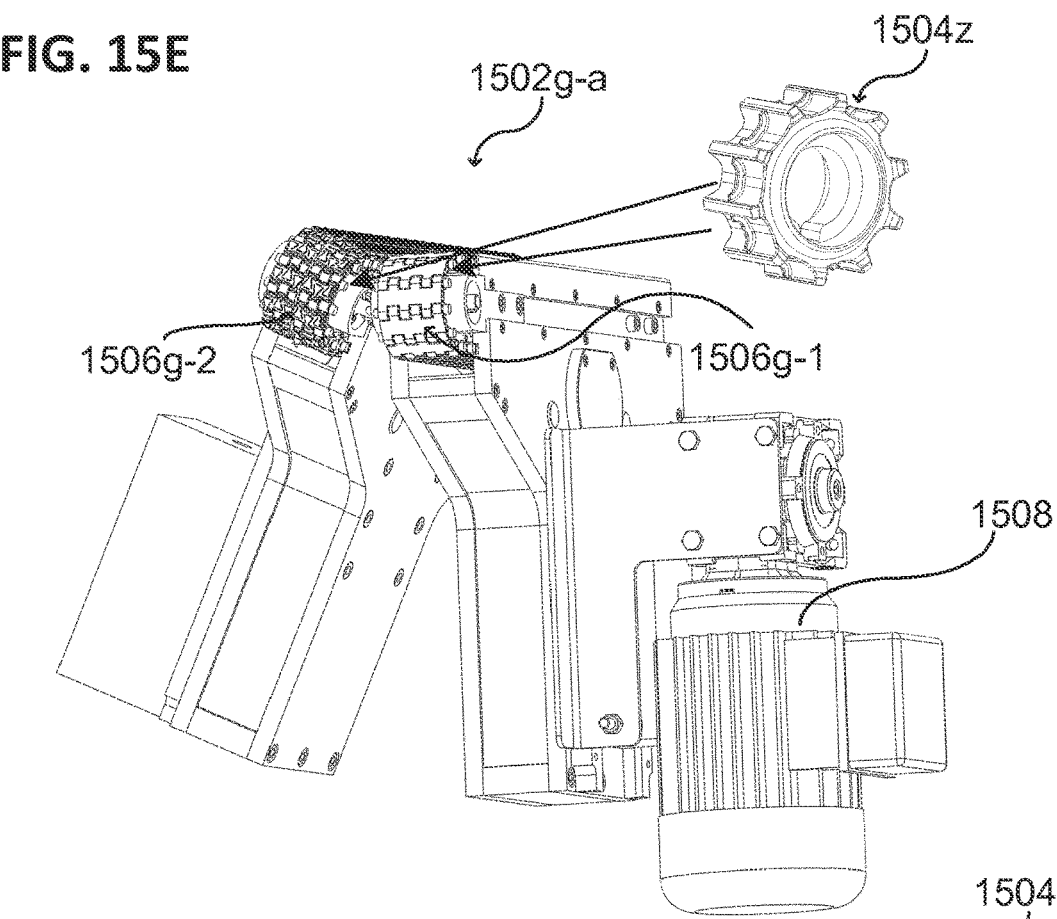
Figure 15F:
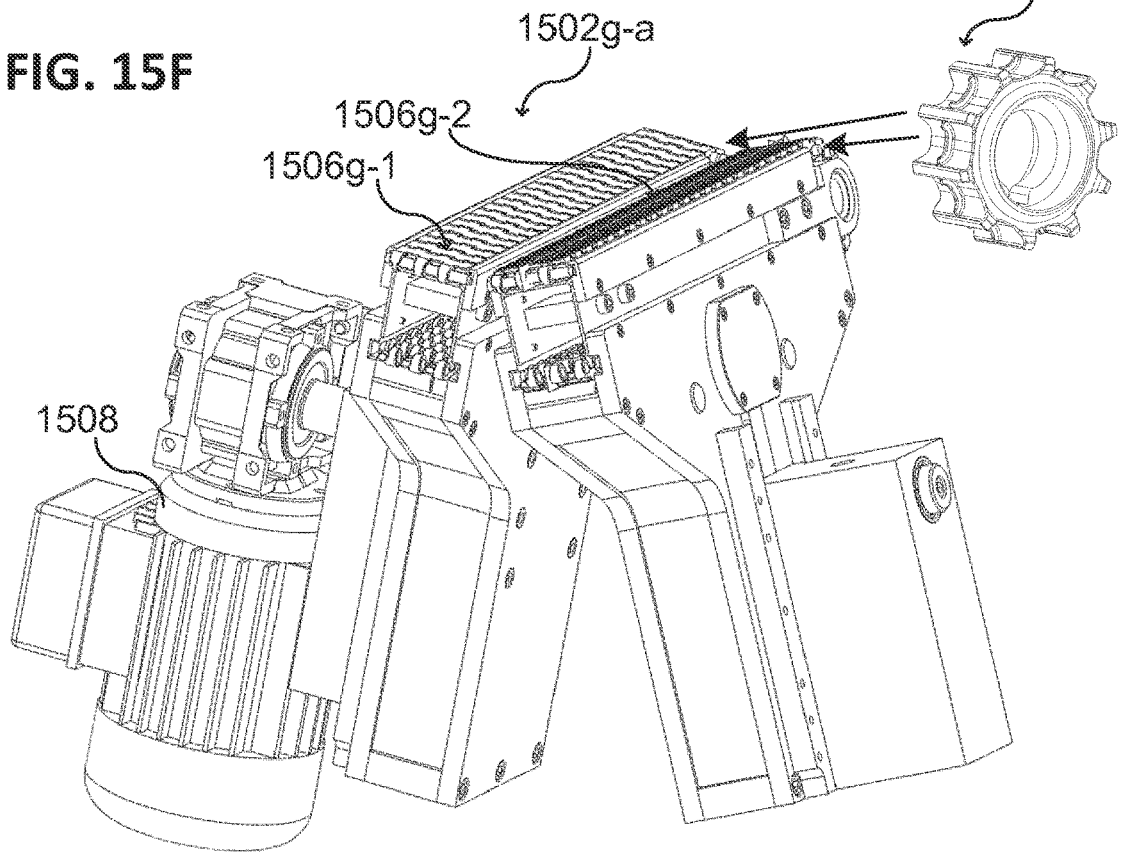
Figure 15G:
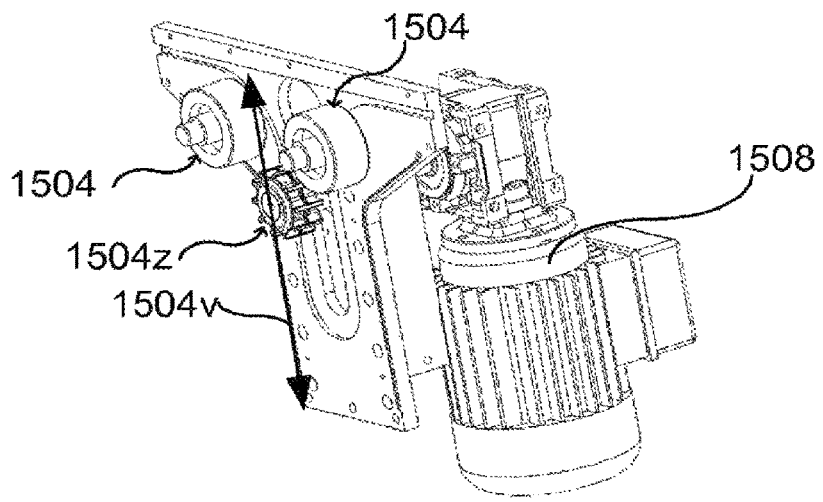
Figure 15H:
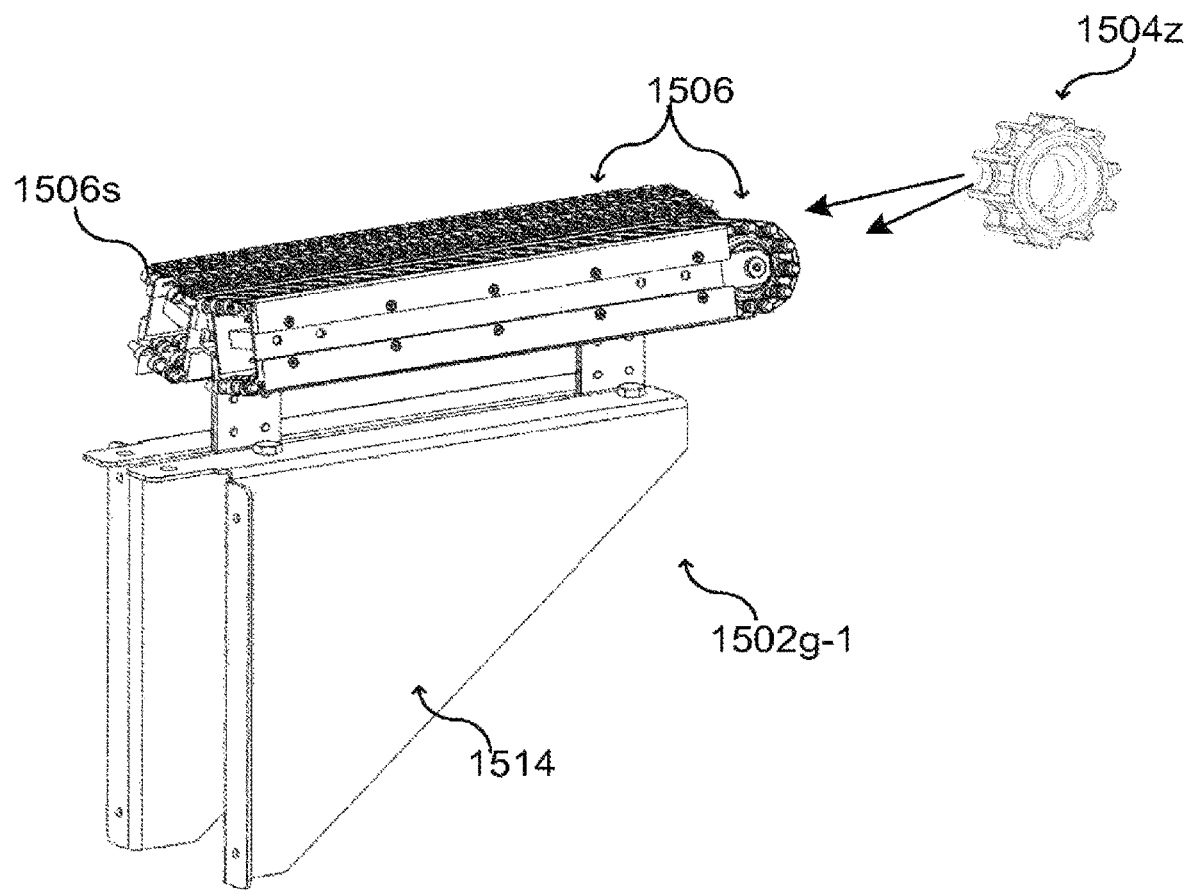
Figure 16A:
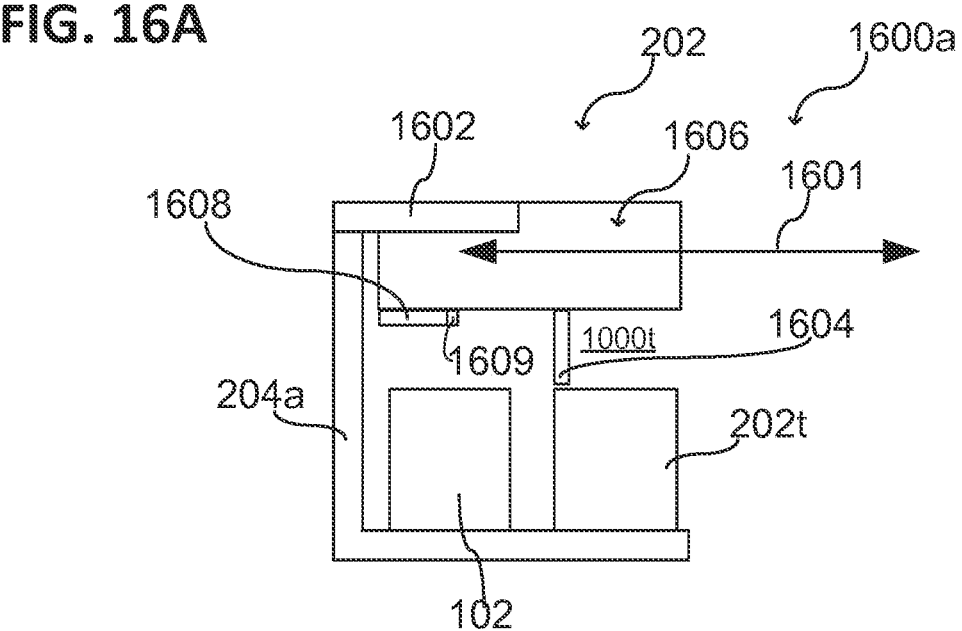
Figure 16B:
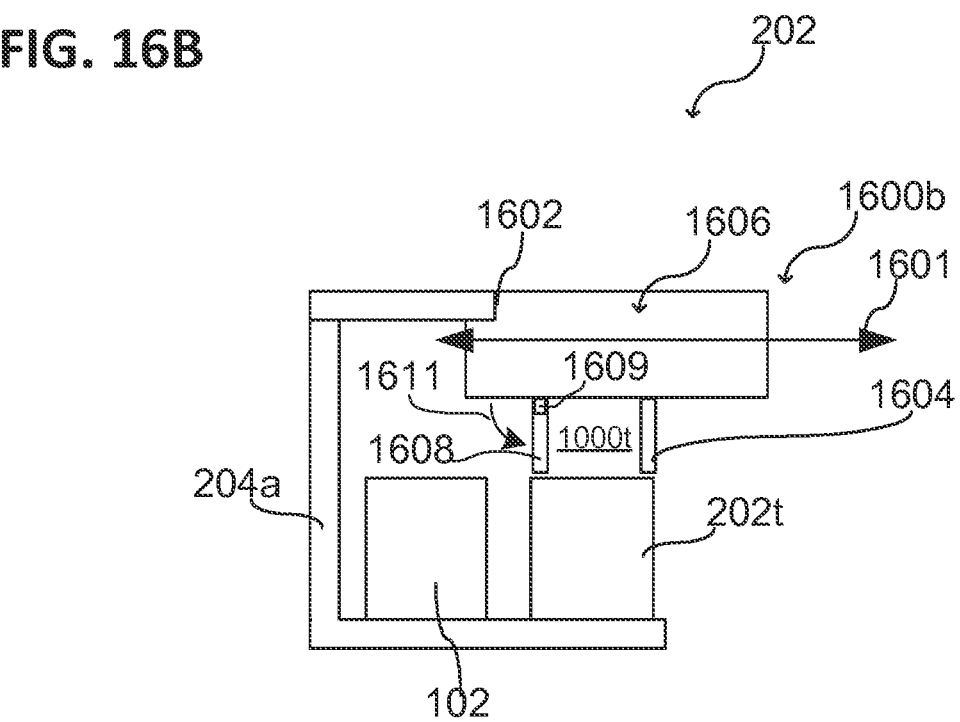

FIG. 4A to FIG. 4F each show various components of a compactor means in a schematic illustration, according to various embodiments;

FIG. 5A to FIG. 5C each show multiple compactor arrangements in various schematic illustrations, according to various embodiments;

FIG. 6 shows a compactor arrangement in a schematic illustration, according to various embodiments;

FIG. 7A to FIG. 7C show a compactor arrangement in various schematic illustrations, according to various embodiments;

FIG. 8A to FIG. 8C show multiple compactor arrangements in various schematic illustrations, according to various embodiments;

FIG. 9A to FIG. 9C show multiple compactor arrangements in various schematic illustrations, according to various embodiments;

FIG. 10A to FIG. 10F show a compactor arrangement in various schematic illustrations, according to various embodiments;

FIG. 11A to FIG. 11D show a function module arrangement of a compactor arrangement in various schematic illustrations, according to various embodiments;

FIG. 12 shows a schematic flow diagram of a method for operating a compactor arrangement, according to various embodiments;

FIG. 13A to FIG. 13D show a compactor arrangement in various schematic illustrations, according to various embodiments;

FIG. 14 shows a schematic flow diagram of a method for operating a compactor arrangement, according to various embodiments;

FIG. 15A to FIG. 15H show a belt-link conveyor in various schematic illustrations, according to various embodiments; and FIG. 16A and FIG. 16B show a compactor arrangement in various schematic illustrations, according to various embodiments.

DESCRIPTION OF PREFERRED EMBODIMENTS

In the following detailed description, reference is made to the accompanying drawings, which form a part hereof and in which, for illustrative purposes, there are shown specific embodiments in which the invention may be implemented. In this regard, directional terminology such as "upward", "downward", "forward", "rearward", "front", "rear", etc. is used with reference to the orientation of the figure(s) being described. Since components of embodiments may be positioned in a number of different orientations, the directional terminology serves for illustrative purposes, and is in no way limiting. It is self-evident that other embodiments may be utilized and structural or logical modifications may be made without departing from the scope of protection of the present invention. It is self-evident that the features of the various exemplary embodiments described herein may be combined with one another, unless specifically stated otherwise. The following detailed description is therefore not to be understood in a limiting sense, and the scope of the present invention is defined by the appended claims.

In the context of this description, the terms "connected", "attached", "linked" and "coupled" are used to describe both a direct and an indirect connection, a direct or indirect attachment, a direct or indirect link and a direct or indirect coupling. In the figures, identical or similar elements are denoted by identical reference symbols, as far as this is appropriate.

Figure 1A:
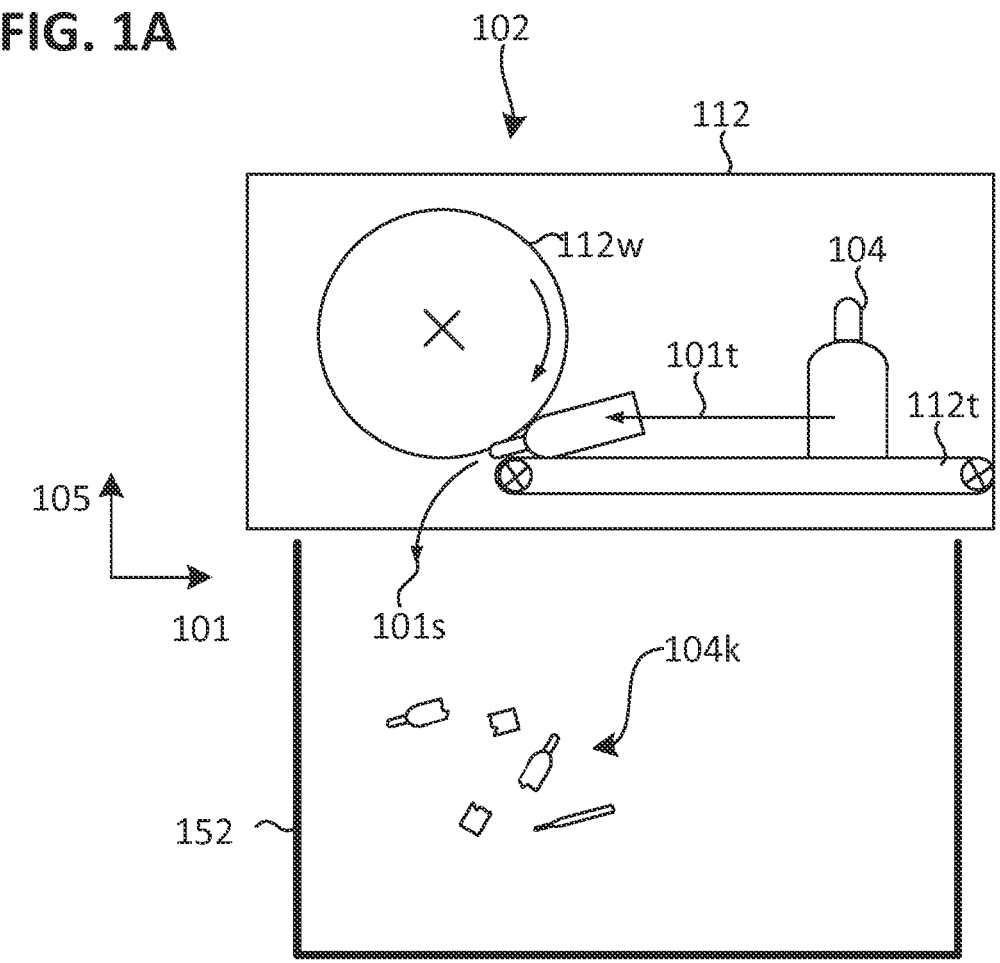
FIG. 1A and FIG. 1B show a compactor in various schematic illustrations, according to various embodiments.
Figure 1B:
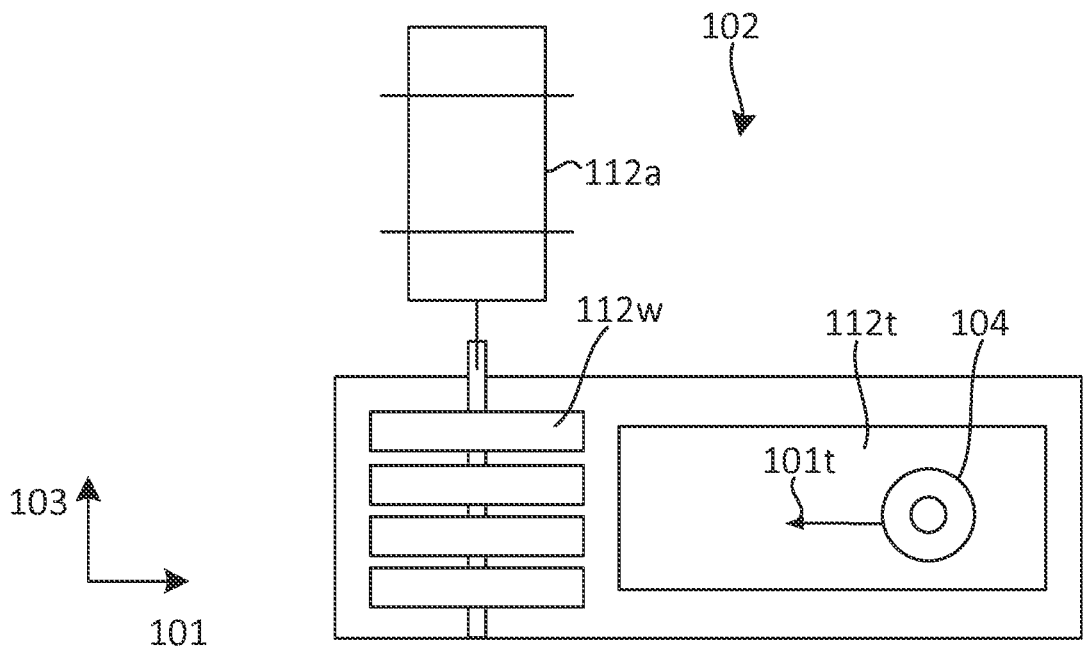

FIG. 1A and FIG. 1B illustrate a compactor 102 according to various embodiments in a side or cross-sectional view and in a plan view, with reference axes 101, 103 and 105.

A compactor 102 may be used as a functional assembly of an empty-container machine. An empty-container machine is also referred to as empty-container return machine (Reverse Vending Machine, RVS). The empty-container machine is typically connected to a deposit system, though may also be used in other sectors.

In order, for example, to make it easier for returned empty containers 104 to be transported away, a compactor 102 may be configured to compact these empty containers 104. For example, the empty containers 104 which are fed to an empty-container machine, for example if they are suitable for compacting, may be compacted by means of a compactor 102 or in a distributed manner by means of multiple compactors 102. The space requirement of the empty containers 104 is clearly reduced in the process. For this purpose, the empty containers 104 may be deformed, for example pressed, comminuted, etc. The empty containers 104 may clearly be for example broken, cut, etc. into a multiplicity of pieces. Alternatively or in addition, the empty containers 104 may for example be pushed into a flat shape. For example, glass containers can be broken up, for example by means of a glass crusher. Plastics containers may for example be comminuted by means of a cutting tool. Other deformation methods may also be used.

Compacted empty containers $104k$ may be collected $101s$ in at least one collecting vessel 152 (for example a freight container). For this purpose, the collecting vessel 152 may for example be arranged under the compactor 102. For example, the compactor 102 may be arranged on a framework, such that a space for receiving a collecting vessel 152 or multiple collecting vessels 152 is provided below the compactor 102.

In this context, empty containers 104 can be understood for example as vessels, for example in the form of emptied sales packagings, sales containers, etc. Empty containers 104 may for example include the following: single-use bottles, single-use deposit bottles, beverage cans, reusable bottles, etc. An empty-container machine may for example be part of an empty-container return chain, which supplies the empty containers 104 for reuse or recycling (e.g. for raw material recovery).

The compactor 102 may have a compactor unit 112 (clearly a device for reducing the space requirement), by means of which empty containers 104 can be compacted. The compactor unit 112 may have at least one compactor roller $112w$ (for example a single compactor roller or multiple compactor rollers rotating in opposite directions) and a drive $112a$ (for example an electric motor) for driving the compactor roller $112w$. Furthermore, the compactor 102 may have a feed device $112t$ for feeding the empty containers 104 in the direction $101t$ of the compactor roller $112w$.

The feed device $112t$ may for example be a driven transport device. Alternatively or in addition to this, the feed device $112t$ may provide a predefined path on which the empty containers 104 are moved, for example owing to the force of gravity. In this case, the feed device $112t$ may clearly have a chute. Alternatively to this, the compactor 102 may be configured such that the empty containers 104 can fall into it, for example in free fall.

The feed device $112t$ may for example have a belt conveyor, a belt-link conveyor, a chain conveyor, a roller conveyor, etc. as a driven transport device. A belt conveyor may for example have at least one transport belt on which the empty containers 104 are transported. The at least one transport belt may for example be supported by means of multiple transport rollers (also referred to as carrier rollers). The at least one transport belt may be mounted in endlessly circulating fashion. A belt-link conveyor may have at least one belt-link belt. The at least one belt-link belt may be mounted in endlessly circulating fashion.

The individual belt links of a belt-link belt may be detachably connected by means of connecting elements. A roller conveyor may for example have a multiplicity of transport rollers which are arranged such that they provide a transport surface on which the empty containers 104 can be transported. It is alternatively or additionally also possible to use other types of conveyors which are suitable for transporting the empty containers 104.

The feed device 112*t* may for example have a paddle wheel. The paddle wheel may for example assist the feeding and/or compacting of the empty containers 104.

Figure 2A:
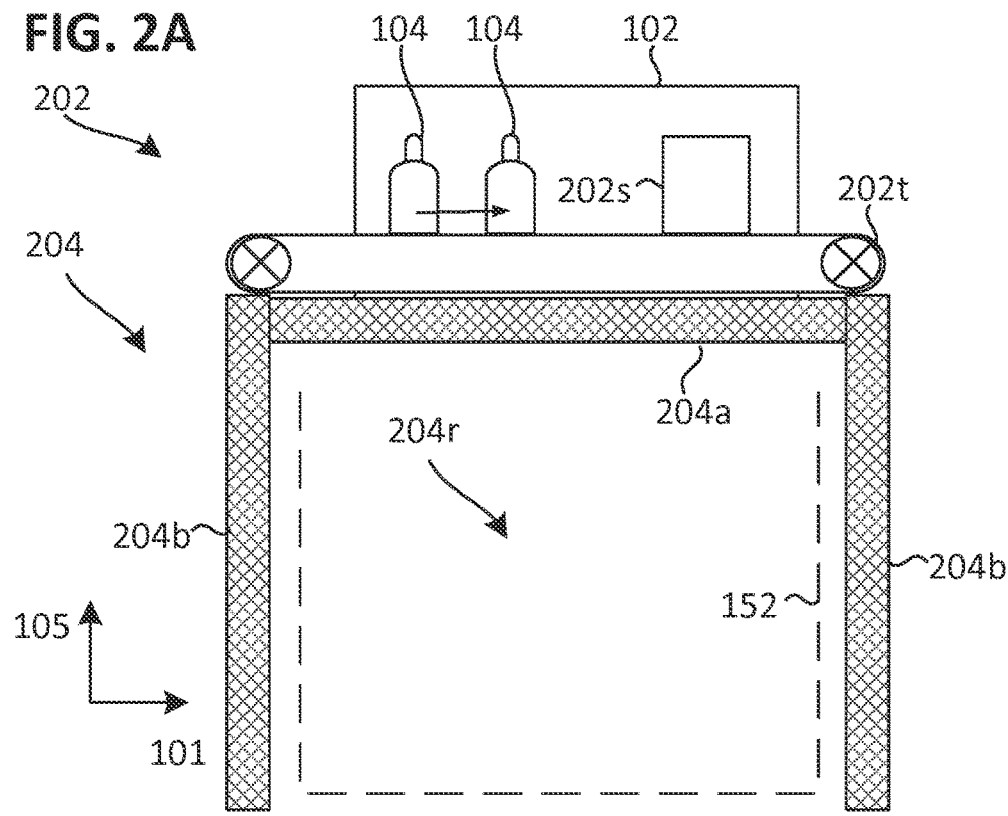
FIG. 2A and FIG. 2B show a compactor arrangement in various schematic illustrations, according to various embodiments.
Figure 2B:
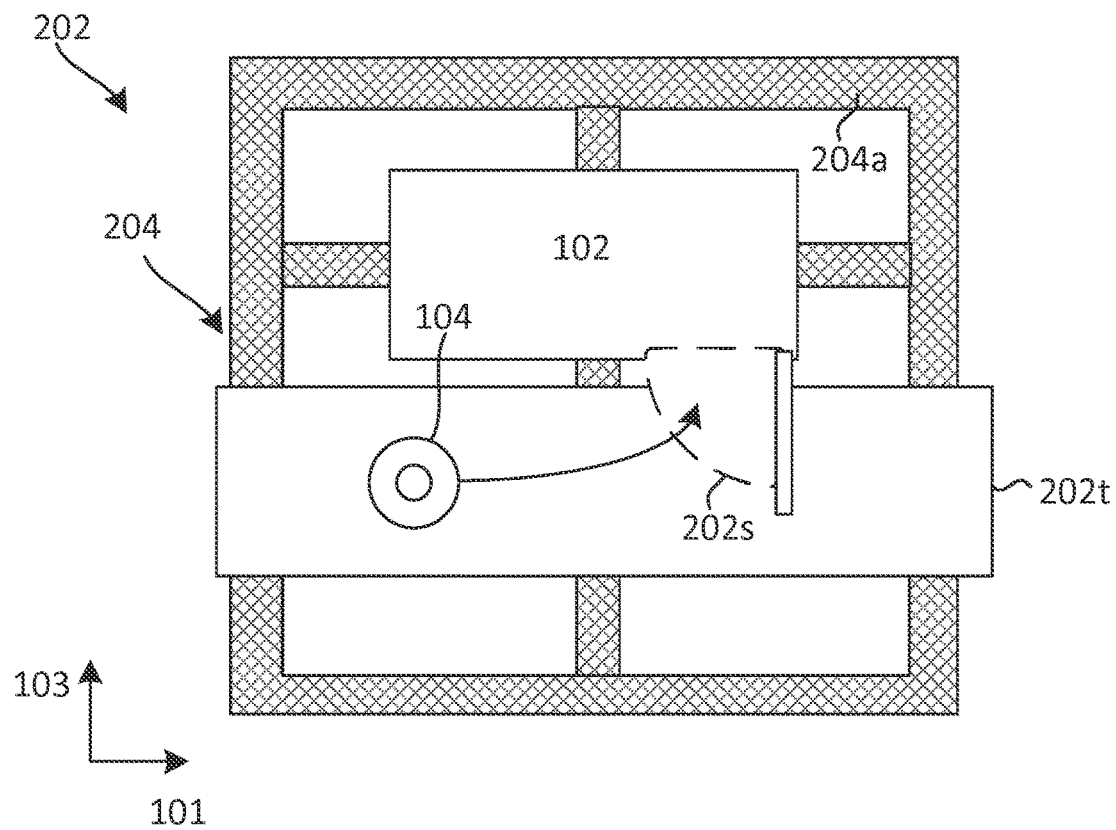

FIG. 2A and FIG. 2B illustrate a compactor arrangement 202 according to various embodiments in various views. The compactor arrangement 202 may for example have a framework arrangement 204. Furthermore, the compactor arrangement 202 may have a compactor 102 or multiple compactors 102. The compactor 102 of the compactor arrangement 202 may for example be configured in a similar or identical manner to that described above, and vice versa.

The compactor arrangement 202 may have further assemblies in addition to the compactor 102. The further assemblies may for example be configured to assist the operation of the compactor 102 and/or to integrate the compactor 102 into the sequence chain of an empty-container machine.

The framework arrangement 204 may for example have at least one support framework 204*a*. The compactor 102 may for example be fastened to the at least one support framework 204*a*. For example, the framework arrangement 204 may support the compactor 102 at a working height. It is thus for example possible for a collecting vessel 152 (for example a container or another large-capacity vessel) to be arranged under the compactor 102.

The framework arrangement 204 may furthermore have multiple support legs 204*b*. The support legs 204*b* may be arranged such that a first receiving space 204*r* for receiving a collecting vessel 152 is provided between them. It is thus possible, for example, for the collecting vessel 152 to be exchanged in a simple manner.

The compactor arrangement 202 may for example have an empty-container transport device 202*t*. The empty-container transport device 202*t* may for example be configured to lead the empty containers 104 to and/or past the compactor 102. The empty-container transport device 202*t* may for example be part of a transport path along which the empty containers 104 are transported. The empty-container transport device 202*t* may for example be a driven transport device, for example having at least one belt conveyor, at least one belt-link conveyor, at least one chain conveyor, at least one roller conveyor, etc.

The compactor arrangement 202 may for example have a selection device 202*s*. The selection device 202*s* may also be understood as a sorting device or part of a sorting device. It is thus possible for empty containers 104 that are led along the compactor 102 to be selected, for example for the selective feed of the empty containers 104 into the compactor 102. Here, the empty containers 104 may for example be classified; for example, a first class may be "compacting" and a second class may be "non-compacting". Use may also be made of additional or different classes; for example, the empty containers 104 may be classified according to color, material (for example glass, metal, plastics, etc.), condition (for example filling level, integrity), etc. A compactor arrangement 202 may for example select empty containers 104 which have a class assigned thereto (e.g. "compacting", e.g. "glass of a first color", "glass of a second color", "plastics of a first color", "plastics of a second color", etc.).

The selection device 202*s* may for example be configured to separate out, from a flow of empty containers which is led along the compactor 102 by means of the empty-container transport device 202*t*, that empty container 104 which has a class assigned to the compactor arrangement 202, and to feed said empty container to the compactor 102.

The selection device 202*s* may for example be configured to classify the empty containers 104. For example, the empty containers 104 may be classified by means of the selection device 202*s* and/or a suitable sensor arrangement which is linked to the selection device 202*s*, for example according to "compactable", "non-compactable", container type, return type, material, color, etc.

For example, the selection of the empty containers 104 may be performed in stages; for example, empty containers 104 classified as "compactable" may be further subclassified according to color, material, etc.

The classification of the empty containers 104 or a detection of the class of the empty containers 104 may alternatively or additionally take place by way of a separate classification means. This may for example be arranged at the entrance of an empty-container machine (see the following figures).

Figure 3A:
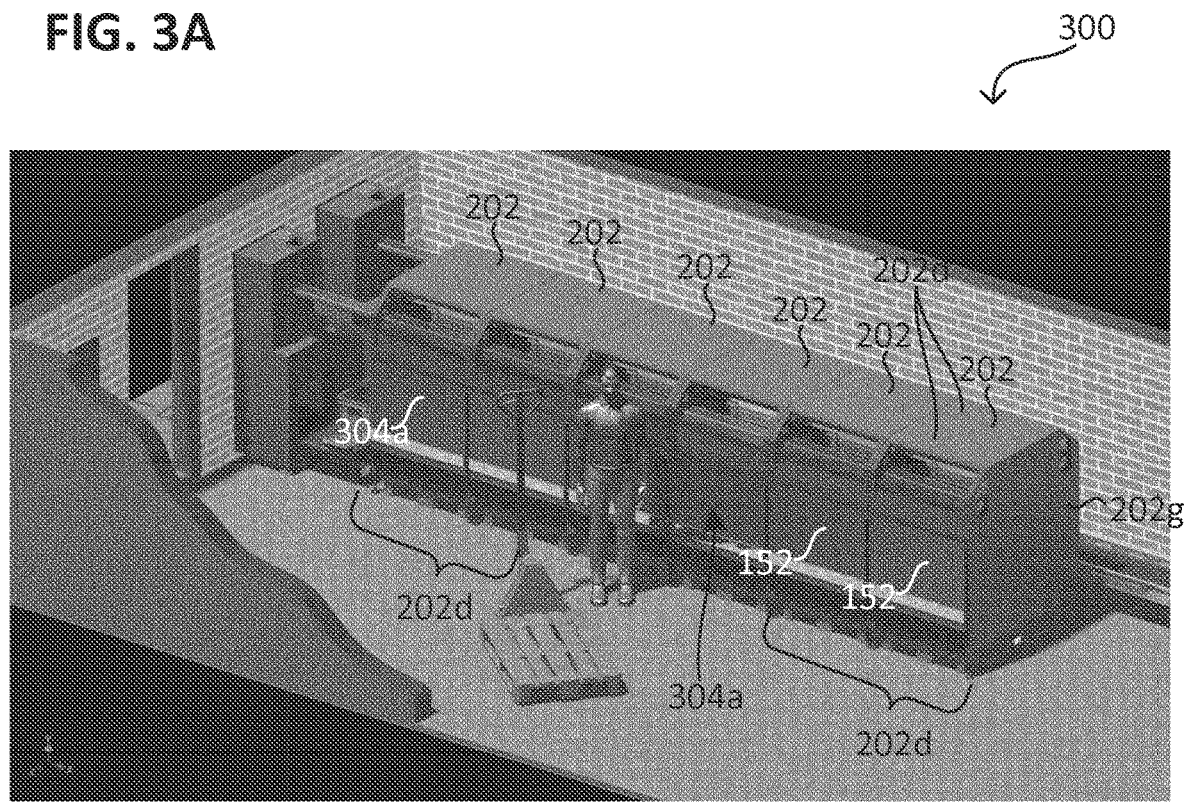
FIG. 3A and FIG. 3B show a compactor means in a schematic illustration, according to various embodiments.

The compactor arrangement 202 may have a housing (see for example the housing 202*g* in FIG. 3A). The compactor 102 and the empty-container transport device 202*t* may for example be arranged at least partially in the housing. The housing may have at least one first opening through which the empty containers 104 can be fed to the compactor arrangement 202 (e.g. received by means of the empty-container transport device 202*t*), for example along the transport path.

Furthermore, the housing may have a second opening. For example, the non-selected empty containers 104, which are transported past the compactor 102, may be discharged through the second opening, for example along the transport path.

Figure 3B:
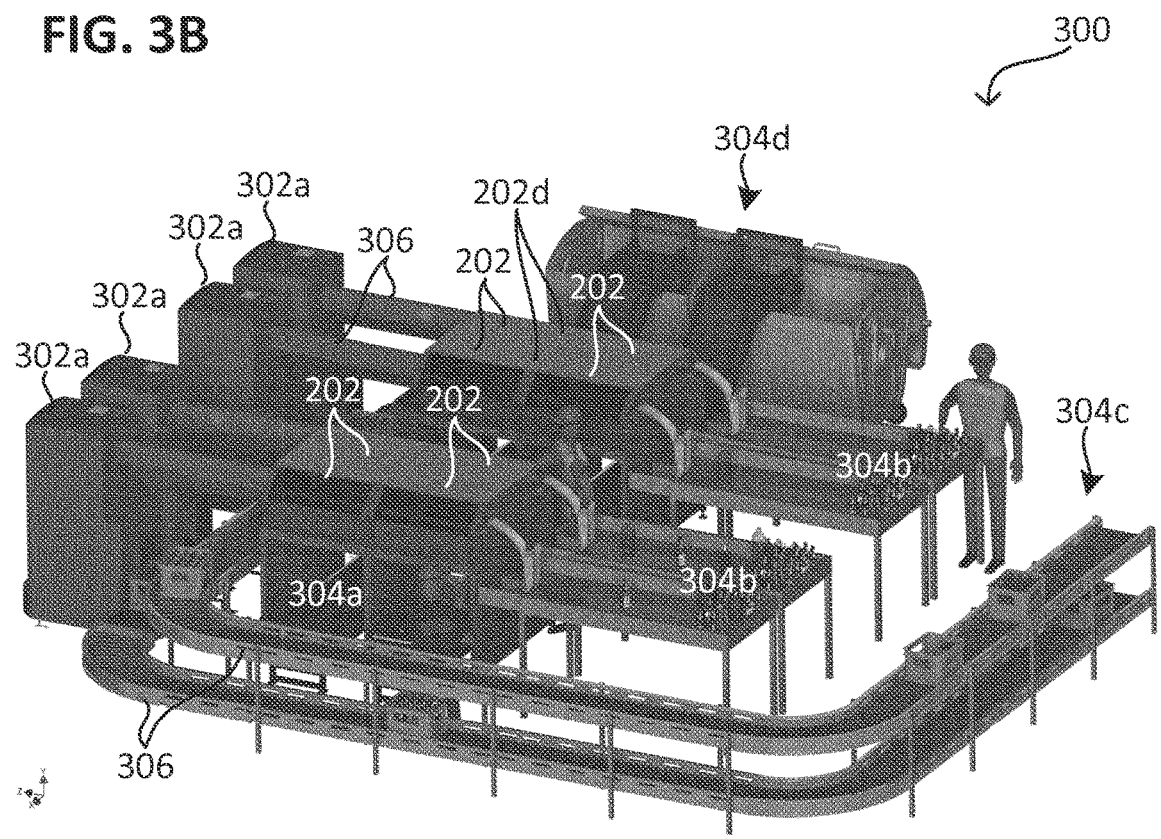

FIG. 3A and FIG. 3B each illustrate a compactor means 300 (also referred to as an empty-container return system or empty-container return machine) in a schematic perspective view, according to various embodiments.

The compactor means 300 may for example be configured to efficiently sort, compact, etc. the empty containers 104. For this purpose, a sequence chain for the sorting, compacting, etc. may be provided in conjunction with multiple compactor arrangements. The compactor arrangements of the compactor means 300 may for example be configured as described above with reference to the compactor arrangement 202.

The sequence chain of the compactor means 300 may, at the start 302*a* thereof, comprise for example a check of the empty container 104 to determine its eligibility for return. For example, various features of the empty container 104 (such as empty container type, weight, packaging type, barcode information, etc.) may be acquired for the check. The empty containers 104 classified as eligible for return can then be received by the compactor means 300 and fed to the sequence chain.

For example, multiple compactor arrangements 202 may be set up in series (that is to say along a common transport path) in the sequence chain. The multiple compactor arrangements 202 may for example perform compacting according to the classification, for example as described above.

Alternatively or in addition, the multiple compactor arrangements 202 may, in pairs (for example two first compactor arrangements and/or two second compactor arrangements), form a double module 202*d*, the compactor arrangements 202 of which compact the same class (also referred to as category). For example, one compactor arrangement 202 of the double module 202*d* can be serviced while the other compactor arrangement 202 of the double module 202*d* maintains operation. Multiple double modules 202*d* may be arranged in series (for example "back-to-back") or parallel to one another (that is to say in different transport paths). The double module 202*d* may for example have two compactors 102. These may be arranged in a common housing 202g or in separate housings 202g.

A double module 202d may also be referred to as a cabinet. A cabinet may for example be composed of two independent, mirror-symmetrical, modular compactor arrangements 202. A conversion of the cabinet to a mirror-symmetrical variant can, according to various embodiments, be carried out by means of a small number of handling operations (for example exchanging the compactor 102 and the selection device 202s). In order to facilitate the exchange of the selection device 202s, this may likewise be provided in modular form, referred to as a selection module.

At one end, the sequence chain may have a receiving space 304a (for example with a collecting vessel 152 therein) for receiving compacted empty containers 104k. At another end, the sequence chain may (in addition or as an alternative to this) have at least one further receiving space 304b, for example for individual empty containers (e.g. reusable empty containers or glass bottles) which are not to be compacted. Furthermore, at another end, the sequence chain may (in addition to or as an alternative to this) have a further receiving space 304c, for example for empty-container crates. Furthermore, at another end, the sequence chain may (in addition to or as an alternative to this) have a further receiving space 304d, for example for non-recyclable empty containers 104 (e.g. empty containers to be disposed of).

One end or multiple ends of the sequence chain may for example be connected by means of a transport system. The transport system may for example have multiple transport paths 306, and/or a selection may be performed at the points at which it branches (that is to say two transport paths adjoin one another).

Figure 4A:
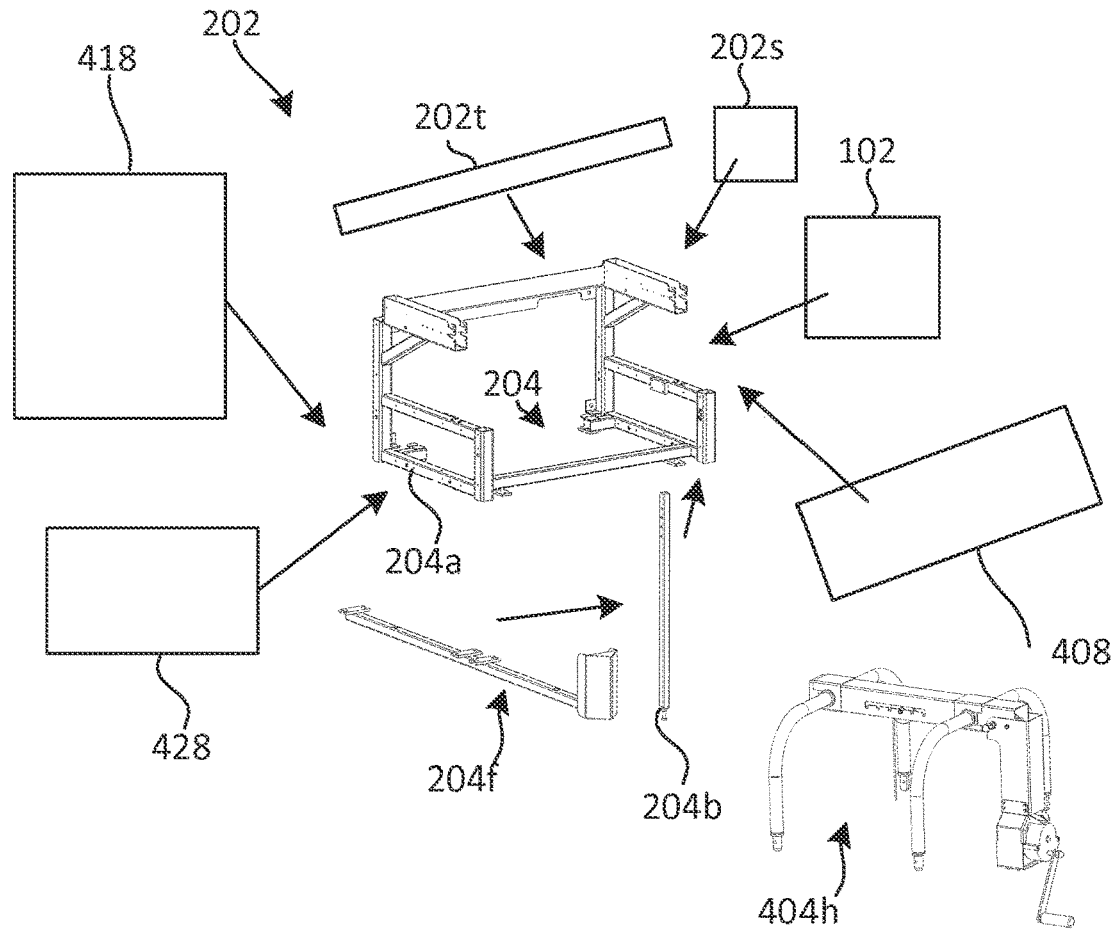

FIG. 4A illustrates various components of a compactor arrangement 202, according to various embodiments. The compactor arrangement 202 may be designed in a similar or identical manner to that described above, and vice versa.

The compactor arrangement 202 may for example have at least one compactor 102 which may be designed in a similar or identical manner to that described above, and vice versa.

The compactor arrangement 202 may for example have at least one framework arrangement 204 which may be designed in a similar or identical manner to that described above, and vice versa. The framework arrangement 204 may for example have a support framework 204a which clearly serves as a central element for the installation of the components of the compactor arrangement 202 and/or for the setting-up of the compactor arrangement 202. The framework arrangement 204 may furthermore have, for example, support legs 204b by means of which the support framework 204a can be supported. Furthermore, the framework arrangement 204 may for example have a foot assembly 204f. The foot assembly 204f may have a ram guard and/or a ground anchor. The ram guard itself may for example be designed to be exchangeable, because it should be exchanged in the event of damage. The ground anchor may for example be provided with at least one bore which can be used for the fastening to the ground.

The framework arrangement 204 may be configured such that the support framework 204a can be transported by means of a lifting truck, can be placed on the ground, and can be raised to a desired height by means of the support legs 204b. A lifting device 404h may be used to raise the support framework 204a. It is also possible for multiple support frameworks 204a to be connected to one another and to be raised simultaneously. When the support framework 204a is raised, some or all of the further components of the compactor arrangement 202 may already have been installed on the support framework 204a. Furthermore, the support framework 204a can also be lowered again. The support framework 204a may be configured such that some or all of the further components of the compactor arrangement 202 which have been installed on the support framework 204a (for example the compactor 102) can be uninstalled or exchanged without the support framework 204a being lowered.

Figure 4B:
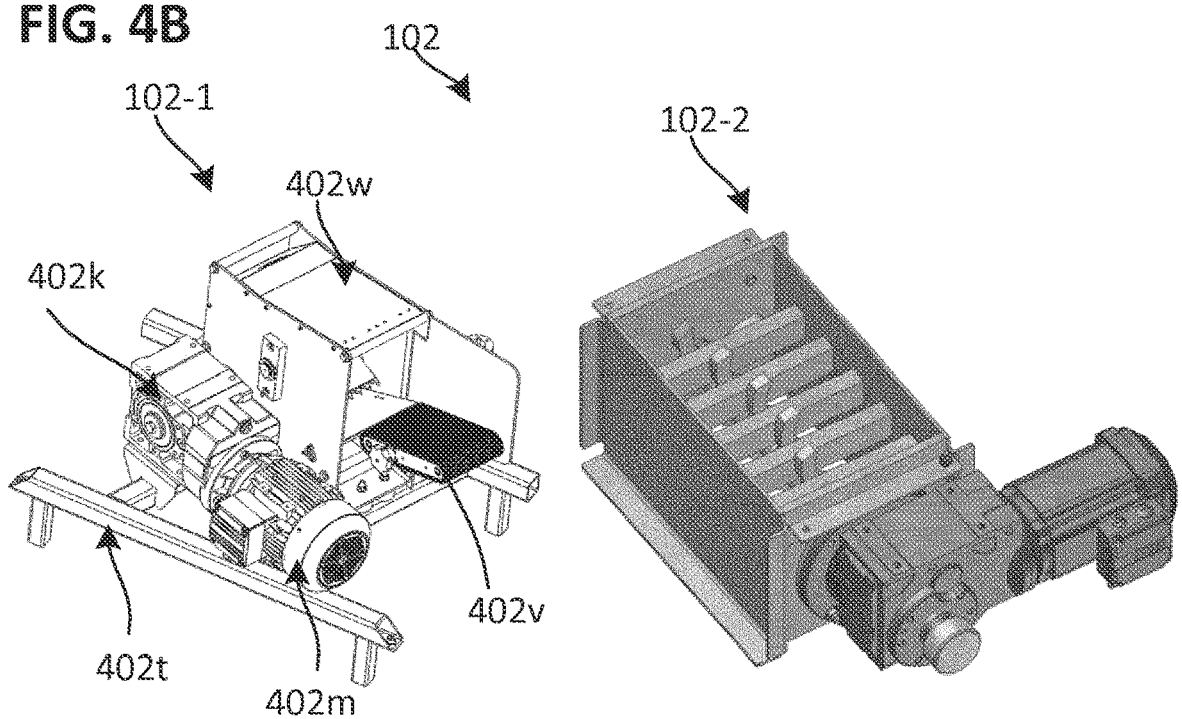

FIG. 4B illustrates, by way of example, a compactor 102 in two different embodiments 102-1, 102-2. The compactor 102 may for example be configured in a similar or identical manner to that described above, and vice versa.

For example, in a first embodiment 102-1, the compactor 102 may have a cutting unit 402w, for example for comminuting empty containers 104 made of plastics. By means of a preliminary belt assembly 402v, for example, the empty containers 104 can be led in the direction of the cutting unit 402w. The preliminary belt assembly 402v may for example be designed in an identical or similar manner to the feed device 112t described above, and vice versa.

The cutting unit may for example be configured such that the electric motor 402m acts on a blade shaft via a torque support, for example without an additional auxiliary gear mechanism. A bevel gear mechanism 402k may be used to transmit the torque from the electric motor 402m to the blade shaft.

The compactor 102 (for example in the first embodiment 102-1 with a cutting unit) may for example be installed on a support frame 402t. The support frame 402t may for example be configured to match the support framework 204a of the framework arrangement 204 (or clearly understood as part of the framework arrangement 204) for the installation of the compactor 102 on the support framework 204a (see for example FIG. 5A to FIG. 5C). For example, the compactor 102 can be raised into the support framework 204a from below by means of the support frame 402t and detachably fastened to said support framework. Furthermore, the support frame 402t can be detached from the support framework 204a and the compactor 102 can be lowered out of the support framework 204a by means of the support frame 402t. The lifting device 404h, for example, may be used for the raising and/or lowering of the compactor 102.

Furthermore, in a second embodiment 102-2, the compactor 102 may have a glass crusher, for example for comminuting empty containers 104 composed of glass.

The compactor 102 (for example in the second embodiment 102-2 as a glass crusher) may for example be arranged centrally in a double module 202d and supplied with empty containers composed of glass from both transport paths by means of the selection device 202s. The feed downstream of the selection flap of the selection device 202s (see FIG. 4D) may be provided by means of an active transport path. The active transport path may for example be safeguarded by means of two bulkheads. These bulkheads serve, for example, for protection against glass splinters and for preventing manipulative removal (see FIG. 13). For example, in the feed path, there are situated one or more sensors which are protected against manipulation and which monitor the reliable feed. The devaluation of the respective empty containers 104 can thus be assigned.

The compactor arrangement 202 may for example have at least one empty-container transport device 202t, which may be configured in a similar or identical manner to that described above and vice versa.

FIG. 4C illustrates, by way of example, an empty-container transport device 202t in two different embodiments 202t-1, 202t-2. The empty-container transport device 202t may for example be configured in a similar or identical manner to that described above, and vice versa.

In a first embodiment 202t-1, the empty-container transport device 202t may have a transport belt 202t-b. The empty-container transport device 202t may clearly be configured as a belt conveyor 202t-1. The transport belt 202t-b may be mounted in endlessly circulating fashion between at least two belt rollers 202t-r. The transport belt 202t-b can be correspondingly tensioned by means of the belt rollers 202t-r. Furthermore, support arrangements 202t-s may be used to camber the transport belt 202t-b. The respective support arrangement 202t-s may for example have a support roller and a rotary bearing, wherein the support roller is mounted so as to be rotatable about an axis of rotation by means of the rotary bearing. Here, the support roller may have a lateral surface on which the transport belt rests at least partially. The lateral surface may for example be oriented obliquely with respect to the axis of rotation.

In a second embodiment 202t-2, the empty-container transport device 202t may for example have two belt-link belts 202t-g. The empty-container transport device 202t may clearly be designed as a belt-link conveyor 202t-2. The belt-link belts 202t-g may be arranged in a V-shape. The respective belt-link belt 202t-g may be mounted in endlessly circulating fashion between at least two belt rollers 202t-r. The respective belt-link belt 202t-g may have a multiplicity of belt links which are mechanically connected to one another (for example by means of bolts). Here, the outwardly exposed side of the belt-link belt 202t-g (clearly the side that can come into contact with the empty containers 104) may have a rubber coating.

In an analogous manner, the preliminary belt assembly 402v of the compactor 102 may be configured as a belt conveyor or belt-link conveyor.

The compactor arrangement 202 may for example have at least one selection device 202s which may be designed in a similar or identical manner to that described above, and vice versa.

Figure 4D:
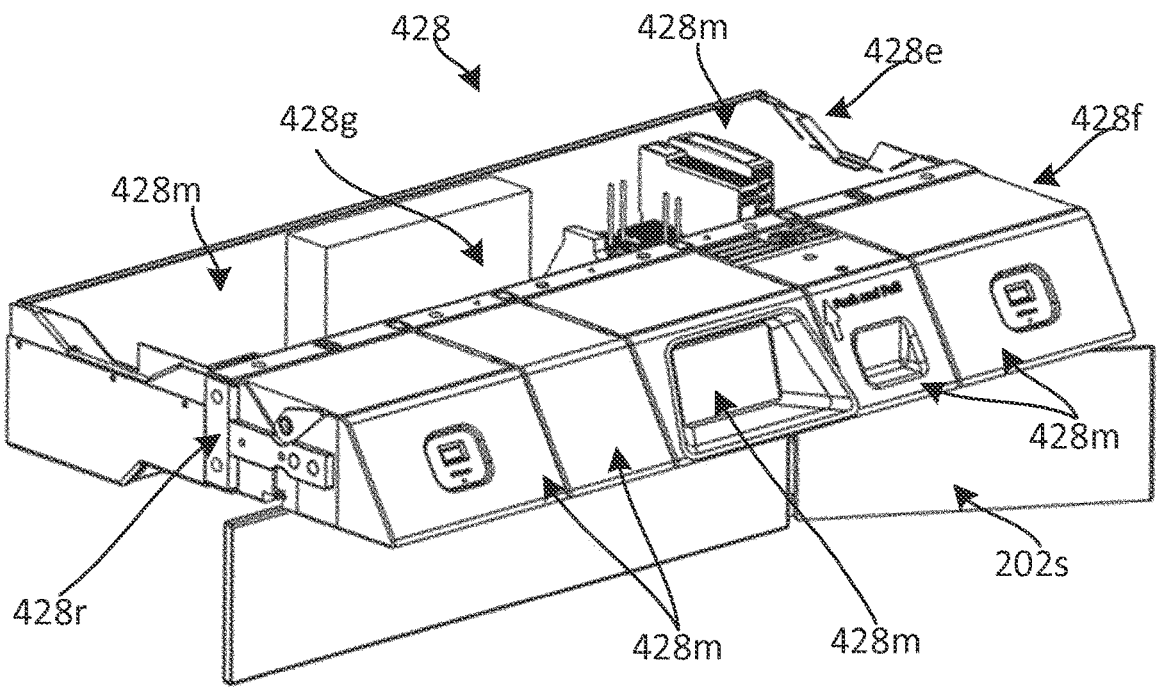

The compactor arrangement 202 may for example have at least one electrical assembly 428, as illustrated for example in a schematic view in FIG. 4D.

The electrical assembly 428 may for example have electrical and electromechanical components for the operation of the compactor arrangement 202, for example for the operation of the compactor 102, of the empty-container transport device 202t, of the preliminary belt assembly 402v, of the selection device 202s, etc. Here, operation may be understood to mean open-loop control, closed-loop control and/or a supply of electrical energy.

The electrical assembly 428 may for example be arranged on the support framework 204a. The electrical assembly 428 may for example be of modular design and have a multiplicity of modules 428m. The modules 428m may for example have one or more electronic modules, one or more electromechanical modules, etc. The modules 428m of the electrical assembly 428 may be detachably (for example pluggably) mounted by means of a common bearing arrangement 428r (e.g. of a frame, etc.). The common bearing arrangement 428r may for example be designed to be movable; for example, it may be configured to be displaceable and/or pivotable. As an alternative to this, the common bearing arrangement 428r may be installed in a static manner on the support framework 204a.

In some configurations, the selection device 202s may be configured, for example, as a module 428m of the electrical assembly 428. The selection device 202s may for example have a pivotably mounted flap. The pivotably mounted flap may be configured such that, in a first position, it leads empty containers 104 from the empty-container transport device 202t to the compactor 102, said empty containers clearly being selected, and in a second position leaves the empty containers 104 on the empty-container transport device 202t.

The modules 428m of the electrical assembly 428 may for example be configured so as to be easily accessible such that they can be exchanged, for example, by a user.

The electrical assembly 428 may for example have multiple supply modules which are designed, for example, as electrical boxes 428e. For example, an electrical box may be configured to provide a high-voltage power supply. Furthermore, a further electrical box may be configured to provide control functions, for example in the case of a low voltage, for example 12 V, 24 V, etc. The control functions may be implemented by means of correspondingly configured control electronics. The electrical boxes 428e may for example be configured and mounted so as to be removable (for example upwards). This means that they can be exchanged if necessary by means of a small number of handling operations. Furthermore, for example, a free space 428g may be maintained for access to the cutting unit from above.

Multiple function modules of the electrical assembly 428 may be configured as a front assembly 428f (see function module arrangement 1102 in FIGS. 11A to 11D). The front assembly 428f may be connected to the electrical boxes 428e by means of an electrical interface (for example a cabling bridge). The function modules of the front assembly 428f may be supplied with electrical power by means of the electrical power supply installed in the electrical boxes 428e. Furthermore, the function modules of the front assembly 428f may for example be implemented by means of the control electronics installed in the electrical boxes 428e, by means of at least one processor. The control electronics can generate predefined control commands and/or control processes as required and be of correspondingly powerful design; for example, an application-specific integrated circuit (ASIC) or a computer system (e.g. a system on a chip, SoC) may be used to implement the control.

The compactor arrangement 202 may for example have multiple covers 408, 418. The covers 408, 418 may for example form part of a housing (also referred to as an enclosure) which houses, at least in certain sections, the components of the compactor arrangement 202. The covers 408, 418 can for example serve to protect components of the compactor arrangement 202 and/or to shield components that pose a risk to a user (e.g. a high-current component, a cutting unit, moving components of a transport device, etc.).

The enclosure of the compactor arrangement 202 may for example be divided into an upper cover 408 (for example an upper flap) and a lower cover 418 (for example a lower flap, also referred to as a container flap), see FIG. 4A. The upper cover 408 may for example cover the transport path (for example, at least in certain sections, the empty-container transport device 202t of the compactor arrangement 202). The lower cover 418 may for example cover a part of the support framework 204a and a receiving space below the support framework 204a, when the latter is raised, for receiving a collecting vessel, as described by way of example above.

Figure 4E:
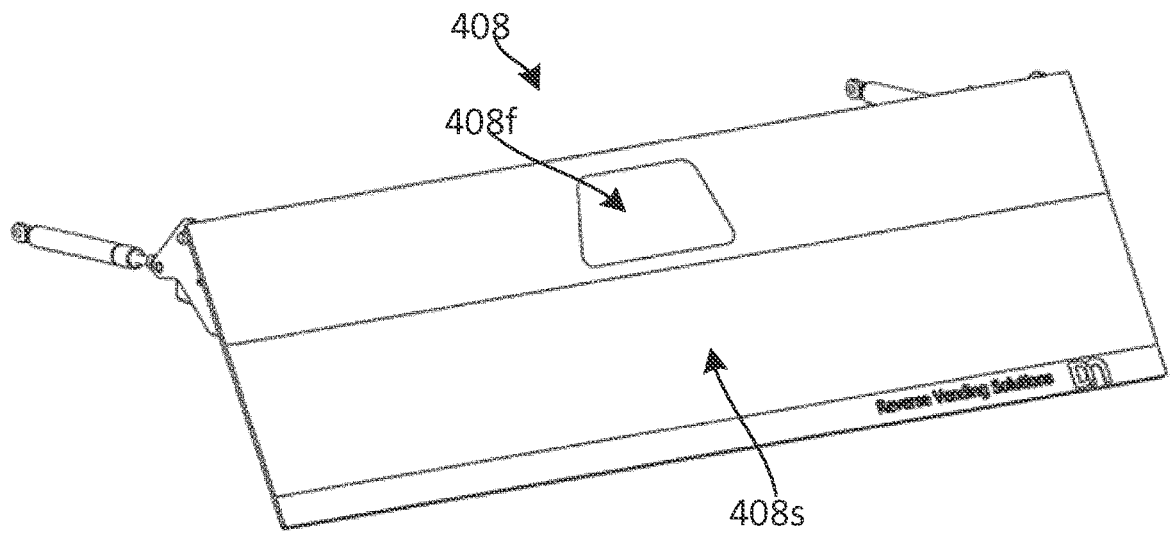

FIG. 4E illustrates, by way of example, an upper cover 408 in an exemplary view.

The upper cover 408 may for example be provided to match the electrical assembly 428 in order to ensure, for example, easy access to the modules 428*m* of the electrical assembly 428, for example for the exchange of one or more of the modules 428*m*. For this purpose, the upper cover 408 may be movably mounted such that it can be opened and closed.

Furthermore, the upper cover 408 may be configured such that at least one display element of a module 428*m* of the front assembly 428*f* is visible to a user. For example, the upper cover 408 may have at least one viewing window 408*f* through which a display element of a module 428*m* of the front assembly 428*f* is visible to a user.

Furthermore, the upper cover 408 may be configured such that at least one input element of the modules 428*m* of the front assembly 428*f* is accessible to a user.

Furthermore, the upper cover 408 may be configured such that the empty containers 104 being transported in the compactor arrangement 202 by means of the empty-container transport device 202*t* are visible to a user. For example, the upper cover 408 may have at least one further viewing window 408*s* through which empty containers being transported in the compactor arrangement 202 by means of the empty-container transport device 202*t* are visible to a user.

The upper cover 408 may for example be designed as an upper flap in such a way that it opens automatically. The opening may for example take place by means of gesture control or by means of some other form of control, for example a button, a touch sensor, etc. The opening mechanism of the upper flap may be implemented for example mechanically by means of two gas pressure springs or in some other suitable form. In the corresponding closed position, the upper flap may be held by means of a catch bolt lock. The upper cover 408 may be provided so as to be removable and/or exchangeable without tools.

Figure 4F:
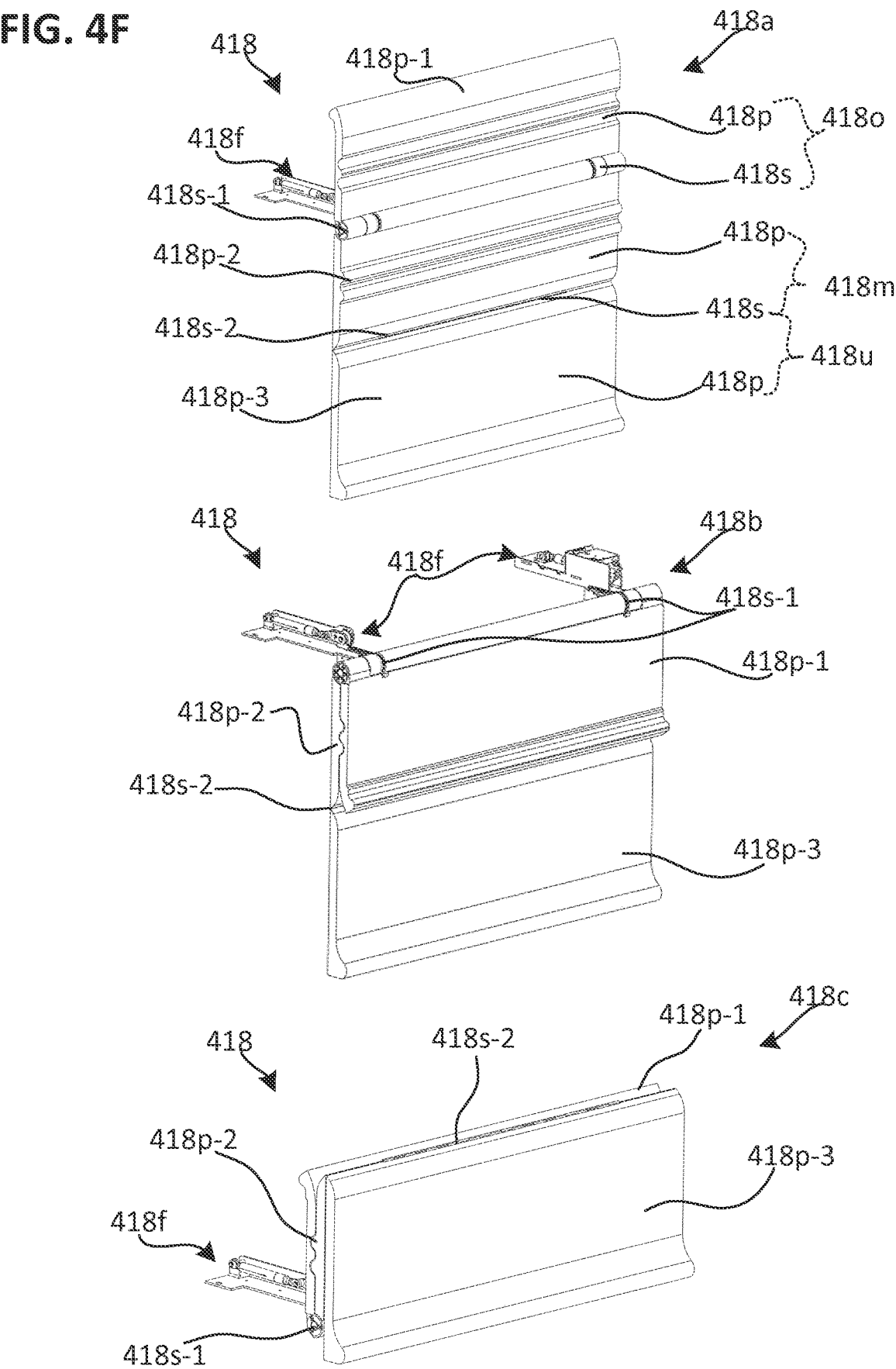

FIG. 4F illustrates, for example, a lower cover 418 in different positions 418*a*, 418*b*, 418*c* in an exemplary view, according to various embodiments.

The lower cover 418 may be configured, for example, as a flap arrangement 418 such that it can be moved (e.g. pivoted or folded) into various positions 418*a*, 418*b*, 418*c* by means of a multi-part folding mechanism.

According to various embodiments, the lower cover 418 may be a multi-part (e.g. 3-part) flap arrangement 418, as described in detail below.

As is shown by way of example in FIG. 4F, the flap arrangement 418 may have multiple cover plates 418*p*, for example a first cover plate 418*p*-1, a second cover plate 418*p*-2 and a third cover plate 418*p*-3. The multiple cover plates 418*p* can be moved into different positions 418*a*, 418*b*, 418*c* for example by means of multiple hinge arrangements 418*s*, for example a first hinge arrangement 418*s*-1 and a second hinge arrangement 418*s*-2.

Here, the flap arrangement 418 may have at least one fixing arrangement 418*f*. The fixing arrangement 418*f* can for example fix the flap arrangement 418 in a closed position 418*a*, in a first open position 418*b* and/or in a second open position 418*c*. For the fixing of the flap arrangement 418 in the respective position, at least one of the cover plates 418 can be held static by the fixing arrangement 418*f*.

In the closed position 418*a*, the second cover plate 418*p*-2 and the third cover plate 418*p*-3 can be mounted in a stable manner owing to the force of gravity (clearly these can be jointly suspended on the first hinge arrangement 418*s*-1).

The three-part flap arrangement 418 can clearly be divided into two parts, that is to say for example may clearly have three flaps 418*o*, 418*m*, 418*u*.

The first (for example upper) cover plate 418*p*-1 may for example form an upper pivoting flap 418*o* with the associated first hinge arrangement 418*s*-1. The upper pivoting flap 418*o* may for example be configured such that it can be pivoted through approximately 180°, for example when the flap arrangement 418 is to be moved from the closed position 418*a* into the first open position 418*b* and vice versa.

The upper pivoting flap 418*o* may for example be held in the closed position 418*a* by means of the fixing arrangement 418*f*. The upper pivoting flap 418*o* may for example be detachably fixed on the support framework 204*a* of the framework arrangement 204, see for example FIGS. 5A to 5C.

The upper pivoting flap 418*o* of the flap arrangement 418 may for example be configured such that it can be opened (see first open position 418*b*) only when the upper cover 408 is already open.

As illustrated for example in FIG. 4F, the central cover plate 418*p*-2 with the associated second hinge arrangement 418*s*-2 may form a central pivoting flap 418*m*. The lower cover plate 418*p*-3 may for example, with the associated second hinge arrangement 418*s*-2, form a lower pivoting flap 418*u*.

In the closed position 418*a*, the pivoting flaps or cover plates 418 of the flap arrangement 418 may be arranged in a common plane. The pivoting flaps or cover plates 418 of the flap arrangement 418 then form a substantially closed surface.

In the first open position 418*b*, the central pivoting flap 418*m* and the lower pivoting flap 418*u* (or the second cover plate 418*p*-2 and the third cover plate 418*p*-3) of the flap arrangement 418 may be arranged in a common plane. These then form a substantially closed surface. In the first open position 418*b*, the upper pivoting flap 418*o* (or the first cover plate 418*p*-1) may be folded over the central pivoting flap 418*m* (or the second cover plate 418*p*-2).

In the second open position 418*c*, the upper pivoting flap 418*o* may be in the same position as in the closed position 418*a*. The central pivoting flap 418*m* and the lower pivoting flap 418*u* may be folded in oppositely to one another and pivoted upwards. In the second open position 418*c*, the three pivoting flaps (or cover plates 418) of the flap arrangement 418 may be arranged one above the other. There is thus a small space requirement during the pivoting movement. Furthermore, there is a small space requirement in the second open position 418*c*, such that, for example, in this position, the compactor arrangement 202 can be transported in a space-saving manner and at the same time can be easily installed (see FIG. 11).

The flap arrangement 418 may for example be configured such that it can be opened in a manually assisted manner or fully automatically. For this purpose, the flap arrangement 418 may have a suitable drive system.

The flap arrangement 418 may for example be configured such that the lower pivoting flap 418*u* moves automatically relative to the central pivoting flap 418*m* when the central pivoting flap 418*m* is moved. It may thus suffice, for example, to move the central pivoting flap 418*m* by means of an actuator in order to bring the flap arrangement 418 into the second open position 418*c*.

For example, a fully automatic opening and closing mechanism may be provided. As an alternative to this, a fully automatic opening mechanism and a manual closing mechanism, a manual opening mechanism and a fully automatic closing mechanism, or a manual opening and closing mechanism may be provided.

As described above by way of example, the upper cover 408 may be configured such that it can be opened fully automatically and/or closed fully automatically. Furthermore, the flap arrangement 418 may be configured such that it can be opened fully automatically and/or closed fully automatically.

Here, a compactor means 300, which for example has multiple compactor arrangements 202, may have a central controller (e.g. implemented in the electrical assembly 428, e.g. implemented in a control device external to the compactor arrangement, etc.) for the respective fully automatic opening and/or fully automatic closing of the lower flap arrangement 418 and/or of the upper cover 408. The respective movement for the opening and/or closing may be triggered by means of a sensor, for example on the basis of the recognition of a gesture by a user, an input by a user at a control panel, a switch, etc. Alternatively, the opening and/or closing may be performed in a time-controlled manner or automatically on the basis of a triggering event (e.g. an error signal, etc.).

According to various embodiments, the fixing arrangement 418f may have a mechanical holder, an electromechanical holder, a magnetic holder, an electromagnetic holder, etc.

As illustrated by way of example in FIG. 4F, a compactor arrangement 202, according to various embodiments, may have a flap arrangement 418. The flap arrangement 418 may be installed on the support framework 204a. For example, the first hinge arrangement 418s-1 may be fastened to the support framework 204a. The second hinge arrangement 418s-2 may for example movably connect only the second cover plate 418p-2 and the third cover plate 418p-3 to one another.

The multiple hinge arrangements 418s of the flap arrangement 418 may for example be configured such that their axes of rotation or pivot axes are oriented substantially parallel to one another.

The first hinge arrangement 418s-1 may for example be installed on a first end portion of the second cover plate 418p-2 and the second hinge arrangement 418s-2 may be installed on a second end portion of the second cover plate 418p-2 which is situated opposite the first end portion.

As described by way of example above, the compactor arrangement 202 may have six main assemblies (see FIG. 4A, e.g. support framework 204a; covers 408, 418; empty-container transport device 202t; electrical assembly 428; foot assembly 204f; support leg 204b; 204b; compactor 102). The core assembly is in this case a support framework 204a, for example a welded steel framework. For example, all other assemblies may be attached to this supporting structure. In some embodiments, each of the main assemblies is installed on the support framework 204a using four or fewer bolts.

FIG. 5A to FIG. 5C each illustrate a compactor arrangement assembly 502 with multiple compactor arrangements 202 in various illustrations. The compactor arrangements 202 may for example be embodied as described above. The compactor arrangement assembly 502 may clearly be configured as a double module 202d, as illustrated by way of example in FIGS. 5A and 5B.

Furthermore, the compactor arrangement assembly 502 may have multiple double modules 202d, for example two double modules 202d arranged in series, as illustrated by way of example in FIG. 5C. Other configurations, for example an individually set-up compactor arrangement 202, two individual compactor arrangements 202 arranged in series, etc. are likewise possible. For this purpose, the respective framework arrangement 204 may for example be correspondingly modified; for example, a single compactor arrangement 202 may be set up using four support legs 204b and a double module 202d with two compactor arrangements 202 may be set up for example using at least four (e.g. four, six or eight) support legs 204b.

The respective double module 202d may for example have two compactor arrangements 202 which are arranged back-to-back relative to one another. Thus, for example, two transport paths 306 are each accessible from mutually opposite sides of the double module 202d. The transport paths 306 are formed by the respective empty-container transport devices 202t of the compactor arrangements 202.

By means of a respective selection device 202s, empty containers can be selectively led from the transport paths 306 into the respective compactor 102 of the compactor arrangement 202. After the empty containers have been comminuted, they may be collected in a collecting vessel which may be arranged below the respective compactor 102 in the receiving space 304a. For the exchange or introduction of the collecting vessel into the receiving space 304a and/or removal of the collecting vessel from the receiving space 304a, the flap arrangement 418 can be opened; for example, the flap arrangement 418 can be folded into the second open position 418c, as described above. Furthermore, the flap arrangement 418 may be opened for servicing and/or installation of the compactor 102, of the empty-container transport devices 202t, etc.; for example, the flap arrangement 418 may be folded into the first open position 418b, as described above.

As illustrated for example in FIG. 5A, the flap arrangement 418 may be configured such that the second cover plate 418p-2 and the third cover plate 418p-3 at least partially cover the receiving space 304a for receiving the collecting vessel when said flap arrangement is in the closed position 418a.

As illustrated for example in FIG. 5C, a common empty-container transport device 202t may extend through two mutually adjacent compactor arrangements 202. Furthermore, the empty-container transport device 202t may extend through an opening in the side wall of the housing 202g and be configured such that a distance from the compactor arrangement 202 to a further compactor arrangement 202 or to another transport system can be bridged.

Furthermore, further housing parts may be installed, for example lateral housing parts, upper housing parts, etc., as illustrated for example in FIG. 9C.

FIG. 6 illustrates a compactor arrangement 202 in a schematic illustration, for example during transport, for example before being set up.

The compactor arrangement 202 may be of modular design, for example as described above. Owing to a modular design, in particular of the framework arrangement 204 and/or of the flap arrangement 418, the compactor arrangement 202 can be transported and set up in a simple manner During transport, the compactor arrangement 202 can be reduced to a small volume by means of a small number of installation steps. In an analogous manner, the compactor arrangement 202 can be set up by means of a small number of installation steps.

As illustrated for example in FIG. 6, the flap arrangement 418, as described above, may be in the second open position 418c while the compactor arrangement 202 is transported to its set-up location and/or is transported away from its set-up location.

The cover plates 418 of the flap arrangement 418 can be held in this position by means of the fixing arrangement 418f or by means of a further fixing arrangement. Clearly, a fixing arrangement or multiple fixing arrangements may be configured for fixing the three cover plates 418 of the flap arrangement 418 in the second open position 418c.

In the second open position 418c, for example, a region of the support framework 204a in which the compactor 102 is arranged or can be received may be covered at least in certain sections by at least the first cover plate 418p-1. The electrical assembly 428 of the compactor arrangement 202 may for example be accessible irrespective of the position of the flap arrangement 418. The empty-container transport device 202t may for example be covered in certain sections; for example, direct access from the front may be prevented by means of the flap arrangement 418 when the latter is in the closed position 418a or in the second open position 408c but not prevented when the flap arrangement 418 is in the first open position 408b.

Through a modular design of the further components of the compactor arrangement 202, in particular of the electrical assembly 428, of the empty-container transport device 202t, of the compactor 102, etc., the compactor arrangement 202 can be serviced in a simple manner; for example, defective components can be easily exchanged, contaminated parts can be easily cleaned, etc.

FIG. 7a to FIG. 7C illustrate a compactor arrangement 202 in various illustrations, for example during the setting-up or installation of the multiple compactor arrangements 202.

FIG. 8A to FIG. 8C illustrate two compactor arrangements 202 (for example a double module 202d or a compactor arrangement assembly 502) in various illustrations, for example during the setting up or installation of the two compactor arrangements 202.

FIG. 9A to FIG. 9C illustrate four compactor arrangements 202 (for example two double modules 202d or a compactor arrangement assembly 502) in various illustrations, for example during the setting up or installation of the four compactor arrangements 202.

FIG. 7A, FIG. 8A and FIG. 9A each show, by way of example, one or more compactor arrangements 202 placed on the ground (see also FIG. 6, for example). In this case, the support framework 204a of the framework arrangement 204 may have multiple hollow profiles 204h. These hollow profiles 204h are for example designed to match the support legs 204b of the framework arrangement 204 such that in each case one support leg 204b can be inserted through in each case one hollow profile 204h for the purposes of setting up the support framework 204a on the ground.

The support legs 204b may for example be moved through the multiple hollow profiles 204h by means of a lifting device 404h in order to raise the support framework 204a to a predefined height, as illustrated for example in each case in FIG. 7B, FIG. 8B and FIG. 9B.

The lifting device 404h may for example be configured such that a force is transmitted between the support framework 204a and the support legs 204b for the purposes of raising the support framework 204a. For this purpose, the lifting device 404h may for example be supported (for example plugged or placed) onto the multiple support legs 204b. The support framework 204a may for example have a suspension structure for the coupling of the lifting device (for example by means of a traction mechanism, for example a cable, a chain, etc.), such that the support framework 204a can be raised by means of the lifting device 404h.

A connecting structure (e.g. bolts, screws, etc.) may be used to connect the support framework 204a to the multiple support legs 204b such that the support framework 204a is supported on the support legs 204b at the predefined height.

Furthermore, the support framework 204a may have a first support framework part and a second support framework part (for example a support frame 402t, as described above). Here, the compactor 102 of the compactor arrangement 202 may be arranged on the second support framework part. The first support framework part may be configured (see for example FIG. 4A, FIG. 4B and FIG. 5B) so as to form a receiving space for receiving the compactor 102 arranged on the second support framework part.

The compactor arrangement 202 may clearly be mounted (e.g. set up) for example in the following way: setting up a support framework 204a on an underlying surface, wherein the support framework 204a has multiple hollow profiles 204h; inserting multiple support legs 204b into the multiple hollow profiles 204h, wherein in each case one supporting leg 204b of the multiple supporting legs 204b is plugged into one hollow profile 204h of the multiple hollow profiles 204h; pushing the respective support legs 204b through the associated hollow profiles 204h in order to raise the support framework 204a to a predefined height; and connecting the support framework 204a to the multiple support legs 204b such that the support framework 204a is supported on the plurality of support legs 204b at the predefined height. Here, for the pushing of the support legs 204b through the hollow profiles 204h, a lifting force (generated for example by means of a traction device) may be generated between the support legs 204b and the support framework 204a.

The support framework 204a can clearly be set up in a self-lifting manner by means of the support legs 204b and the lifting device 404h.

FIG. 7C, FIG. 8C and FIG. 9C each show by way of example one or more set-up compactor arrangements 202 (see also for example FIGS. 5A to 5C and FIG. 6).

After the respective compactors 102 have been raised to a predefined height by means of the support framework 204a and the support legs 204b, further components of the compactor arrangement 202 may for example be installed. For example, the upper cover 408 of the respective compactor assembly 202 may be installed. Furthermore, a common empty-container transport device 202t may be installed. Furthermore, a housing 202g may be installed; for example, one or more housing parts may be installed. The housing may for example have lateral and/or upper housing parts.

As illustrated in FIGS. 8B and 9B, multiple compactor assemblies 202 may be installed using one common foot assembly 204f.

As illustrated in FIGS. 8B and 9B, it is for example possible for two coupled-together support frameworks 204a of two compactor arrangements 202 to be raised jointly. Six support legs 204b may be used for this purpose. The central two support legs 204b may then be uninstalled again, and the two compactor arrangements 202 may be set up by means of four support legs 204b.

As illustrated in FIG. 9A, the compactor arrangement 202 may be shipped, and for example transported by means of a lifting truck, with support legs 204b uninstalled.

The support framework 204a may for example be formed in two parts, that is to say have a first and a second support framework part. For example, the framework arrangement 204 may have the support framework 204a as first support framework part, as illustrated for example in FIG. 4A, and the framework arrangement 204 may also have the support frame 402t as second support framework part, as illustrated for example in FIG. 4B. The two support framework parts may for example be detachably coupled to one another, as shown for example in FIG. 6 and in FIGS. 7A to 9C.

The compactor 102 for compacting empty containers 104 may for example be arranged on the second support framework part, wherein the first support framework part 402t may be connected to the support legs 204b. Thus, for example, the compactor 102 can be exchanged without the rest of the compactor arrangement 202 being uninstalled. The compactor 102 can for example be lowered together with the second support framework part by means of a lifting device while the first support framework part remains set up by means of the support legs.

Installation of the compactor arrangement 202 may for example comprise the following: setting up a first support framework part, wherein the first support framework part has a receiving space for receiving a second support framework part; arranging the second support framework part below the receiving space, wherein a compactor is arranged on the second support framework part; introducing the compactor arranged on the second support framework part into the receiving space of the first support framework part; and subsequently fastening the second support framework part to the first support framework part by means of a detachable connection.

As described by way of example above (see for example FIG. 2A to FIG. 3B), the compactor arrangement 202, according to various embodiments, may have a selection device 202s. According to various embodiments, the selection device 202s may be installed on the support framework 204a, for example above the empty-container transport device 202t. As an alternative to this, the selection device 202s, according to various embodiments, may be designed as a function module (see for example FIGS. 4D and 11A to 11D).

Various embodiments of the selection device 202s in combination with a guard device 1002 will be described in detail below. This embodiment clearly results in at least two different operating modes for the compactor arrangement 202, a first operating mode (clearly a normal operating mode), in which empty containers 104 are selected by means of the selection device 202s and compacted, and a second operating mode (clearly an emergency operating mode), in which for example servicing of the compactor arrangement 202 can be performed, wherein, in the emergency operating mode, a guard device 1002 is used to prevent an encroachment into the compactor 102. It is clearly possible in the emergency operating mode for a user who is intending to perform the servicing of the compactor arrangement 202 to be protected by virtue of an anti-encroachment guard being provided. The compactor arrangement 202 can thus continue to maintain selected functions in the emergency operating mode; for example, the empty-container transport device 202t can continue to be operated in order to transport the empty containers 104 through the compactor arrangement 202 such that, for example, compactor arrangements 202 arranged in series (see FIG. 3A and FIG. 3B) do not have to be completely shut down while one of the compactor arrangements 202 is being serviced.

Figure 10A:
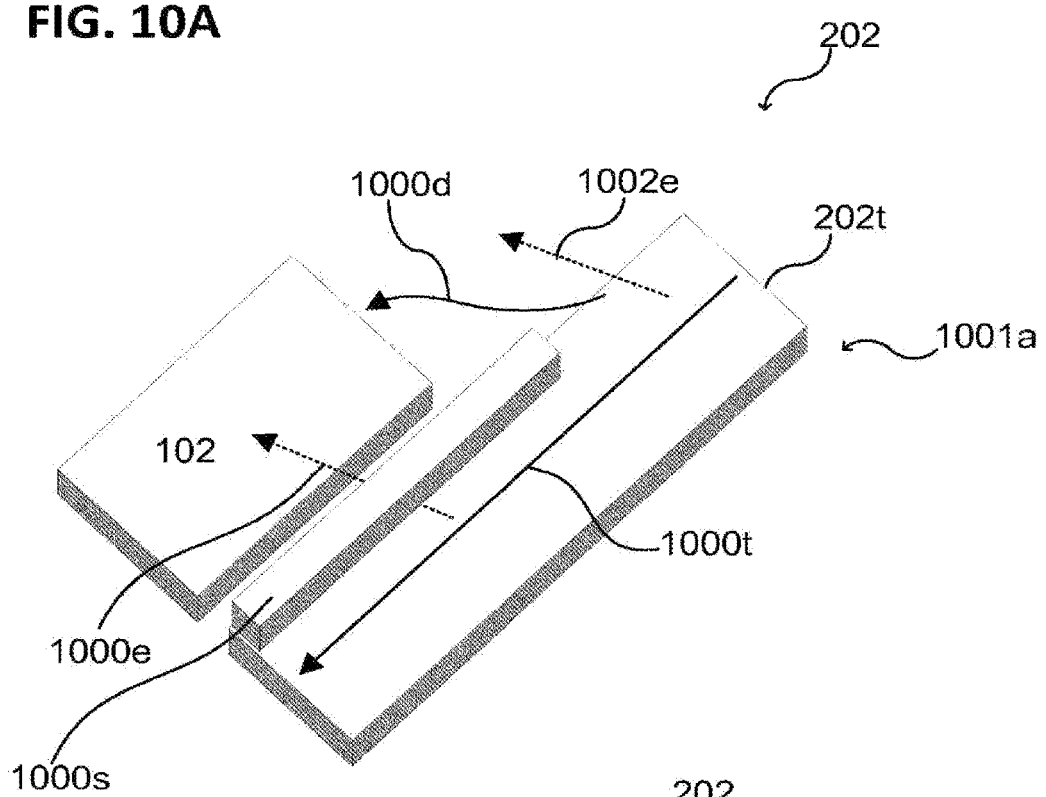
Figure 10B:
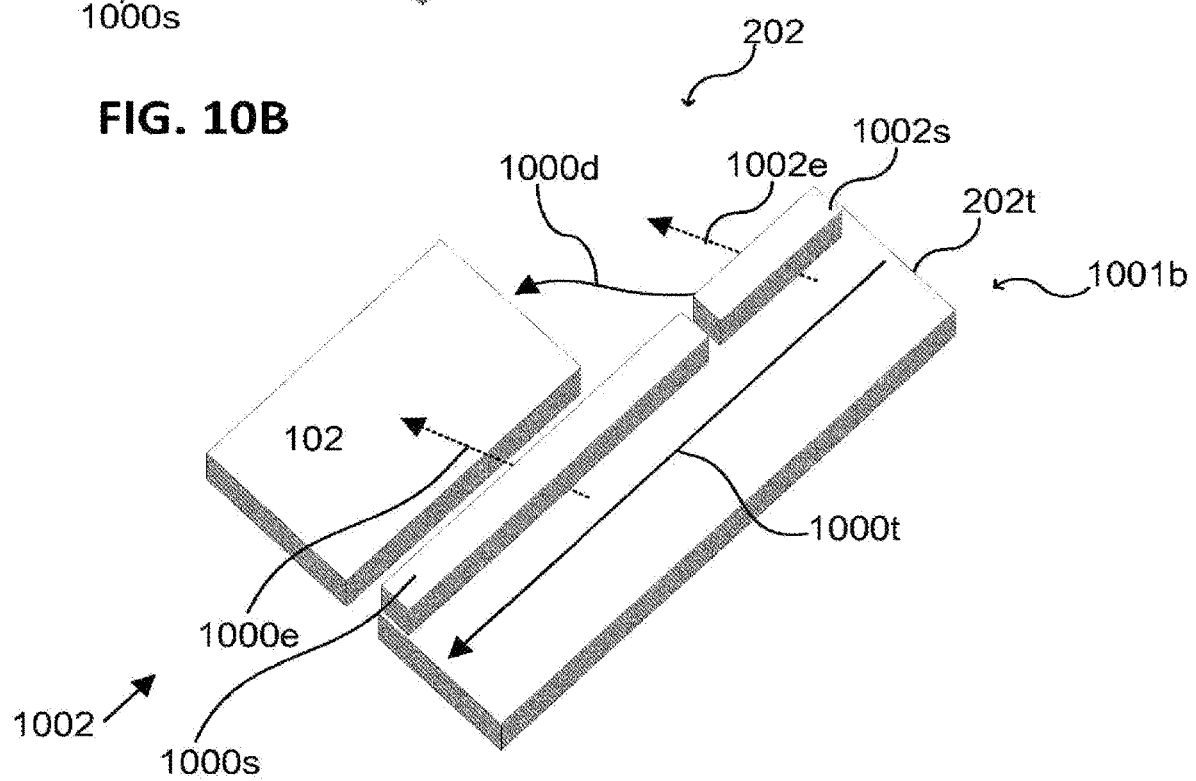

FIG. 10A and FIG. 10B illustrate a compactor arrangement 202 in in each case a schematic view, according to various embodiments.

The compactor arrangement 202 may for example have a compactor 102. Furthermore, the compactor arrangement 202 may have an empty-container transport device 202t. The empty-container transport device 202t is for example configured for transporting empty containers 104 in the compactor arrangement 202 in a transport region 1000t above the empty-container transport device 202t.

Furthermore, the compactor arrangement 202 may have a first anti-encroachment guard structure 1000s. The first anti-encroachment guard structure 1000s may for example be arranged so as to laterally delimit the transport region 1000t in certain sections. The first anti-encroachment guard structure 1000s may in this case be provided between the transport region 1000t and the compactor 102. The first anti-encroachment guard structure 1000s can clearly be provided such that, starting from the transport region 1000t, an encroachment 1000e (for example by the hand of a user) in the direction of the compactor 102 can be prevented. In this case, for example, an encroachment into the transport region 1000t may be possible when the upper cover 408 is open (see for example FIG. 4E and FIG. 9C).

The first anti-encroachment guard structure 1000s may for example define a feed region 1000d. This serves for the feed of empty containers 104 laterally out of the transport region 1000t to the compactor 102. As described herein, the empty containers 104 can for example be selectively fed to the compactor 102. For this purpose, use may be made of a selection device 202s as illustrated for example in FIG. 10C and FIG. 10D.

Furthermore, the compactor arrangement 202 may have a guard device 1002 which is configured such that an encroachment 1002e from the direction of the transport region 1000t into the feed region 1000d can be selectively prevented. For this purpose, the guard device 1002 may have a second anti-encroachment guard structure 1002s.

FIG. 10A illustrates for example a state of the compactor arrangement 202 in which the encroachment 1002e into the feed region 1000d is not prevented by means of a guard device 1002, for example in accordance with a first operating mode 1001a (clearly normal operation); and FIG. 10B illustrates for example the state of the compactor arrangement 202 in which the encroachment 1002e into the feed region 1000d is prevented by means of a guard device 1002, for example in accordance with a second operating mode 1001b (clearly an emergency operating mode).

Clearly, the first anti-encroachment guard structure 1000s and the second anti-encroachment guard structure 1002s of the guard device 1002 can functionally complement one another and thus provide complete protection against encroachment from the transport region 1000t in the direction of the compactor 102. A compactor 102, in particular its cutting unit and/or other rotating elements, may be a safety risk if it is freely accessible to the hands of a user during the operation of the compactor 102.

Figure 10C:
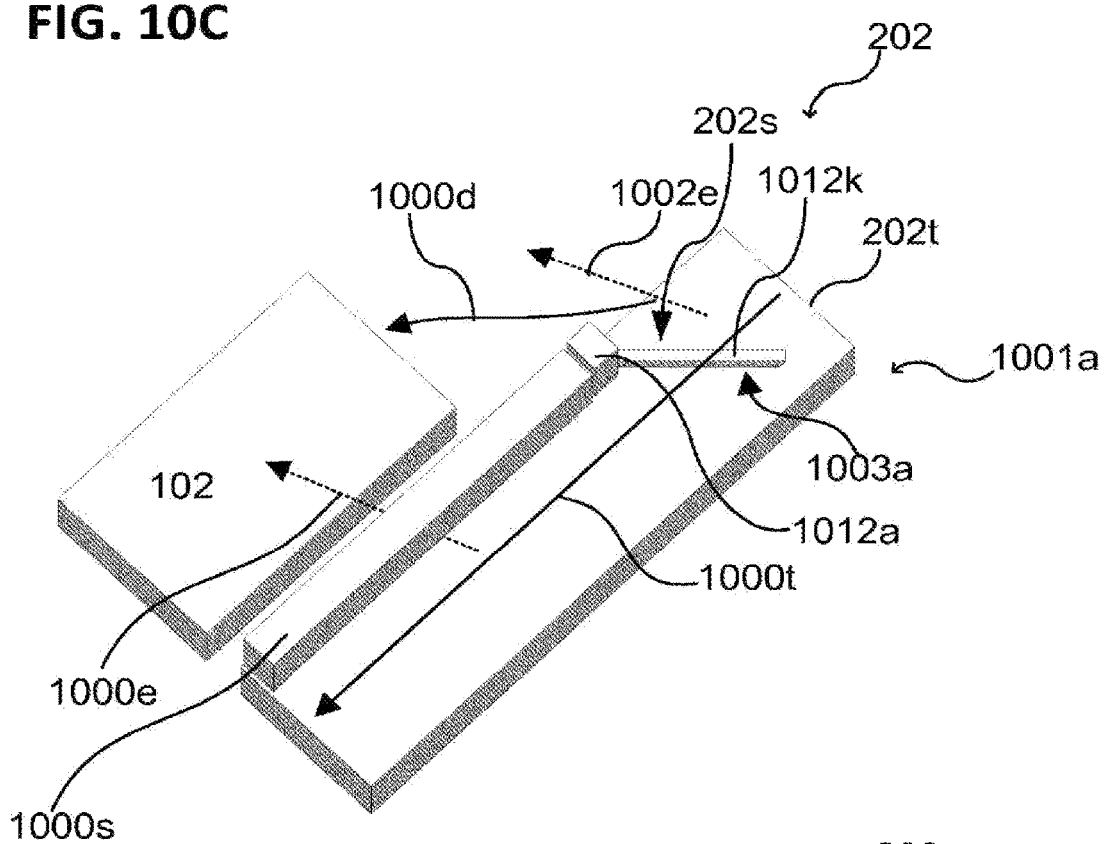
Figure 10D:
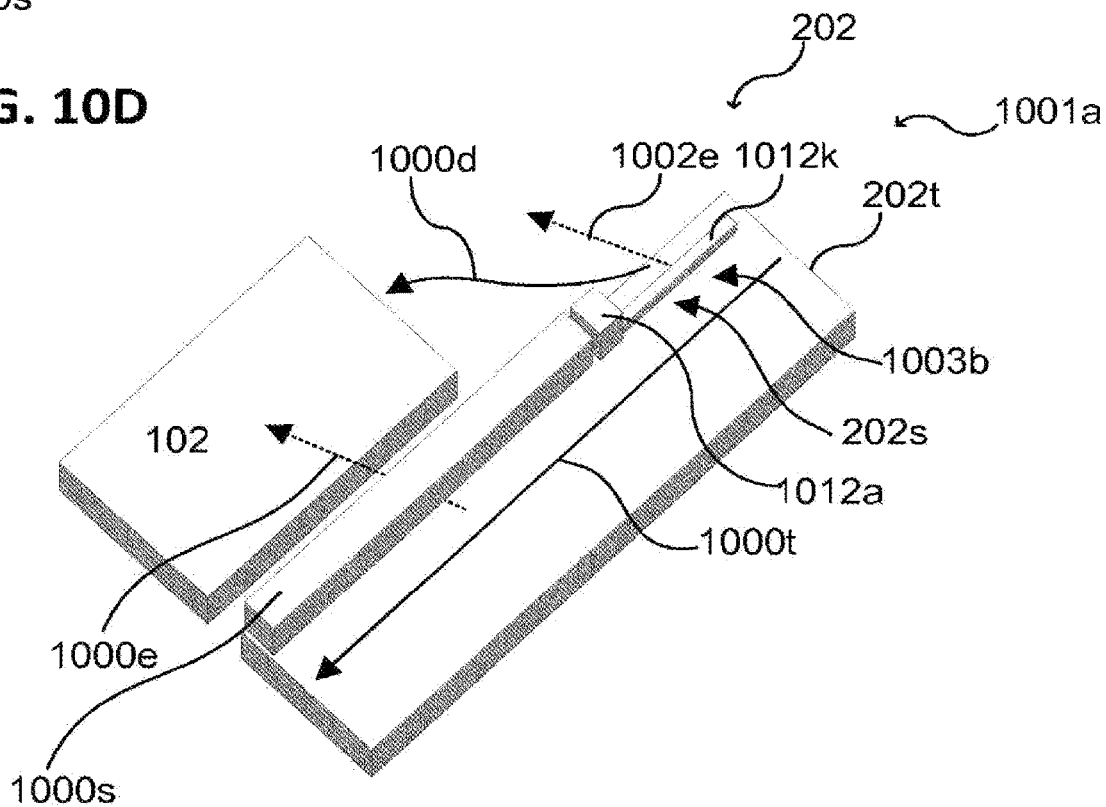

FIG. 10C and FIG. 10D illustrate a compactor arrangement 202, as described by way of example above, with a selection device 202s in each case in a schematic view, according to various embodiments.

In this case, the selection device 202s may be configured such that empty containers 104 can be selectively fed out of the transport region 1000t and through the feed region 1000d to the compactor 102.

For the selective feed of the empty containers 104 to the compactor 102, the selection device 202s may have a selection flap 1012k and an actuating drive 1012a for the movement of the selection flap 1012k. The selection flap 1012k can for example be brought into a first position 1003a and into a second position 1003b. The selection flap 1012k may for example be pivotably mounted and pivoted into the two positions 1003a, 1003b. Here, the selection device 202s may be configured such that, when the selection flap 1012*k* is in the first position 1003*a*, empty containers 104 being transported by means of the empty-container transport device 202*t* can be fed by means of the selection flap 1012*k* through the feed region 1000*d* to the compactor 102 (see for example FIG. 10C). Furthermore, the selection device 202*s* may be configured such that, when the selection flap 1012*k* is in the second position 1003*b*, empty containers 104 can be transported by means of the empty-container transport device 202*t* in the transport region 1000*t* through the compactor arrangement 202 (see for example FIG. 10D).

According to various embodiments, the selection device 202*s* may be configured such that the feed region 1000*d* is covered by the selection flap when the selection flap 1012*k* is in the second position 1003*b*.

According to various embodiments, the guard device 1002 may be installed as an alternative to the selection device 202*s*. For example, these may be of modular design and used alternatively, as will be described in detail below. Alternatively, the guard device 1002 and the selection device 202*s* may be installed independently of one another, see for example FIGS. 10E and 10F.

Figure 10E:
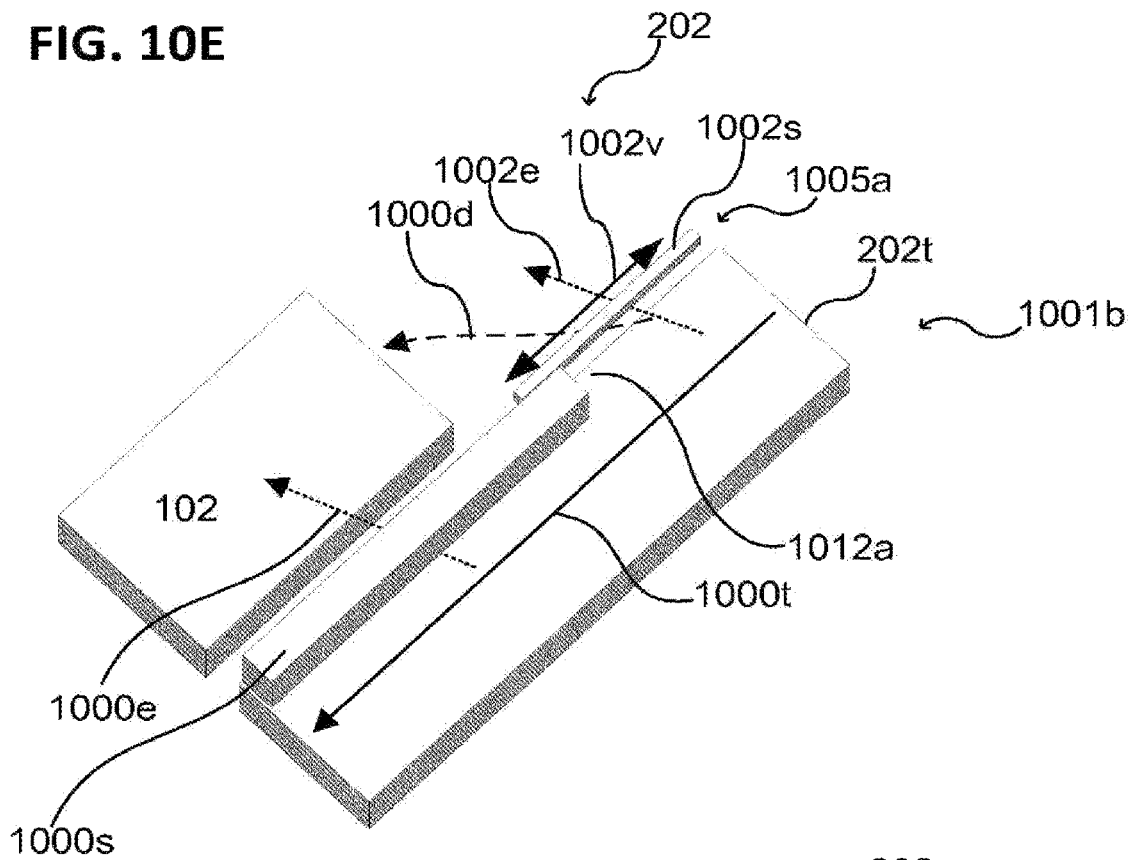
Figure 10F:
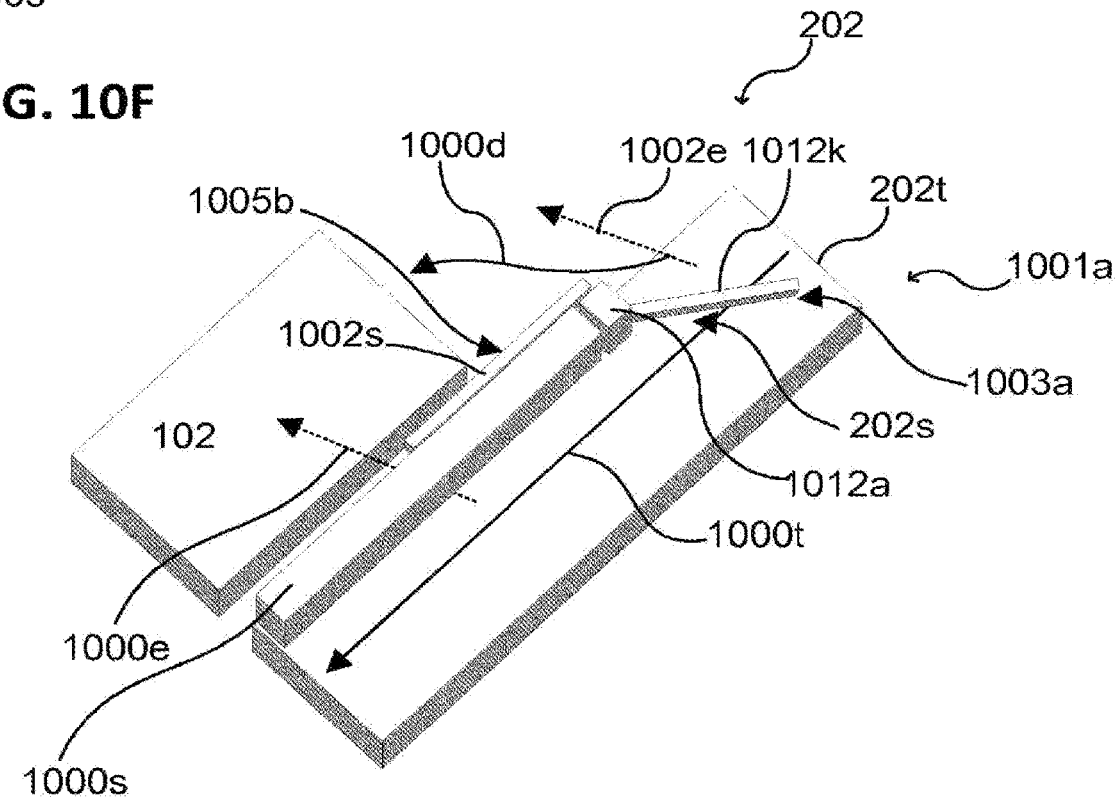

FIG. 10E and FIG. 10F illustrate a compactor arrangement 202, as described by way of example above, with a guard device 1002 in each case in a schematic view, according to various embodiments.

According to various embodiments, the second anti-encroachment guard structure 1002*s* of the guard device 1002 may be designed as a guard plate. The guard plate 1002*s* may be mounted so as to be movable 1002*v* such that it can be moved into a first position 1005*a* and a second position 1005*b*.

Here, the guard device 1002 may be configured such that the guard plate 1002*s*, for example in the first position 1005*a*, covers the feed region 1000*d* and/or is arranged in the feed region 1000*d* in order to prevent the encroachment from the direction of the transport region 1000*t* into the feed region. In this case, for example, the selection device 202*s* can be uninstalled while the feed region 1000*d* is covered by means of the guard plate 1002*s* of the guard device 1002, as illustrated by way of example in FIG. 10E.

Furthermore, the guard device 1002 may be configured such that the guard plate 1002*s*, for example in the second position 1005*b*, opens up the feed region 1000*d* or does not cover the feed region 1000*d* or is not arranged in the feed region 1000*d*. In this case, for example, the selection device 202*s* can be installed while the guard plate 1002*s* does not interfere with the operation of the selection device 202*s*, as illustrated by way of example in FIG. 10F.

According to various embodiments, the guard plate 1002*s* of the guard device 1002 may be configured such that it can be moved 1002*v* manually or automatically.

According to various embodiments, the compactor arrangement 202 can be operated in two different operating modes 1001*a*, 1001*b* (see for example FIGS. 10A to 10F). Here, the various positions 1003*a*, 1003*b*, 1005*a*, 1005*b* of the flap 1012*k* and the gaurd plate 1002*s* of the compactor arrangement 202 may be correspondingly adapted. In the first operating mode 1001*a*, for example, the empty containers 104 may be transported by means of the empty-container transport device 202*t* in the transport region 1000*t* and, by means of a selection device 202*s*, selectively led out of the transport region 1000*t* and through the feed region 1000*d* to the compactor 102. In the second operating mode 1001*b*, the empty containers 104 may be transported by means of the empty-container transport device 202*t* in the transport region 1000*t* through the compactor arrangement 202 (e.g. into a subsequent compactor arrangement 202, as illustrated for example in FIGS. 3A and 3B), and the feed region 1000*d* may be protected from an encroachment from the direction of the transport region 1000*t* by means of an anti-encroachment guard structure 1002*s* of a guard device 1002.

According to various embodiments, the selection device 202*s* may be configured as a function module of a function module arrangement. According to various embodiments, the selection device 202*s* and the guard device 1002 may be designed as function modules of a function module arrangement, as described in detail below.

As described by way of example above (see for example FIG. 4D), the compactor arrangement 202, according to various embodiments, may have a function module arrangement (also referred to as front assembly 4281), which may be part of the electrical assembly 428 or may be linked to the electrical assembly. The function module arrangement may for example be installed on the support framework 204*a*, for example above the empty-container transport device 202*t*.

The function module arrangement may have at least one function module which assumes the function of the previously described selection device 202*s* (referred to herein as selection module). The selection device 202*s* can thus be easily installed or uninstalled, for example by being plugged into a suitable module receptacle. In this case, the guard device 1002 may for example have a movably mounted second anti-encroachment guard structure 1002*s* (for example in the form of a guard plate) (see for example FIG. 10E and FIG. 10F). As an alternative to this, the function module arrangement may have at least two function modules, wherein one assumes the function of the above-described selection device 202*s* (referred to herein as selection module) and another assumes the function of the guard device 1002 described above (referred to herein as the guard module).

Various embodiments of the module receptacle and of the function modules of the function module arrangement will be described in detail below.

Figure 11A:
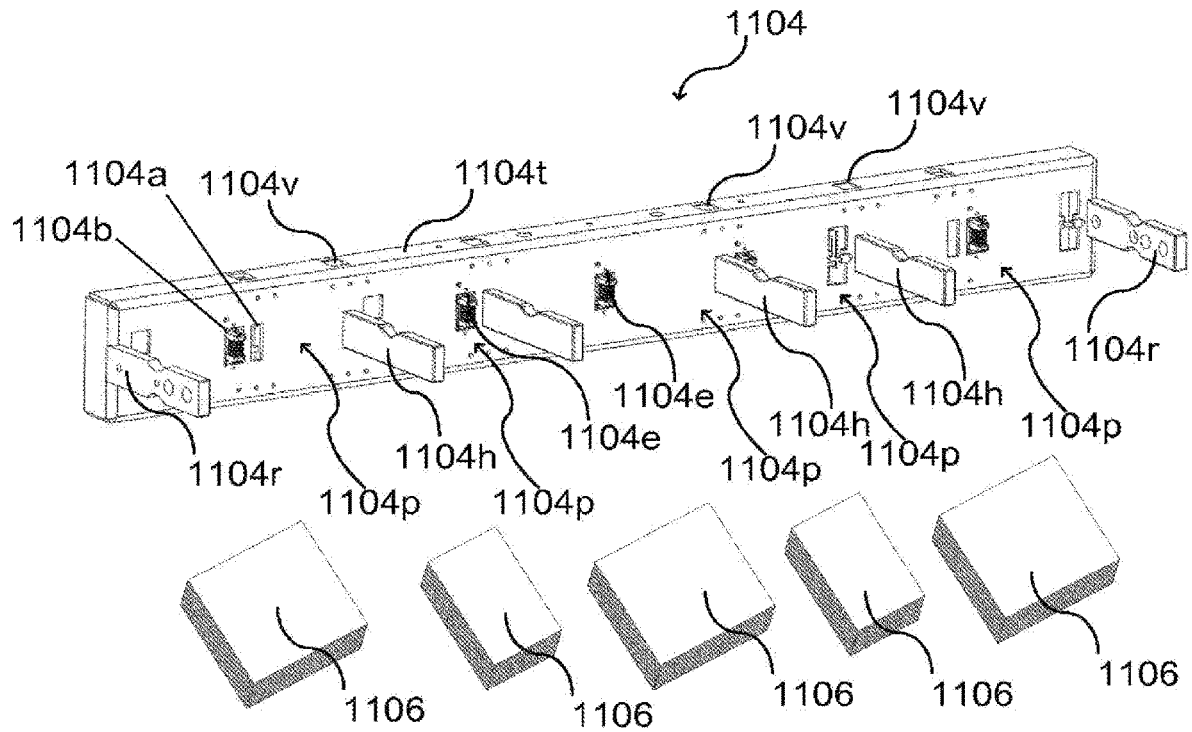
Figure 11B:
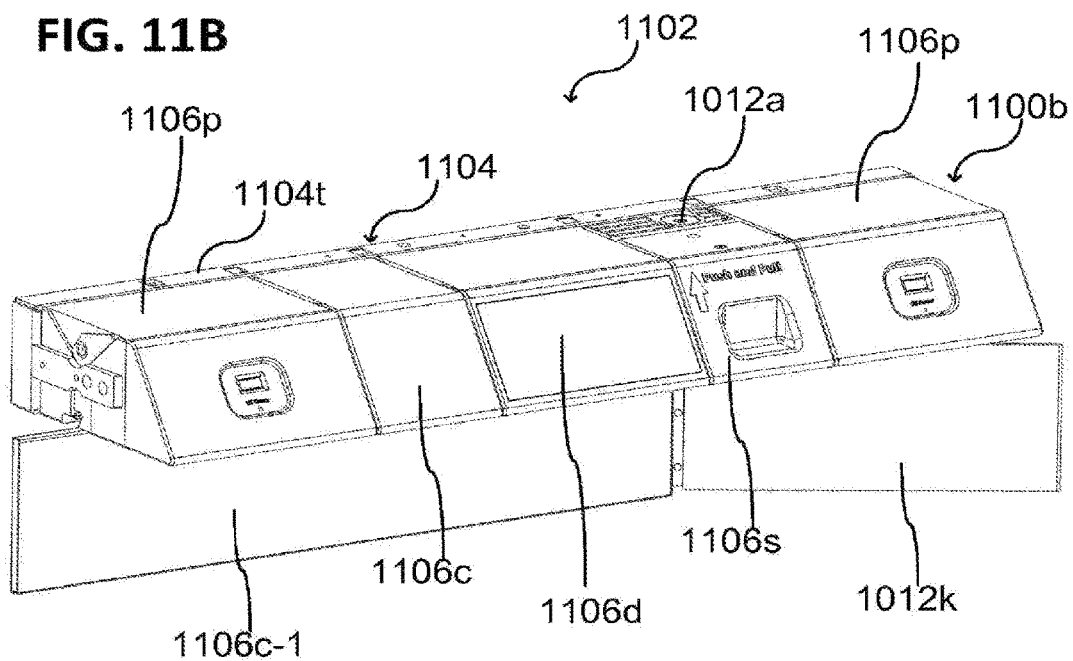
Figure 11C:
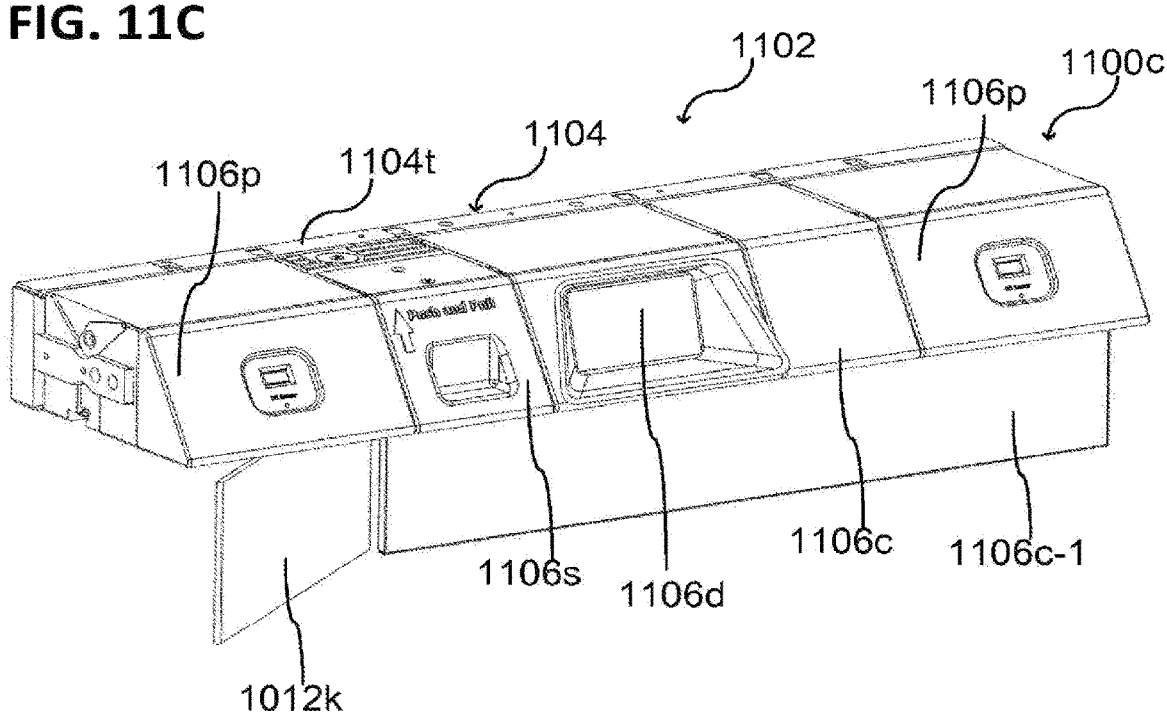
Figure 11D:
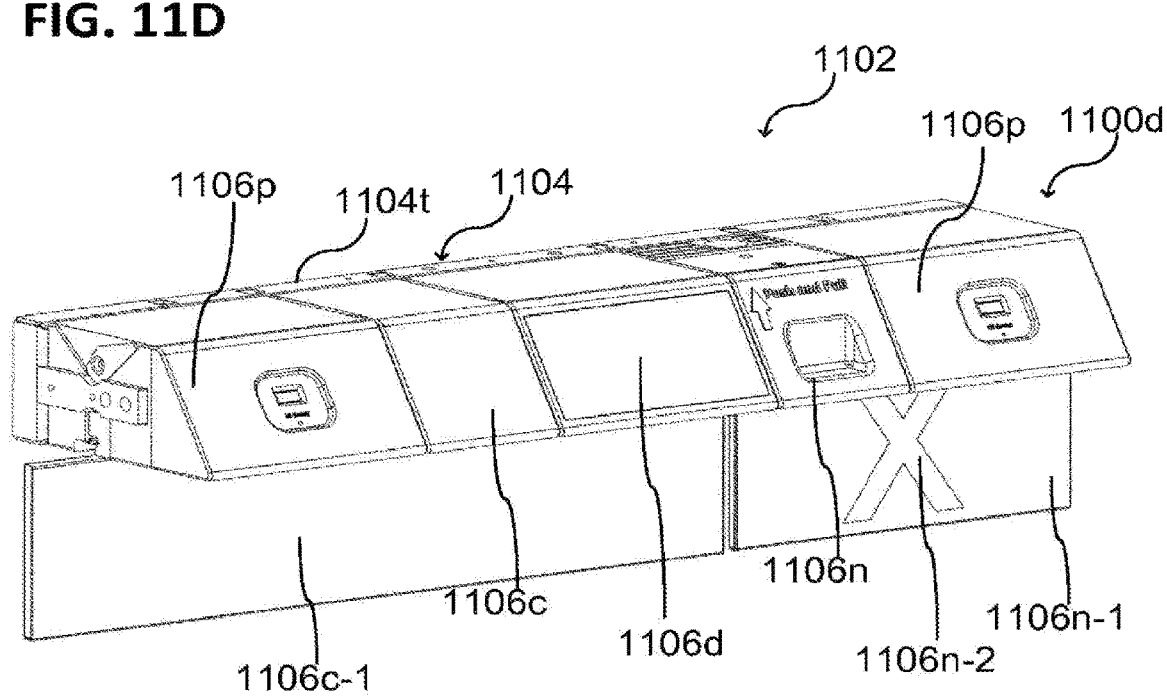

FIG. 11A illustrates by way of example a module receptacle 1104 of a function module arrangement 1102 in a schematic view, according to various embodiments. FIG. 11B to FIG. 11D each illustrate, by way of example, a function module arrangement 1102 with the module receptacle 1104 and function modules 1106 correspondingly received therein in various exemplary configurations 1100*b* to 1100*d*.

According to various embodiments, the function module arrangement 1102 may have a module receptacle 1104. The module receptacle 1104 may be configured such that multiple function modules 1106 can be received in the module receptacle 1104.

Furthermore, the function module arrangement 1102 may have the multiple function modules 1106, which are configured such that they can be received in the module receptacle 1104. A set of function modules 1106 can clearly be provided, wherein one or more of the function modules 1106 from the respective set of function modules 1106 can optionally be received in the module receptacle 1104.

Here, the module receptacle 1104 and the multiple function modules 1106 (for example the function modules 1106 from the set of function modules 1106) are provided such that the function modules 1106 can be received in the module receptacle 1104 in accordance with various configurations. For example, the number of function modules 1106 provided can clearly be greater than that which can be received in a configuration in the module receptacle 1104, such that this results in different configuration possibilities. Furthermore, the module receptacle 1104 may have different receptacle positions 1104p in which in each case one function module 1106 can be received. Thus, for example, different configurations can arise from the fact that a respective function module can be received in different receptacle positions 1104p in the module receptacle 1104.

According to various embodiments, the module receptacle 1104 may have a holder for respectively holding the function modules 1106 in a predefined receptacle position 1104p. The module receptacle 1104 may for example be provided in the form of a preconfigured or configurable carrier 1104t, as illustrated by way of example in FIG. 11A. For example, two outer holding elements 1104r may be fixedly or detachably installed on this carrier 1104t. Furthermore, the carrier 1104t may for example have predefined cutouts 1104a (for example through holes). By means of the cutouts 1104a in the carrier 1104t, one or more holding elements 1104h can be installed in different positions on the carrier 1104t. The respective holding element 1104h may be connected to the carrier 1104t by means of an automatically locking connection 1104v or in some other suitable manner, for example by means of a screw connection, etc.

Furthermore, the carrier 1104t may for example have predefined further cutouts 1104b (for example further through holes). By means of the further cutouts 1104b in the carrier 1104t, one or more elements 1104e of an electrical plug connection can be installed in different positions on the carrier 1104t. The respective element 1104e of the electrical plug connection may for example be connected to the carrier 1104t by means of an automatically locking connection or in some other suitable manner, for example by means of a screw connection, etc.

The module receptacle 1104 may clearly have corresponding electrical plug connection elements for the electrical contacting of the function modules 1106 received in the module receptacle 1104. The module receptacle 1104 may clearly have one or more electrical interfaces for supply to the function modules 1106 respectively received in the module receptacle 1104 and/or for communication (e.g. reading out, actuation etc.) with the respective function modules 1106 received in the module receptacle 1104.

As illustrated for example in FIG. 11A, the module receptacle 1104 may correspondingly have, between the holding elements 1104r, 1104h, multiple receptacle positions 1104p for receiving (e.g. plug-in positions for plugging in) multiple function modules 1106, wherein in each case only one function module 1106 can be received in one of the receptacle positions 1104p. The module receptacle 1104 and the function modules 1106 are designed to match one another. The receptacle positions 1104p of the module receptacle 1104 may for example be adapted to the function modules 1106 to be received, for example by adaptation of the holding elements 1104h and/or of the elements 1104e of the electrical plug connection.

According to various embodiments, the function modules 1106 may each have a further element of the electrical plug connection, such that the function modules 1106 can be correspondingly electrically contacted by means of the electrical plug connection in the receptacle positions 1104p.

According to various embodiments, the elements 1104e of the electrical plug connection may be configured such that function modules 1106 of different types (e.g. all function modules 1106 of the set of function modules 1106) can be plugged onto them.

According to various embodiments, the module receptacle 1104 may have corresponding electrical interfaces for the electrical contacting of the function modules 1106 received in the module receptacle 1104, for example based on the elements 1104e of the electrical plug connection. By means of the electrical interfaces, communication between at least one processor (e.g. of a suitable control device) and the respective function modules 1106 and/or communication between the function modules 1106 themselves can be provided (the electrical interfaces can clearly be configured as data and/or communication interfaces). Alternatively, the communication between the respective function modules 1106 themselves and/or between at least one processor and the respective function modules 1106 may be provided by means of a wireless interface (e.g. by means of a radio interface).

Furthermore, the electrical interfaces may be used to provide a power supply for the function modules 1106 respectively received in the module receptacle 1104.

According to various embodiments, at least one processor may be used which may be configured to ascertain an actual configuration of the plurality of configurations and to selectively operate the function module arrangement 1102 in one operating mode out of multiple operating modes on the basis of the ascertained actual configuration. According to various embodiments, an operating mode may be assigned to each configuration that results for the function module arrangement 1102 on the basis of the various combinations of function modules 1106 received in the module receptacle 1104.

The at least one processor may clearly be used to ascertain which configuration of the function modules 1106 is respectively present in the module receptacle 1104 after the corresponding function modules 1106 have been received in the module receptacle 1104. This respective configuration may be assigned an operating mode which may be selected on the basis of the ascertainment of the configuration.

The at least one processor may for example be arranged in an electrical box 428e of the compactor arrangement 202, be part of a set of control electronics, etc. The electrical box 428e may for example be arranged behind the function module arrangement 1102, as described above. Alternatively, the at least one processor may be integrated in at least one of the function modules 1106. Furthermore, the at least one processor may be integrated into an external control device that is communicatively linked to the function module arrangement 1102.

According to various embodiments, it is for example possible for at least one function module or multiple function modules or all function modules of the multiple function modules 1106 to be assigned an item of operating information in accordance with the function thereof. It is thus possible for the at least one processor to be configured to ascertain the item of operating information of the at least one function module (or of the multiple function modules or all function modules) of the multiple function modules 1106 when (e.g. as soon as) this is received in the module receptacle 1104. It is thus possible for the function module arrangement 1102 to be operated for example on the basis of the ascertained at least one item of operating information.

According to various embodiments, the at least one processor may be configured so as to check the actual configuration, and/or identify changes in the configuration, in a predefined time interval. If a change in the configuration is identified, the operating mode can be correspondingly changed if necessary.

As illustrated by way of example in FIG. 11A, the module receptacle 1104 may be configured to receive multiple function modules 1106. The module receptacle 1104 may be configured to mechanically hold the function modules 1106 and fix them in a predefined position. According to various embodiments, the module receptacle 1104 and the function modules 1106 may be designed as a plug-in system, wherein the module receptacle 1104 has multiple plug-in positions 1104*p* into which the respective function modules 1106 can be plugged. Here, a plug-in function module 1106 may be fixed in the respective plug-in position by means of a quick-action fastener (e.g. by means of an automatically locking connection, which can for example be manually released).

The function module arrangement 1102 may clearly be configured such that it can be brought into different configurations on the basis of the combination of different function modules 1106. The respectively set configuration (which may correspond to an operating mode) can in this case be automatically identified, and the operation of the function module arrangement 1102 can be performed in accordance with the identified configuration. It is thus for example possible to avoid a situation in which, after a change of the configuration of the function module arrangement 1102 and/or after initial construction of the function module arrangement 1102, this has to be manually programmed or an operating mode has to be manually selected.

According to various embodiments, the function module arrangement 1102 may be configured such that the operating mode is automatically set on the basis of the function modules 1106 used (that is to say received in the module receptacle 1104). This permits, for example, a change of the configuration in a simple manner, for example without the need for trained technical personnel. The function modules 1106 may be configured such that faulty operation of the function module arrangement 1102 is ruled out.

According to various embodiments, the configuration of the function module arrangement 1102 may be changed for example by virtue of a function module 1106 of a first function module type which is received in the module receptacle 1104 being exchanged for a function module 1106 of a second function module type (which differs from the first function module type). The configuration of the function module arrangement 1102 is thus clearly changed by virtue of at least one function of the function module arrangement 1102 being changed. According to various embodiments, the configuration of the function module arrangement 1102 may be changed for example by virtue of the relative arrangement of the function modules 1106 with respect to one another (for example the sequence thereof) being changed. It is clearly possible, for example, for an operating direction of the function module arrangement 1102 to be switched over, for example from right-handed operation to left-handed operation (see for example FIG. 11B and FIG. 11C). This may for example be helpful if the compactor arrangement 202 is to be integrated into a compactor means 300 with multiple compactor arrangements 202, as described above. For example, two compactor arrangements 202 arranged back-to-back may have opposite operating directions, that is to say one of the two compactor arrangements 202 is in left-handed operation and the other of the two compactor arrangements 202 is in right-handed operation.

At least one processor may be used for the automatic adaptation and/or for the automatic selection of an operating mode of the function module arrangement 1102 on the basis of the respective configuration, which may be defined by the function modules 1106 respectively received in the module receptacle 1104. Any suitable electronic circuit (based on analog or digital data processing) may be used as processor, for example a conventional computer processor, an application-specific integrated circuit (ASIC), etc. A suitable computer system may clearly be used as a central or peripheral open-loop and/or closed-loop control means. In general, the functions respectively described herein may be implemented by means of a single processor or using multiple processors. Here, the at least one processor may also be assigned at least one memory, or the at least one processor may have a memory.

According to various embodiments, the item of operating information may be suitably encoded or stored in the respective function module 1106. The item of operating information may for example represent a function module type of the respective function module 1106, such that this can be identified. Furthermore, the item of operating information may represent an item of control information which is taken into consideration in the control of the compactor arrangement 202, for example in the actuation of the respective function modules 1106, in the actuation of a compactor 102 of the compactor arrangement 202 etc.

FIG. 11B and FIG. 11C each illustrate a function module arrangement 1102 in a schematic view, according to various embodiments. The function module arrangement 1102 may for example have multiple mutually different types of function modules 1106 which are received simultaneously in the module receptacle 1104, for example in accordance with a first configuration 1100*b* and in a second configuration 1100*c*.

The function module arrangement 1102 has for example a selection module 1106*s* (also referred to as sorting module or modular sorting assembly), for example as a function module 1106 of a first function module type. According to various embodiments, the selection module 1106*s* may be configured such that empty containers 104 being led in the compactor arrangement 202 by means of the empty-container transport device 202*t* are selected, for example for the selective feed of the empty containers 104 into the compactor 102. Here, the empty containers 104 may for example be classified and correspondingly selected as has been described above with reference to the selection device 202*s*.

The selection module 1106*s* may for example be plugged into the module receptacle 1104. Here, the plugging-in movement may be secured against inadvertent pulling-out by fixing by means of a locking means with blocking action. The selection module 1106*s* may for example be arranged above the empty-container transport device 202*t* when this has been plugged into the module receptacle 1104.

Here, empty containers 104 can be selectively led from the empty-container transport device 202*t* into the compactor 102 of the compactor arrangement 202 by means of a pivotably mounted selection flap 1012*k* (also referred to as sorting paddle or sorting flap) of the selection module 1106*s*. The selection flap 1012*k* may for example be driven by means of an electric motor as actuating drive 1012*a*, for example between a first position (see FIG. 11B and FIG. 11C) and a second position (see FIG. 11D).

The selection module 1106*s* may be contacted by means of an electrical plug connection when said selection module has been received in the module receptacle 1104, see FIG. 11B. Here, the electrical plug connection can for example ensure multiple functions. Firstly, the supply of power to and the actuation of the selection flap 1012*k* of the selection module 1106*s* itself may be performed via the electrical plug connection. Secondly, it is for example possible for an item of operating information of the selection module 1106*s* to be transmitted (for example to the at least one processor or to another of the function modules 1106 received in the module receptacle 1104), as described above. Here, the item of operating information may for example represent the presence of the selection module 1106s and/or the type thereof.

On the basis of the item of operating information of the selection module 1106s, it is for example possible for the cutting unit of the compactor 102 of the compactor arrangement 202 to be deactivated, for example if the selection module 1106s is not received in the module receptacle 1104 (clearly if the selection module 1106s is not present). On the basis of the item of operating information of the selection module 1106s, it is for example possible for an operating state of the function module arrangement 1102 to be selected and set. Here, on the basis of the item of operating information, it is furthermore possible for the operation of the function module arrangement 1102 to be adapted with regard to whether it is right-handed operation (e.g. with the selection module type in right-handed configuration as illustrated in FIG. 11C) or left-handed operation (e.g. with the selection module type in left-handed configuration as illustrated in FIG. 11B).

According to various embodiments, the module receptacle 1104 and the function modules 1106 may have a symmetrical construction with respect to the arrangement of the selection module 1106s, such that it is for example possible in a simple manner to switch over between the two configurations 1100b, 1100c illustrated in FIG. 11B and FIG. 11C (clearly between the right-handed and the left-handed configuration). It is clearly possible for a selection module 1106s to be arranged in a different receptacle position 1104p of the module receptacle 1104 in the left-handed configuration than in the right-handed configuration, wherein it is for example also possible for the selection module 1106s itself to be correspondingly designed as a left-handed selection module 1106s (e.g. a selection module of a first selection module type) or right-handed selection module 1106s (e.g. a selection module of a second selection module type).

It is clearly possible for the right-handed and the left-handed configuration to differ in terms of the discharge direction for the empty containers 104. Here, the function module arrangement 1102 can be operated either in the right-handed configuration or in the left-hand configuration, which may be ascertained on the basis of the respective selection module type of the selection module 1106s received in the module receptacle 1104.

Furthermore, the function module arrangement 1102 may have a selection information module 1106c (also referred to as encoder module or modular encoder assembly).

On the basis of the right-handed/left-handed configuration with respect to the selection module 1106s, it is possible, according to various embodiments, for the receptacle position 1104p for the selection information module 1106c to be predefined if it is the intention to realize a symmetrical construction. It is clearly possible for the same receptacle position 1104p of the module receptacle 1104 to be used both for the selection module 1106s and for the selection information module 1106c.

According to various embodiments, the selection information module 1106c may provide an item of selection information as an item of operating information, which may specify the actuation and/or the operation of the selection module 1106s. For example, the item of selection information provided by the selection information module 1106c may define what class (type, material, color, etc.) of empty containers 104 is to be selected by means of the selection module 1106s. According to various embodiments, the set of function modules 1106 may, for each class of empty containers 104 to be distinguished, have a selection information module 1106c assigned to the class. It is thus possible, for example by virtue of the respective selection information module 1106c being introduced into the module receptacle 1104, to set which class of empty containers 104 is to be compacted by means of the compactor 102 of the compactor arrangement 202.

By means of the electrical plug connection as described above, it is possible for an electrical power supply for the selection information module 1106c to be provided if required. Furthermore, it is for example possible for an item of operating information of the selection information module 1106c to be transmitted (for example to the at least one processor or to another of the function modules 1106 received in the module receptacle 1104). Here, the item of operating information may for example represent the presence of the selection information module 1106c and/or the item of selection information thereof.

According to various embodiments, the selection information module 1106c may optionally have a visual display 1106c-1. It is thus possible, for example, to display what class of empty containers 104 is respectively selected, for example clear plastic, coloured plastic, cans, glass, etc. The visual display 1106c-1 of the selection information module 1106c may for example be provided by means of a plate which has illumination channels for displaying the operating state. According to various embodiments, a fill level of a collecting vessel 152 which is assigned to the function module arrangement 1102 may be displayed by means of the visual display 1106c-1.

According to various embodiments, the visual display 1006c-1 may be the first anti-encroachment guard structure 1000s described herein or may form at least a part of the first anti-encroachment guard structure 1000s. It is thus for example also possible for the first anti-encroachment guard structure 1000s to be exchanged in modular fashion and/or correspondingly adapted in a simple manner to a change in the configuration of the compactor arrangement 202.

According to various embodiments, the function module arrangement 1102 may have one peripheral module 1106p or two (e.g. symmetrically arranged) peripheral modules 1106p. Here, the one peripheral module 1106p or at least one of the two peripheral modules 1106p may have at least one sensor (also referred to herein as sensor module 1106p).

According to various embodiments, two peripheral modules 1106p, as illustrated for example in FIGS. 11B and 11C, may be positioned at the outer edge of the module receptacle 1104. The two peripheral modules 1106p may be arranged in mirror-symmetrical fashion and of identical construction.

The respective peripheral module 1106p may for example have sensor means (e.g. one or more sensors). The sensor means may be configured to detect a passage of an empty container 104, for example on the basis of ultrasound and/or transmitted light.

According to various embodiments, the sensor means may, in the peripheral module 1106p, be surrounded by a module housing, that is to say said sensor means is clearly not exposed and is thus protected against access.

According to various embodiments, it is furthermore possible for a sensor means for an automatic opening and/or closing of the upper cover 408 (for example on the basis of gesture control etc.), as described above, to be provided in at least one of the peripheral modules 1106p.

By means of the electrical plug connection as described above, it is possible for an electrical power supply for the respective peripheral module 1106p to be provided if required. Furthermore, it is for example possible for an item of operating information of the respective peripheral module 1106p to be transmitted (for example to the at least one processor or to another of the function modules 1106 received in the module receptacle 1104). Here, the item of operating information may for example represent the presence of the respective peripheral module 1106p and/or the sensor data etc. thereof.

According to various embodiments, the respective peripheral module 1106p may functionally supplement the respectively adjacent assembly, for example may functionally supplement the function of the selection module 1106s. For example, the operation of the respective selection module 1106s may be supplemented on the basis of the sensor data ascertained by the sensor means of the adjacent peripheral module 1106p. It is thus for example possible for empty containers 104 to be selectively compacted in accordance with the class defined by the selection information module 1106c and on the basis of the sensor data.

According to various embodiments, the respective peripheral module 1106p may have structural space for further functional elements (e.g. a sensor, an open-loop controller, a closed-loop controller, a safety circuit etc.) and, as required, the respective further functional elements.

According to various embodiments, the respective peripheral module 1106p may be configured so as to assume the functions of the selection information module 1106c. In this case, it is for example possible to use two peripheral modules 1106p, wherein one peripheral module 1106p is configured so as to assume this function of the selection information module 1106c, as described above. Here, the peripheral module 1106p which assumes the function of the selection information module 1106c may be arranged in the receptacle position 1104p provided for the selection information module 1106c.

According to various embodiments, the respective peripheral module 1106p may have an illumination means which may be designed such that an operating mode of the function module arrangement 1102 or of the compactor arrangement 202 can be displayed, for example in color-coded fashion.

According to various embodiments, the first anti-encroachment guard structure 1000s or at least a part of the first anti-encroachment guard structure 1000s may be installed on the peripheral module 1106p.

According to various embodiments, the function module arrangement 1102 may have a display module 1106d. The display module 1106d may for example be arranged centrally in the module receptacle 1104, for example irrespective of the various configurations 1100b to 1100f of the function module arrangement 1102.

According to various embodiments, the display module 1106d may have a display (e.g. a TFT display etc.) or at least one or more illuminated panels for displaying a system status of an individual function module 1106 of the function module arrangement 1102 and/or a system status of the function module arrangement 1102 as a whole.

According to various embodiments, the first anti-encroachment guard structure 1000s or at least a part of the first anti-encroachment guard structure 1000s may be installed on the display module 1106d.

Instead of the display module 1106d, it is alternatively possible for a peripheral module 1106p to be received in the module receptacle 1104. Here, according to various embodiments, the same electrical interface may be used irrespective of the type of function module 1106 received.

FIG. 11D illustrates a function module arrangement 1102 in a further configuration 1100d, for example as an alternative to the configuration 1100b illustrated in FIG. 11B or analogously as an alternative to the configuration 1100c illustrated in FIG. 11C.

According to various embodiments, the function module arrangement 1102 may have a guard module 1106n. The guard module 1106n may, according to various embodiments, be received instead of a selection module 1106s in the module receptacle 1104. The guard module 1106n may clearly be a dummy module as a placeholder for a removed selection module 1106s. Here, the guard module 1106n may be configured so as to assume the function of the guard device described herein.

According to various embodiments, the guard module 1106n may be configured so as to block an access (also referred to as feed region 1000d) to a compactor 102 of the compactor arrangement 202 (e.g. to the cutting unit thereof). It is thus possible, for example, for inadvertent encroachment into the cutting unit of a compactor 102 of the compactor arrangement 202 to be prevented when, for example, the selection module 1106s is not received in the module receptacle 1104. Furthermore, the guard module 1106n may be configured so as to (e.g. laterally) delimit a transport region 1000t above the empty-container transport device 202t. For this purpose, the guard module 1106n may for example have a guard plate 1106n-1 which occupies substantially the same position as the pivotably mounted flap 1012k of the selection module 1106s when this has not been pivoted over the empty-container transport device 202t. The guard plate 1106n-1 may for example be rigidly installed. According to various embodiments, the guard plate 1106n-1 of the guard module 1106n may be the second anti-encroachment guard structure 1002s or form at least a part of the second anti-encroachment guard structure 1002s.

According to various embodiments, the guard module 1106n may provide an item of operating information which specifies the actuation and/or the operation of a compactor 102 of the compactor arrangement 202. For example, the item of operating information provided by the guard module 1106n may define that operation of the compactor 102 (e.g. the rotation of the cutting unit of the compactor 102) should be blocked when (e.g. as soon as and for as long as) the guard module 1106n is received in the module receptacle 1104.

By means of the electrical plug connection, as described above, it is for example possible for the item of operating information of the guard module 1106n to be transmitted (for example to the at least one processor or to another of the function modules 1106 received in the module receptacle 1104). Here, the item of operating information may for example be or represent the presence of the guard module 1106n.

Thus, for example in the event that the compactor 102 of the compactor arrangement 202 has pulled in a foreign body which has caused a defect at the cutting unit, the cutting unit can be deactivated by means of the insertion of the guard module 1106d into the module receptacle 1104, such that the compactor arrangement 202 itself can continue to be safely operated in a pass-through operating mode.

According to various embodiments, the function module arrangement 1102 may be configured such that the presence of the guard module 1106n is signaled, for example by means of the display module 1106d, etc. Furthermore, a message can be issued to servicing personnel if the guard module 1106n is introduced into the module receptacle 1104.

The operating state of the function module arrangement 1102 in the presence of the guard module 1106n may for example be displayed by the guard module 1106*n* itself. For this purpose, the guard module 1106*n* may have an illumination element 1106*n*-2 on the guard plate 1106*n*-1.

According to various embodiments, a function module 1106 received in the module receptacle 1104, multiple or all function modules 1106 received in the module receptacle 1104 may be connected by means of an interface (e.g. an electrical plug connection, as described above) to a set of control electronics (e.g. having the at least one processor or implemented in the at least one processor), which may for example be arranged in an electrical box.

FIG. 12 illustrates a schematic flow diagram of a method 1200 for operating a compactor arrangement 202, according to various embodiments. The method 1200 may for example comprise: in 1210, operating the compactor arrangement 202 in a first operating mode, comprising: in 1210*a*, transporting empty containers 104 by means of the empty-container transport device 202*t* in a transport region, and, in 1210*b*, selectively leading the empty containers 104 by means of a selection device 202*s* out of the transport region 1000*t* and through a feed region 1000*d* to a compactor 102 of the compactor arrangement 202; and, for example previously and/or subsequently, in 1220, operating the compactor arrangement 202 in a second operating mode, comprising: in 1220*a*, transporting empty containers 104 by means of the empty-container transport device 202*t* in the transport region 1000*t* through the compactor arrangement 202, and, in 1220*b*, safeguarding the feed region 1000*d* by means of an anti-encroachment guard structure 1002*s* against an encroachment from the direction of the transport region 1000*t*.

Furthermore, the method 1200 may comprise: switching from the first operating mode to the second operating mode, wherein the switching comprises: removing the selection device 202*s*, and installing the anti-encroachment guard structure 1002*s* such that a guard plate of the anti-encroachment guard structure 1002*s* covers the feed region 1000*d* and/or is arranged in the feed region 1000*d*.

Furthermore, the method 1200 may comprise: switching from the second operating mode to the first operating mode, wherein the switching comprises: removing the anti-encroachment guard structure 1002*s*, and installing the selection device 202*s*.

Furthermore, the method 1200 may comprise: switching from the first operating mode to the second operating mode, wherein the switching comprises: displacing a guard plate of the anti-encroachment guard structure 1002*s* such that this covers the feed region 1000*d* and/or is arranged in the feed region 1000*d*.

Furthermore, the method 1200 may comprise: switching from the second operating mode to the first operating mode, wherein the switching comprises: displacing a guard plate of the anti-encroachment guard structure 1002*s* such that the feed region 1000*d* is opened up.

Here, the method 1200 may furthermore comprise, in 1210: operating the compactor 102 to compact the empty containers 104 which are fed to the compactor 102 through the feed region 1000*d* by means of the selection device 202*s*. Here, the method 1200 may furthermore comprise, in 1220: deactivating the compactor 102.

According to various embodiments, the compactor 102 (e.g. the cutting unit thereof) may be deactivated as soon as the selection device 202*s* (e.g. the selection module 1106*s*) is uninstalled or removed. Subsequently, the guard device 1002 (e.g. the guard module 1106*n*) may be installed instead of the selection device 202*s* (e.g. plugged into the vacated receptacle position).

After the closure of the upper cover 408 (and e.g. also of the lower cover 418), the compactor arrangement 202 (or a double module 202*d* with two compactor arrangements 202, see for example FIG. 3A and FIG. 3B) can again be partially ready for operation. It is clearly possible, for example in the case of a double module 202*d*, for the compactor 102 on the opposite side to remain functional and also be operated. Here, filling and utilization of the collecting vessel 152 can be ensured. In the event of the exchange of a cutting unit or an exchange of a compactor of a double module 202*d*, it is also possible on the opposite side for the selection device 202*s* to be replaced by means of the guard device 1002. In this way, the entire double module 202*d* can be switched into an emergency operating mode (e.g. into a bypass operating mode). An exchange of a cutting unit or exchange of a compactor can thus be performed during ongoing operation of the compactor means 300.

According to various embodiments, only one compactor arrangement 202 of a double module 202*d* can be in the bypass operating mode. For example, in the bypass operating mode, empty containers cannot be compacted by means of the compactor arrangement 202, but can at least be led onward to a downstream compactor arrangement 202 and then compacted there.

Furthermore, the method may be configured as described herein with regard to the compactor arrangement 202 and the functioning thereof.

According to various embodiments, one function module 1106 of the function module arrangement 1102 or multiple or all function modules 1106 of the function module arrangement 1102 can be identified on the basis of an item of operating information. It is clearly possible, for example, for the respective type of the function module 1106 used (clearly the function thereof) to be ascertained on the basis of the item of operating information. On the basis of this, a corresponding operating mode for the function module arrangement 1102 can be selected, and/or the function module arrangement 1102 can be operated in the corresponding operating mode.

The item of operating information may be provided in any form on the basis of which the function modules 1106 can be identified. According to various embodiments, the item of operating information may be provided such that the respective function or the respective type of the function modules 1106 can be uniquely identified.

According to various embodiments, the item of operating information may be a pointer which refers to an associated table in which the items of operating information are stored.

According to various embodiments, the item of operating information may be implemented by means of a correspondingly configured electronic circuit (e.g. a control circuit) in the respective function module 1106. Here, the function module arrangement 1102 may be configured so as to be operated on the basis of the control circuit of one of the function modules 1106 received in the module receptacle 1104.

Figure 13A:
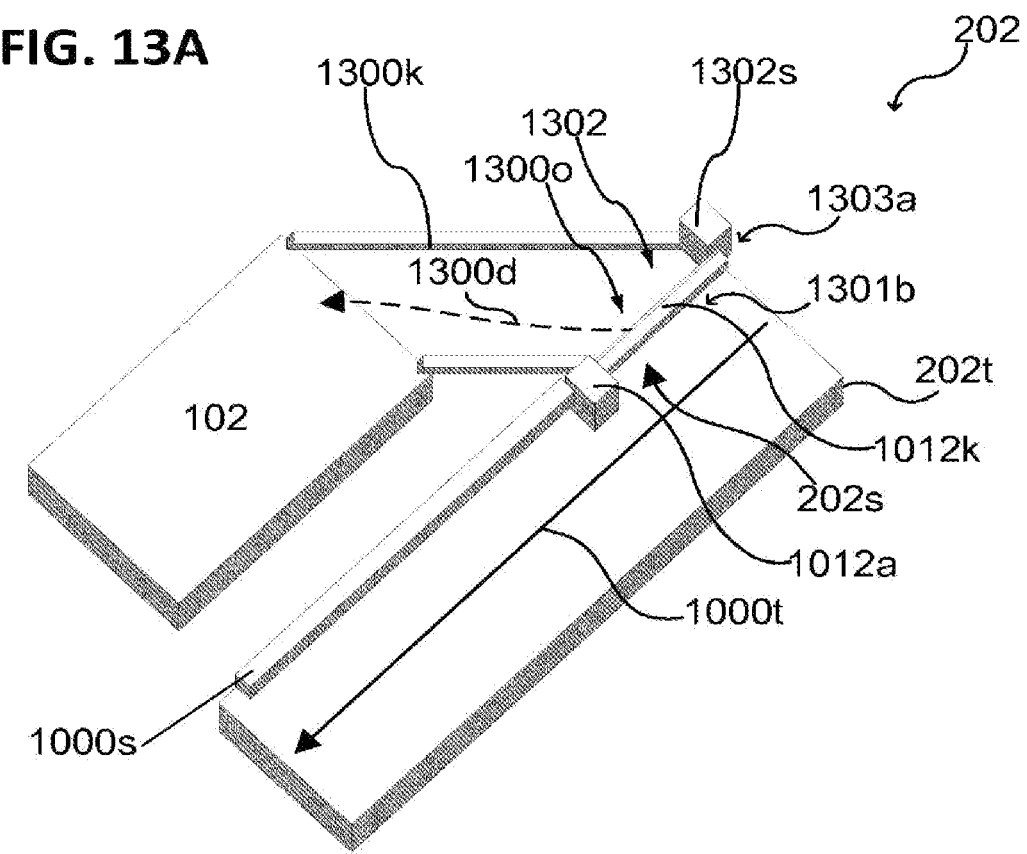
Figure 13B:
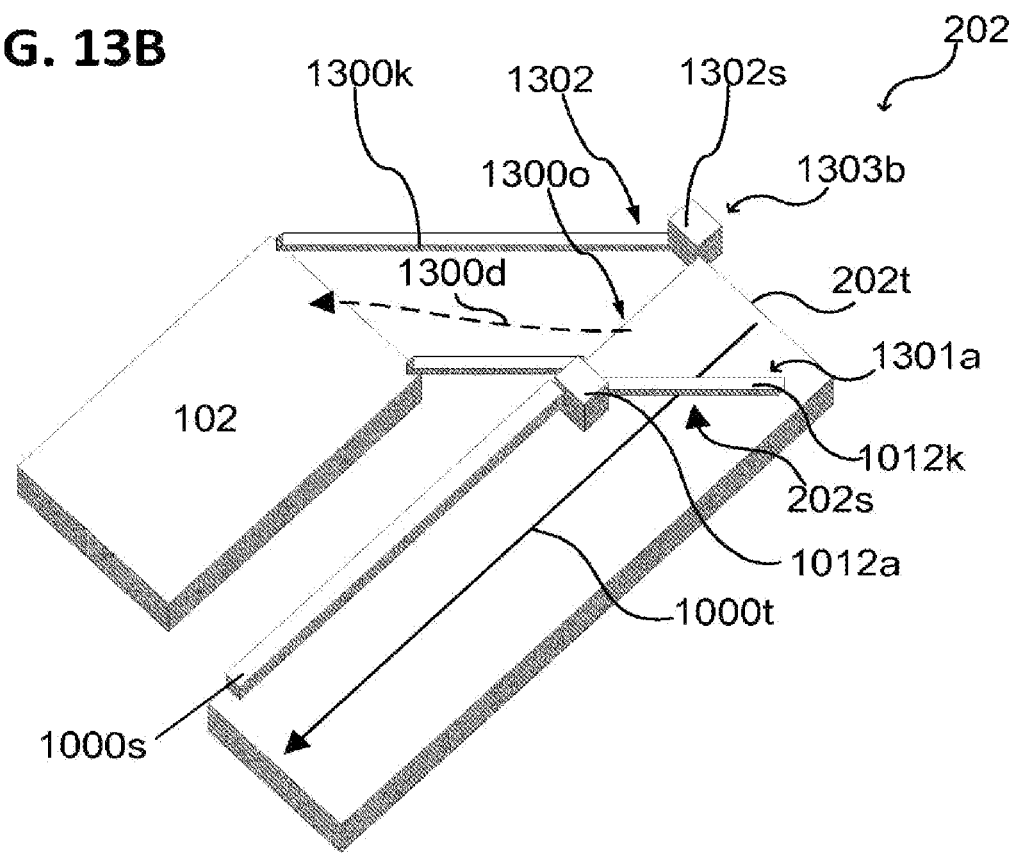

FIG. 13A and FIG. 13B illustrate a compactor arrangement 202 with an anti-manipulation guard device 1302 in various schematic illustrations, according to various embodiments.

The anti-manipulation guard device 1302 may be used for example for protecting a compactor arrangement 202 which is operated with a glass crusher 102-2 as compactor 102.

According to various embodiments, the compactor arrangement 202 may have the following: a compactor 102 (e.g. a glass crusher 102-2), an empty-container transport device 202*t* for transporting empty containers 104 in the compactor arrangement 202 in a transport region 1000*t* above the empty-container transport device 202*t*, a selection device 202*s* which is configured to selectively feed the empty containers 104 out of the transport region 1000*t* to the compactor 102.

According to various embodiments, the compactor arrangement 202 may have a feed channel 1300*k* which is provided between the compactor 102 and the empty-container transport device 202*t* such that the empty containers 104 that are to be selectively fed by means of the selection device 202*s* from the transport region 1000*t* to the compactor 102 can be led through an opening 1300*o* from the transport region 1000*t* into the feed channel 1300*k*. The empty containers 104 can be led out of the feed channel 1300*k*, for example through a further opening, into the compactor 102. Here, the feed channel 1300*k* may be substantially closed such that shards of compacted empty containers 104 composed of glass cannot pass to the outside (for example into a region which is accessible to a user of the compactor arrangement 202).

Within the feed channel 1300*k*, the empty containers 104 can for example be transported by means of a driven transport device to the compactor 102. As an alternative or in addition to this, a predefined path 1300*d* may be provided within the feed channel 1300*k* and/or by means of the feed channel 1300*k*, on which path the empty containers 104 are moved for example owing to the force of gravity. The feed channel 1300*k* may clearly have or be a chute. Alternatively to this, the feed channel 1300*k* may be configured such that the empty containers 104 can fall into it, for example in free fall.

The feed channel 1300*k* may for example be provided in the form of a correspondingly designed sheet-metal structure.

For the selection of the empty containers 104 out of the transport region 1000*t*, the selection device 202*s* may have a selection flap 1012*k* and an actuating drive 1012*a*. By means of the actuating drive 1012*a*, the selection flap 1012*k* can be moved, for example pivoted, into mutually different positions or settings. The selection flap 1012*k* can for example be moved into a first position 1301*a* and into a second position 1301*b*, for example by pivoting (as described by way of example above with regard to the positions 1003*a*, 1003*b* of the selection flap 1012*k* of the selection device 202*s*). The selection flap 1012*k* can clearly be opened and closed, wherein the first position 1301*a* is clearly an open position, in which the opening 1300*o* of the feed channel 1300*k* is not covered by the selection flap 1012*k*, and wherein the second position 1301*b* is clearly a closed position, in which the opening 1300*o* of the feed channel 1300*k* is covered by the selection flap 1012*k*.

According to various embodiments, the compactor arrangement 202 may have an anti-manipulation guard device 1302. This may for example have at least one sensor 1302*s* for detecting a leadthrough of empty containers 104 from the transport region 1000*t* through the opening 1300*o* into the feed channel 1300*k*.

According to various embodiments, compaction monitoring may be performed for the compactor 102 (e.g. a glass crusher 102-2) by means of two optical sensors. These may be arranged such that the empty containers 104 for compaction can be detected by each of the two sensors once in the correct sequence. By means of the two sensors, a time correlation can be calculated and evaluated. The sensors are for example installed so as to be safeguarded against manipulation.

According to various embodiments, the anti-manipulation guard device 1302 may be configured such that it can be verified whether empty containers 104 that are to be fed by means of the selection device 202*s* to the compactor 102 actually pass into the feed channel 1300*k*. Furthermore, the anti-manipulation guard device 1302 may be configured such that it is made impossible or difficult for empty containers 104 that have been led into the feed channel 1300*k* to be brought out of the feed channel 1300*k* again (clearly in the opposite direction).

According to various embodiments, the compactor arrangement 202 may have at least one processor for actuating the selection device 202*s* (e.g. on the basis of actuation data) and for receiving (e.g. for reading out) sensor data of the at least one sensor 1302*s*. Here, the at least one processor may be configured to ascertain an expected leadthrough of empty containers 104 through the opening 1300*o* into the feed channel 1300*k* on the basis of the actuation data. The selection flap 1012*k* can clearly be opened (that is to say not remain in the second position 1301*a*, or be brought into the first position 1301*b*) in order to select empty containers 104 from the transport device 202*t* and lead these through the opening 1300*o* into the feed channel 1300*k*. Furthermore, the at least one processor may be configured to verify the expected leadthrough of empty containers 104 through the opening 1300*o* into the feed channel 1300*k* on the basis of the at least one sensor 1302*s* (e.g. on the basis of the sensor data).

According to various embodiments, by means of the at least one processor, a verification message can be generated if an expected leadthrough of empty containers 104 through the opening 1300*o* into the feed channel 1300*k* is verified, and/or a manipulation message can be generated if an expected leadthrough of empty containers 104 through the opening 1300*o* into the feed channel 1300*k* cannot be verified. Various actions may be initiated on the basis of the verification or the verification message. For example, the operation of the compactor arrangement 202 may be stopped, an alarm signal may be generated, etc.

Figure 13C:
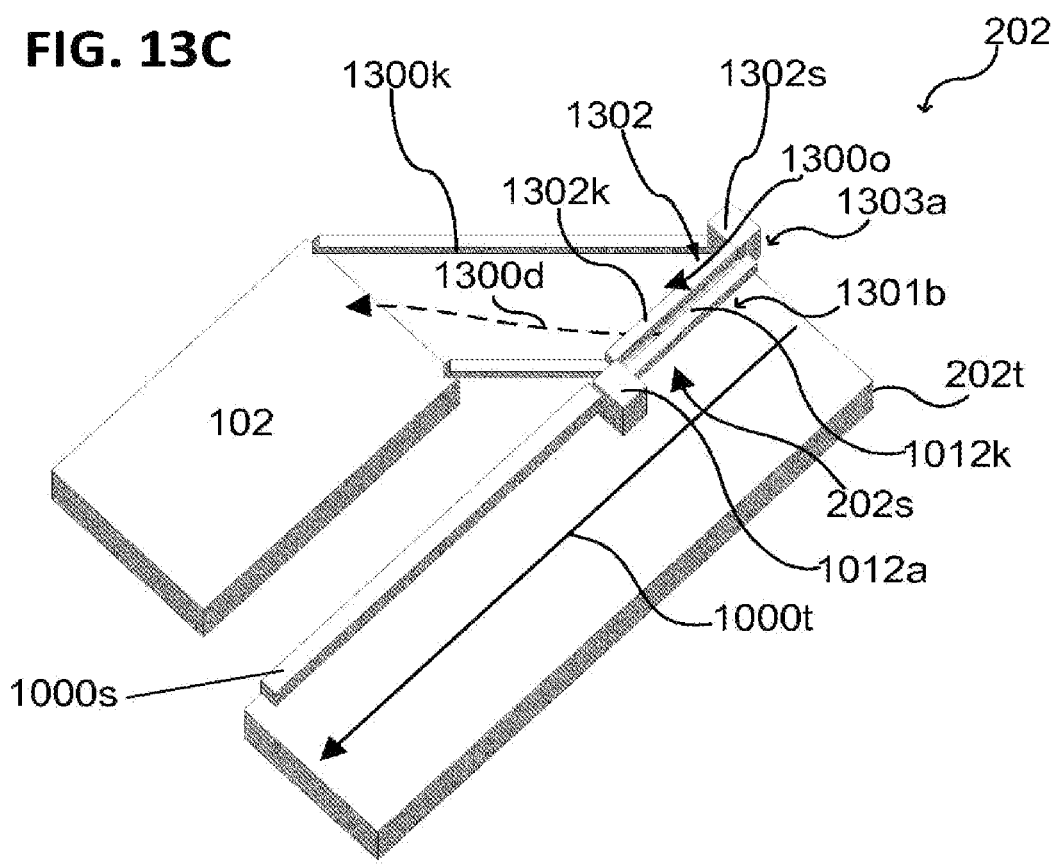
Figure 13D:
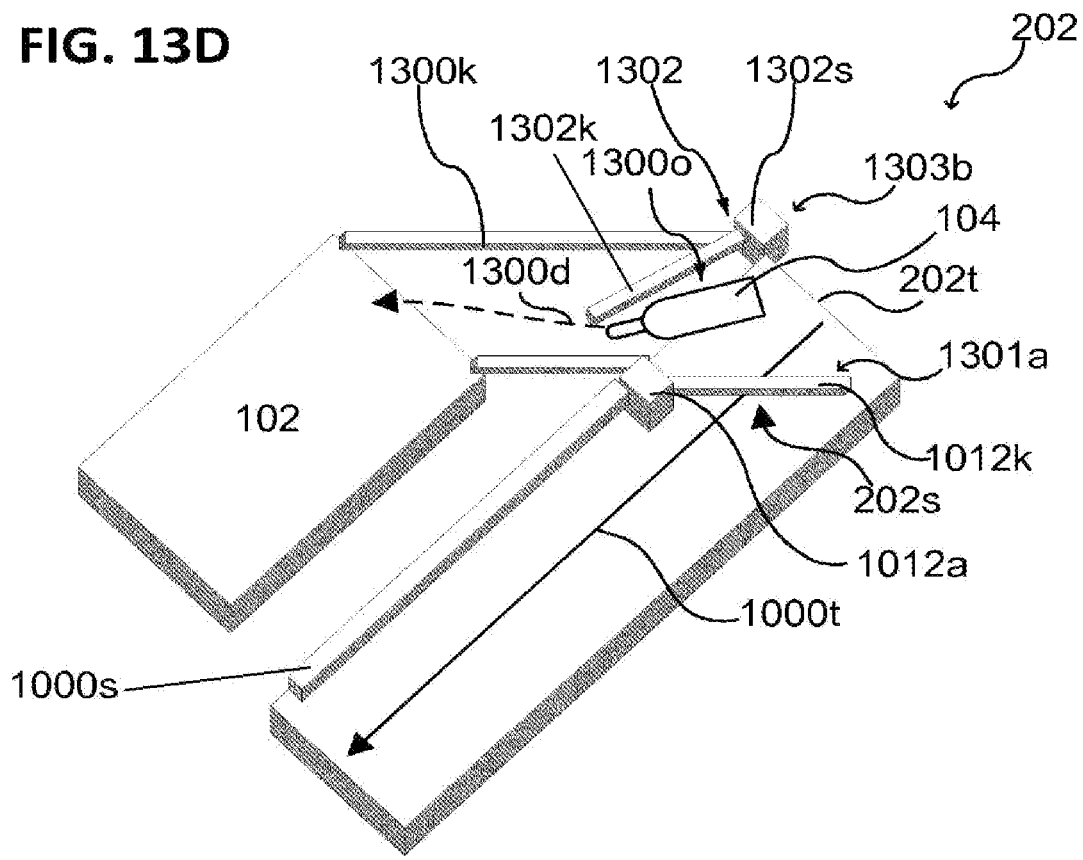

FIG. 13C and FIG. 13D illustrate a compactor arrangement 202 with an anti-manipulation guard device 1302 in various schematic illustrations, according to various embodiments.

According to various embodiments, the anti-manipulation guard device 1302 may have an anti-manipulation guard flap 1302*k*. According to various embodiments, the anti-manipulation guard flap 1302*k* may be mounted so as to be movable such that it is moved from a first position 1303*a* into a second position 1303*b* in the case of a leadthrough of empty containers 104 through the opening 1300*o* into the feed channel 1300*k*. According to various embodiments, the anti-manipulation guard flap 1302*k* can clearly be moved owing to physical contact with the empty containers 104 when these are led by means of the selection device 202*s* out of the transport region 1000*t* into the feed channel 1300*k*. Here, the at least one sensor 1302*s* of the anti-manipulation guard device 1302 may be configured to detect the leadthrough of empty containers 104 through the opening 1300*o* on the basis of the movement of the anti-manipulation guard flap 1302*k* from the first position 1303*a* into the second position 1303*b*.

According to various embodiments, the at least one processor may be configured to ascertain a position 1301*a*, 1301*b* of the selection flap 1012*k* and to ascertain a position 1303*a*, 1303*b* of the anti-manipulation guard flap 1302*k*. Furthermore, the at least one processor may be configured to verify a leadthrough of empty containers 104 through the opening 1300*o* on the basis of the ascertained position 1301*a*, 1301*b* of the selection flap 1012*k* and the ascertained position 1303*a*, 1303*b* of the anti-manipulation guard flap 1302*k*. The actual leadthrough of empty containers 104 through the opening 1300*o* may clearly make it necessary for the anti-manipulation guard flap 1302*k* to be moved while the selection flap 1012*k* is open (that is to say in the first position 1301*b* or not in the second position 1301*a*).

Here, the second position 1303*b* of the anti-manipulation guard flap 1302*k* may for example be variable; for example, the anti-manipulation guard flap 1302*k* may be moved correspondingly to the size of the empty containers 104.

According to various embodiments, the anti-manipulation guard flap 1302*k* may be mounted so as to be pivotable, and in a rest position may cover the opening 1300*o*. By means of the at least one sensor 1302*s*, a deflection of the anti-manipulation guard flap 1302*k* out of the rest position can be ascertained (detected or identified). Here, the at least one processor may be configured to, in the time interval in which the selection flap 1012*k* of the selection device 202*s* is open (that is to say in the first position 1301*b* or not in the second position 1301*a*), verify a leadthrough of empty containers 104 through the opening 1300*o* on the basis of a deflection, detected by means of the at least one sensor 1302*s*, of the anti-manipulation guard flap 1302*k*.

In the figures, the anti-manipulation guard flap 1302*k* is illustrated merely by way of example as a laterally pivoting flap. This can be brought into a rest position (that is to say into the first position 1303*a*) for example by means of a mechanical spring or some other resetting structure. Furthermore, the anti-manipulation guard flap 1302*k* may for example be mounted in vertically freely hanging fashion and balanced by means of its own mass. In this case, the anti-manipulation guard flap 1302*k* can move into a rest position (that is to say in the first position 1303*a*) owing to its own weight.

The anti-manipulation guard flap 1302*k* may for example have a correspondingly low weight (e.g. may be manufactured from plastic) and be mounted in freely moving fashion, such that it can be deflected by the empty containers 104 themselves.

According to various embodiments, the anti-manipulation guard flap 1302*k* may be mounted such that it cannot be deflected from the first position 1303*a* in the direction of the transport region 1000*t*, such that a return of the empty containers 104 from the feed channel 1300*k* in the direction of the transport region 1000*t* can be prevented.

FIG. 14 illustrates a schematic flow diagram of a method 1400 for operating a compactor arrangement 202, according to various embodiments. The method 1400 may for example comprise: in 1410, transporting empty containers 104 by means of the empty-container transport device 202*t* in a transport region 1000*t* (e.g. above the empty-container transport device 202*t*) and, in 1420, opening a selection flap 1012*k* of a selection device 202*s* in order to lead empty containers 104 out of the transport region 1000*t* through an opening 1300*o* into a feed channel 1300*k* for the compaction of the empty containers 104, subsequently, in 1430, closing the selection flap 1012*k* (e.g. in order to lead empty containers 104 in the transport region 1000*t* through the compactor arrangement 202); furthermore, in 1440, ascertaining a passage of empty containers 104 through the opening 1300*o* into the feed channel 1300*k* in the time window between the opening and the subsequent closure of the selection flap 1012*k*, and, on the basis thereof, generating an item of verification information; and, in 1450, operating the compactor arrangement 202 on the basis of the item of verification information.

The item of verification information may be provided in the form of a suitable signal, which may represent at least two states (e.g. verified and manipulated).

Here, the operation of the compactor arrangement 202 on the basis of the item of verification information may comprise: sending a verification message if a passage of empty containers 104 through the opening 1300*o* into the feed channel 1300*k* is ascertained in the time window between the opening and the subsequent closure of the selection flap, and/or sending a manipulation message if no passage of empty containers 104 through the opening 1300*o* into the supply channel 1300*k* is ascertained in the time window between the opening and the subsequent closure of the selection flap.

Furthermore, the ascertainment of a passage of empty containers 104 through the opening 1300*o* into the feed channel 1300*k* may comprise: ascertaining a movement of an anti-manipulation guard flap 1302*k* which is mounted so as to be movable and which, in a rest position, covers the opening 1300*o* of the feed channel 1300*k*.

FIG. 15A to FIG. 15H illustrate a belt-link conveyor 1502 of a compactor arrangement 202 in various schematic illustrations, according to various embodiments. According to various embodiments, the belt-link conveyor 1502 may be used as the empty-container transport device 202*t* or as part of the empty-container transport device 202*t*, as described by way of example above (see for example FIGS. 2A, 2B and 4C). Furthermore, the belt-link conveyor 1502 may be used in an identical or similar manner as a preliminary belt assembly 402*v* or feed device 112*t* of a compactor 102, as described by way of example above (see for example FIGS. 1A, 1B and 4B).

According to various embodiments, the belt-link conveyor 1502 may have one or more conveying assemblies 1502*d*, 1502*g* for transporting empty containers 104 in the compactor arrangement 202. The belt-link conveyor 1502 illustrated in FIGS. 15C to 15H has for example two conveying assemblies 1502*d*, 1502*g* which are arranged so as to be tilted relative to one another such that empty containers 104 can be transported in a stable manner in a substantially V-shaped transport surface. Furthermore, the belt-link conveyor 1502 may have only one conveying assembly 1502*g* which provides, for example, a planar transport surface as illustrated by way of example in FIGS. 1A and 1B and FIG. 4B with regard to the preliminary belt assembly 402*v* or feed device 112*t* of the compactor 102. Alternatively, the belt-link conveyor 1502 may also have more than two conveying assemblies 1502*d*, 1502*g*. It is thus for example possible to provide transport surfaces with relatively complex geometries.

According to various embodiments, the respective conveying assembly 1502*d* or 1502*g* may have the following: at least two diverting rollers 1504, which are arranged at a distance from one another, and at least one transport belt 1506, which is mounted in endlessly circulating fashion by means of the at least two diverting rollers 1504, as illustrated for example in FIG. 15A.

The transport belt 1506 may for example have a multiplicity of belt links 1506*g*. To form the transport belt 1506, in each case two mutually adjacent belt links of the multiplicity of belt links 1506*g* may be mechanically connected to one another by means of in each case one connecting element 1506*v*, as illustrated for example in FIG. 15B.

The transport belt 1506 can thus be provided such that its length can be easily adapted, for example to the width of the compactor arrangement 202, to a distance between two mutually adjacent compactor arrangements 202, etc. The length of the transport belt 1506 can be brought to a predefined length by adaptation of the number of belt links 1506g used (e.g. in the case of a predefined size of the respectively used belt links 1506g).

According to various embodiments, the respective conveying assembly 1502d or 1502g may be of modular configuration. This may for example have two diverting modules 1502g-1 and at least one (e.g. linear) track module 1502g-2. Here, it is for example the case that at least one of the at least two diverting rollers 1504 is arranged in each of the two diverting modules 1502g-1 for the purposes of guiding the transport belt 1506 in endlessly circulating fashion between the respective diverting rollers 1504. Here, the at least one track module 1502g-2 is arranged between the two diverting modules 1502g-1. According to various embodiments, the number of track modules 1502g-2 used may be varied depending on the number of compactor arrangements 202 used. If, for example, two compactor arrangements 202 are arranged so as to adjoin one another, as illustrated for example in FIG. 9C, the conveying assembly 1502g may have two track modules 1502g-2. It is clearly possible for one track module 1502g-2 to be used for each compactor arrangement 202 for the purposes of transporting empty containers 104 in the compactor arrangement 202 and/or through the compactor arrangement 202.

As illustrated for example in FIG. 15C, the conveying assembly 1502g may have two track modules 1502g-2 which are arranged between the two diverting modules 1502g-1. Here, one of the two diverting modules 1502g-1 may be configured as drive module 1502g-a for driving the transport belt 1506 (see FIG. 15E to FIG. 15G). The drive module 1502g-a may have at least one electric motor 1508 or may be coupled to at least one electric motor for driving the transport belt 1506. According to various embodiments, one of the at least two diverting rollers may be a drive roller, to which a torque can be transmitted by means of the at least one electric motor 1508.

The respective conveying assembly 1502g may furthermore have for example two lateral guide rails 1510a, 1510b. These may for example be configured such that the connecting elements 1506v of the transport belt 1506 are guided and/or supported in endlessly circulating fashion by means of the two guide rails 1510a, 1510b. Each of the two guide rails 1510a, 1510b may for example have an endlessly encircling cutout 1511 into which the connecting elements 1506v engage in each case in certain portions for the purposes of guiding the connecting elements 1506v in positively locking fashion, as illustrated for example in FIG. 15D.

According to various embodiments, the respective conveying assembly 1502g may furthermore have a cover 1512. The cover 1512 may for example be arranged between the two guide rails 1510a, 1510b and between the load strand (the respectively upper section of the transport belt 1506) and the return strand (the respectively lower section of the transport belt 1506). It is thus for example possible for the return strand to be covered, for example protected against contamination from above (e.g. from transported empty containers 104).

Here, the cover 1512 may be configured such that the transport belt 1506 is supported in sliding fashion on the cover 1512. Here, it is for example possible for the respective belt links 1506g of the transport belt 1506 and/or the respective connecting elements 1506v of the transport belt 1506 to lie on the respective cover (in the load strand).

According to various embodiments, a first conveying assembly 1502d and a second conveying assembly 1502g of the belt-link conveyor 1502 may provide in each case one transport surface for the transport of the empty containers 104 on the two transport surfaces.

As illustrated for example in FIG. 15D, the first conveying assembly 1502d and the second conveying assembly 1502g may be arranged relative to one another such that the two transport surfaces are oriented at an angle with respect to one another, for example in a V shape.

According to various embodiments, the first conveying assembly 1502d may have a multiplicity of belt links 1506g of a first belt link type 1506g-1, and the second conveying assembly 1502g may have a multiplicity of belt links 1506g of a second belt link type 1506g-2, wherein the two belt link types 1506g-1, 1506g-2 differ from one another.

Here, by way of example, the first conveying assembly 1502d (having the multiplicity of belt links 1506g of the first belt link type 1506g-1) may face toward the compactor 102, and the second conveying assembly 1502g (having the multiplicity of belt links 1506g of the second belt link type 1506g-2) may be averted from the compactor 102 (see for example FIG. 15D and FIG. 5B). Here, the belt links 1506g of the first belt link type 1506g-1 may have an outwardly exposed first belt link surface, and the belt links 1506g of the second belt link type 1506g-2 may have an outwardly exposed second belt link surface, wherein the first belt link surface is configured so as to have a lower coefficient of friction than the second belt link surface. The selection of the empty containers 104 by means of the selection device 202s can thus be performed in a more reliable or simpler manner. For example, the belt links 1506g of the second belt link type 1506g-2 may have an adhesion structure, wherein the adhesion structure forms the second belt link surface. The adhesion structure may for example have or be composed of a polymer, for example an elastomer such as for example rubber etc. Here, the adhesion structure may for example be provided only on the outwardly exposed side of the belt links 1506g, such that sliding of the belt links 1506g on the cover 1512 is not adversely affected by the adhesion structure.

As illustrated for example in FIG. 15B and FIG. 15H, each of the belt links 1506g may have two connecting structures 1506s, which are formed at mutually opposite end sections of the belt link 1506g, for connecting in each case two mutually adjacent belt links 1506g to form the transport belt 1506. As connecting element 1506v, use may for example be made of a pin, a bolt, a splint etc.

According to various embodiments, the connecting structures 1506s may be configured such that in each case one connecting structure 1506s of two mutually adjacent belt links 1506g can be connected to one another at least in positively locking fashion by means of the connecting element 1506v.

FIG. 15E to FIG. 15G each illustrate a drive module 1502g-a of a conveying assembly 1502g in various illustrations, according to various embodiments.

According to various embodiments, at least one of the at least two diverting rollers 1504 may have a toothing structure 1504z (clearly a cutout structure for the positively locking engagement of sections, designed in a correspondingly matching manner with respect thereto, of the transport belt 1506) into which the transport belt 1506 can engage in certain sections for the purposes of driving the transport belt 1506. Here, the drive device 1508 may be configured so as to drive the at least one diverting roller with the toothing structure 1504z of the at least two diverting rollers 1504.

According to various embodiments, it is for example possible for the connecting elements 1506v of the transport belt 1506 and the toothing structure 1504z to be configured such that the connecting elements 1506v can engage in certain sections in the toothing structure 1504z for the purposes of driving the transport belt 1506. According to various embodiments, it is for example possible for the belt links 1506g (e.g. the connecting structures thereof) of the transport belt 1506 and the toothing structure 1504z to be configured such that the belt links 1506g can engage in certain sections in the toothing structure 1504z for the purposes of driving the transport belt 1506.

According to various embodiments, the respective width of the at least two diverting rollers 1504 may be smaller than the width of the transport belt 1506. The transport belt 1506 may clearly be guided at least in certain sections at the outer sides thereof by means of the respective guide rail 1510a, 1510b. The respective guide rail 1510a, 1510b may for example be segmented and/or provided by means of a multiplicity of guide elements.

According to various embodiments, an electric motor may be used to separately operate in each case only one of the conveying assemblies 1502d, 1502g (for example, the respective drive rollers may be coupled to one another in terms of torque, for example by means of a shaft joint) or in order to operate several of the conveying assemblies 1502d, 1502g simultaneously.

According to various embodiments, the drive for driving the transport belt 1506 may be provided in an Omega configuration (also referred to as Omega drive), as illustrated for example in FIG. 15G. Here, the transport belt 1506 may be diverted multiple times. Here, at least one of the diverting rollers 1504 may be mounted so as to be displaceable 1504v, for example for the purposes of tensioning the transport belt 1506 and/or for the purposes of compensating a change in length of the transport belt 1506, etc.

FIG. 15H illustrates a diverting module 1502g-1 in a schematic view, according to various embodiments. According to various embodiments, the diverting module 1502g-1 may be configured such that the distance between the compactor arrangement 202 and an adjoining arrangement can be bridged by means of the diverting module 1502g-1. A boom 1514 may clearly be installed on the support framework 204a of the compactor arrangement 202, wherein the boom 1514 supports that section of the belt-link conveyor 1502 which projects out of the compactor arrangement 202, see for example FIG. 9C. The length of that section of the belt-link conveyor 1502 which projects out of the compactor arrangement 202 can be adapted, for example in a range of up to one meter.

According to various embodiments, a multi-part (e.g. a two-part V-shaped) belt-link conveyor 1502 may be used in a compactor arrangement 202 for transporting empty containers 104. According to various embodiments, in the case of a V-shaped design of the belt-link conveyor 1502, a liquid drain may be used which may be arranged centrally between the two conveying assemblies 1502d, 1502g of the belt-link conveyor 1502.

According to various embodiments, that conveying assembly 1502d or 1502g which is averted from the compactor 102 may have a transport belt 1506 with rubber-coated belt links 1506g.

The respective conveying assembly 1502d or 1502g may have a return strand support, provided for example by means of a guide geometry (e.g. the respective guide rails 1510a, 1510b) and the respective connecting elements 1506v (e.g. belt link connecting bolts).

Length compensation for the transport belt 1506 may be provided for example by means of a gravitational-force-assisted Omega drive. Here, at least one diverting roller may be mounted in movable fashion and mounted into the transport belt 1506 such that it correspondingly tensions the transport belt 1506 by means of a force, see FIG. 15G.

By means of a cover 1512 (e.g. a closed sliding structure), the return strand can be completely covered at the upper side.

According to various embodiments, the belt-link conveyor 1502 may be installed on the support framework 204a of the compactor arrangement 202, see for example FIG. 4A. Here, a vibration-inhibiting attachment of the belt-link conveyor 1502 to the support framework 204a may be provided; for example, vibration-damping elements may be used for the installation of the belt-link conveyor 1502 on the support framework 204a.

Owing to the modular construction as illustrated for example in FIG. 15C, the belt-link conveyor 1502 can be easily exchanged, serviced and/or cleaned.

FIG. 16A and FIG. 16B illustrate a compactor arrangement 202 in various schematic illustrations, according to various embodiments.

According to various embodiments, the compactor arrangement 202 may have a compactor 102 for compacting empty containers 104, for example as described above. Furthermore, the compactor arrangement 202 may have a support framework 204a for supporting the compactor 102, for example as described above. Furthermore, the compactor arrangement 202 may have an empty-container transport device 202t for transporting empty containers 104 in the compactor arrangement 202.

Furthermore, the compactor arrangement 202 may have an assembly arrangement 1606. The assembly arrangement 1606 may for example be installed, above the compactor 102 and/or above the empty-container transport device 202t, on the support framework 204a.

Furthermore, the assembly arrangement 1606 may have at least a first cover structure 1604 and a second cover structure 1608, which are arranged at a distance from one another.

According to various embodiments, the electrical assembly 428 may, as described by way of example above (see for example FIG. 4D), be used as assembly arrangement 1606. The assembly arrangement 1606 may thus for example have one or more electrical boxes 428e and/or a front assembly 428f and/or a function module arrangement 1102.

Furthermore, the assembly arrangement 1606 may have a selection device 202s, for example in the form of a selection module 1106s of the function module arrangement 1102.

According to various embodiments, the selection flap of the selection device 202s (e.g. the selection flap 1012k of a selection module 1106s) may form a first section of the first cover structure 1604 (e.g. if the selection module 1106s is received in the module receptacle 1104 of the function module arrangement 1102), see FIG. 10D, FIG. 13A and FIG. 13C. Furthermore, a guard module 1106n can be used instead of the selection module 1106s, see for example FIG. 11D. The guard plate 1106n-1 of the guard module 1106n may form a first section of the first cover structure 1604 (e.g. when the protective module 1106n is received in the module receptacle 1104 of the function module arrangement 1102).

Furthermore, the first cover structure 1604 may have an anti-encroachment guard structure, for example a first anti-encroachment guard structure 1000s as described above, see for example FIG. 10A to FIG. 10D. For example, a plate 1106c-1 of the selection information module 1106c may be part of the first cover structure 1604. The first cover structure 1604 clearly forms an anti-encroachment guard structure for preventing an encroachment from a transport region 1000t above the empty-container transport device 202t in the direction of the compactor 102, in a manner similar to that described above. The cover structure 1604 may for example be provided by means of two anti-encroachment guard structures 1000s, 1002s (see for example FIG. 10B and FIG. 10E) or by means of one anti-encroachment guard structure 1000s and the selection flap 1012k (see for example FIG. 10D), see for example FIG. 10B.

The assembly arrangement 1606 may for example be installed displaceably on the support framework 204a by means of one or more bearing arrangements 1602. Here, the assembly arrangement 1606 may be mounted and configured such that it can be displaced 1601 above the empty-container transport device 202t, as illustrated for example in FIG. 16A and FIG. 16B.

According to various embodiments, the assembly arrangement 1606 may be mounted such that it can be moved into an operating position 1600a (see for example FIG. 16A) and into an installation position 1600b (see for example FIG. 16B).

Here, the assembly arrangement 1606 may be configured such that, in the operating position 1600a, empty containers 104 being transported by means of the empty-container transport device 202t can be selectively fed to the compactor 102, and such that the assembly arrangement 1606, in the installation position 1600b, at least partially covers the empty-container transport device 202t and/or the transport region 1000t above the empty-container transport device 202t.

According to various embodiments, the second cover structure 1608 may be mounted so as to be pivotable 1611 by means of at least one joint 1609. In the operating position 1600a, the second cover structure 1608 is arranged so as not to impede access from the transport region 1000t into the compactor 102, such that empty containers 104 can be fed to the compactor 102. During the movement of the assembly arrangement 1606 into the installation position 1600b, the second cover structure 1608 may automatically fold downward, such that it laterally delimits the transport region 1000t and is arranged between the transport region 1000t and the compactor 102. In the installation position 1600b, the two cover structures 1604, 1608 may for example delimit the transport region 1000t on both sides.

In the installation position 1600b, the second cover structure 1608 clearly forms an anti-encroachment guard in the direction of the compactor 102, and/or covers a feed region 1000d or a path 1300d in the direction of the compactor 102.

According to various embodiments, the two cover structures 1604, 1608 may be oriented substantially parallel to one another when the assembly arrangement 1606 is in the installation position 1600b. A transport channel is clearly formed around the transport region 1000t by means of the two cover structures 1604, 1608 of the assembly arrangement 1606, in which transport channel empty containers 104 can be transported through the compactor arrangement 202 in this operating mode. An emergency operating mode can thus clearly be provided, in which, for example, the compactor 102 can be repaired, exchanged, cleaned, etc., with operational safety being ensured at the same time.

According to various embodiments, a compactor arrangement 202 may have the following: a compactor 102; a support framework 204a for supporting the compactor 102; an empty-container transport device 202t for transporting empty containers 104 in a transport region 1000t of the compactor arrangement 202; an assembly arrangement 1606 which is arranged above the compactor 102 and/or above the empty-container transport device 202t and which has a first cover structure 1604 and a pivotably mounted second cover structure 1608, wherein the assembly arrangement 1606 is mounted so as to be movable (e.g. on the support framework 204a) between a first position 1600a (clearly an operating position) and a second position 1600b (clearly an assembly position), and wherein the assembly arrangement 1606 is configured such that, in the second position 1600b, the first cover structure 1604 covers the transport region 1000t on a first side and the second cover structure 1608 covers the transport region 1000t on a second side which is situated opposite the first side; and that, in the first position 1600a, the first cover structure 1604 covers the transport region 1000t on the second side. Here, the second side of the transport region 1000t may face toward the compactor 102.

According to various embodiments, a method for operating a compactor arrangement 202 may comprise the following: transporting empty containers 104 in a transport region 1000t of the compactor arrangement 202 by means of an empty-container transport device 202t; optionally operating the compactor arrangement 202 in an operating mode or in an installation mode (clearly in two mutually different operating modes), wherein, in the operating mode, an assembly arrangement 1606 is in a first position above the empty-container transport device 202t and empty containers 104 are fed selectively to a compactor 102 of the compactor arrangement 202 by means of a selection device 202s of the assembly arrangement 1606, and wherein, in the installation mode, the assembly arrangement 1606 is brought (e.g. moved) into a second position and the transport region 1000t is covered on both sides by means of two cover structures 1604, 1608 of the assembly arrangement 1606.

According to various embodiments, a method for operating a compactor arrangement 202 may comprise the following: operating the compactor arrangement 202 in an operating mode, comprising: transporting empty containers 104 by means of the empty-container transport device 202t in a transport region 1000t, and selectively leading the empty containers 104 by means of a selection device 202s, which is part of a movably mounted assembly arrangement, out of the transport region 1000t and through a feed region 1000d to a compactor 102 of the compactor arrangement 202; and, previously and/or subsequently, operating the compactor arrangement 202 in a second operating mode, comprising: transporting empty containers 104 by means of the empty-container transport device 202t in the transport region 1000t through the compactor arrangement 202, and safeguarding the feed region 1000d against an encroachment from the direction of the transport region 1000t by means of at least one cover structure 1608, which is part of the movably mounted assembly arrangement. Here, the assembly arrangement 1606 may, in the first operating mode, be in a first operating position 1600a and, in the second operating mode (clearly in an installation mode), be in a second operating position 1600b (clearly in an installation position), see for example FIG. 16A and FIG. 16B.

Furthermore, the method may comprise: switching from the first operating mode to the second operating mode, comprising: displacing the assembly arrangement 1606 such that a first cover structure 1604 of the assembly arrangement 1606 covers the transport region 1000t on a first side, and pivoting a second cover structure 1608 of the assembly arrangement 1606 into a position in which the second cover structure 1608 covers the transport region 1000t on a second side which is situated opposite the first side. Here, the second side of the transport region 1000t may face toward the compactor 102.

According to various embodiments, during the switch from the first operating mode to the second operating mode, the second cover structure 1608 is pivoted from a substantially horizontal position into a substantially vertical position. Here, the assembly arrangement 1606 may be configured such that the second cover structure 1608 automatically pivots into the vertical position owing to its own weight and its mounting. During the switch from the second operating mode to the first operating mode, the second cover structure 1608 may automatically pivot into the horizontal position, in a manner linked to the movement of the assembly arrangement 1606. For example, the second cover structure 1608 may be pushed against a correspondingly designed guide structure, such that the second cover structure 1608 is automatically pivoted into the horizontal position owing to the guide structure.

According to various embodiments, the respective functions that are described herein (e.g. with regard to the at least one processor) may be implemented in hardware form, for example in any suitable electronic circuit, and/or in software form, for example on a data carrier (e.g. as a control program) and executed by at least one processor.

Below, various examples will be described which relate to that which has been described and illustrated above.

Example 1 is a compactor arrangement 202 having: a compactor 102; an empty-container transport device 202t for transporting empty containers 104 in the compactor arrangement 202 in a transport region 1000t above the empty-container transport device 202t; a first anti-encroachment guard structure 1000s which laterally delimits the transport region 1000t and which is provided between the transport region 1000t and the compactor 102, wherein the first anti-encroachment guard structure 1000s defines a feed region 1000d through which empty containers 104 can be fed laterally out of the transport region 1000t to the compactor 102; and a guard device 1002 having a second anti-encroachment guard structure 1002s which is configured such that, selectively, an encroachment 1002e from the direction of the transport region 1000t into the feed region 1000d may be prevented.

In example 2, the compactor arrangement 202 as per example 1 may furthermore have: a selection device 202s which is configured such that empty containers 104 can be selectively fed out of the transport region 1000t and through the feed region 1000d to the compactor 102.

In example 3, the compactor arrangement 202 as per example 2 may furthermore comprise that the selection device 202s has a selection flap 1012k and an actuating drive 1012a for moving the selection flap 1012k into a first position 1003a and into a second position 1003b. Furthermore, the selection device 202s may be configured such that, when the selection flap 1012k is in the first position 1003a, empty containers 104 being transported by means of the empty-container transport device 202t can be fed by means of the selection flap 1012k through the feed region 1000d to the compactor 102, and, when the selection flap 1012k is in the second position 1003b, empty containers 104 can be transported by means of the empty-container transport device 202t in the transport region 1000t through the compactor arrangement 202.

In example 4, the compactor arrangement 202 as per any of examples 1 to 3 may furthermore comprise that the second anti-encroachment guard structure 1002s of the guard device 1002 has a guard plate. Here, the guard plate may be mounted so as to be movable 1002v such that it can be moved into a first position 1005a and a second position 1005b. Here, the guard plate may cover the feed region 1000d and/or be arranged in the feed region 1000d, in order to prevent the encroachment 1002e from the direction of the transport region 1000t into the feed region 1000d, only in the first position 1005a.

In example 5, the compactor arrangement 202 as per any of examples 1 to 3 may furthermore have: a function module arrangement 1102 which is arranged above the empty-container transport device 202t. The function module arrangement 1102 may have: a module receptacle 1104 for receiving multiple function modules 1106, the multiple function modules 1106, which are designed to match the module receptacle 1104 such that the multiple function modules 1106 can each be selectively received in the module receptacle 1104, wherein the selection device 202s is provided as a selection module 1106s of the multiple function modules 1106, and wherein the guard device 1002 is provided as a guard module 1106n of the multiple function modules 1106.

In example 6, the compactor arrangement 202 as per example 5 may furthermore comprise that the guard module 1106n has a guard plate 1106n-1. Here, the guard module may be configured such that, when the guard module 1106n is received in the module receptacle 1104, the guard plate 1106n-1 covers the feed region 1000d and/or is arranged in the feed region 1000d in order to prevent the encroachment 1002e from the direction of the transport region 1000t into the feed region 1000d.

In example 7, the compactor arrangement 202 as per example FIG. 5 or 6 may furthermore comprise that the module receptacle 1104 has at least one receptacle position 1104p such that selectively either the selection module 1106s or the guard module 1106n can be received in the receptacle position 1104p.

In example 8, the compactor arrangement 202 as per any of examples 5 to 7 may furthermore have: at least one processor which is configured to deactivate the compactor 102 when the guard module 1106n is received in the module receptacle 1104.

In example 9, the compactor arrangement 202 as per example 8 may furthermore comprise that the at least one processor is furthermore configured to control the empty-container transport device 202t in such a way that empty containers 104 are transported through the compactor arrangement 202 by means of the empty-container transport device 202t when the guard module 1106n is received in the module receptacle 1104.

In example 10, the compactor arrangement 202 as per example 8 or 9 may furthermore comprise that the at least one processor is furthermore configured to control the selection module 1106s, when this is received in the module receptacle 1104, such that empty containers 104 from the transport region 1000t can be selectively fed to the compactor 102 through the feed region 1000d.

In example 11, the compactor arrangement 202 as per any of examples 8 to 10 may furthermore comprise that the selection module 1106s is provided as a selection module of a first selection module type or of a second selection module type, wherein the at least one processor is configured to actuate the empty-container transport device 202t such that that the empty-container transport device 202t is moved in a first transport direction when a selection module of the first selection module type is received in the module receptacle 1104. Furthermore, the at least one processor may be configured to actuate the empty-container transport device 202*t* such that the empty-container transport device 202*t* is moved in a second transport direction, which differs from the first transport direction, when a selection module of the second selection module type is received in the module receptacle 1104.

In example 12, the compactor arrangement 202 as per any of examples 1 to 11 may further have: an upper cover 408 which is configured such that an encroachment (e.g. from outside the compactor arrangement 202) into the transport region 1000*t* can be selectively prevented by means of the upper cover 408.

Example 13 is a compactor arrangement 202, having: a support framework 204*a* for supporting a compactor 102, an empty-container transport device 202*t* for transporting empty containers 104 in the compactor arrangement 202, a function module arrangement 1102, which is installed on the support framework 204*a* above the empty-container transport device 202*t*. The function module arrangement 1102 may for example have the following: a module receptacle 1104 for receiving multiple function modules 1106, the multiple function modules 1106, which are designed to match the module receptacle 1104 such that the multiple function modules 1106 can each be selectively received in the module receptacle 1104, wherein the selection device 202*s* is provided as a selection module 1106*s* of the multiple function modules 1106, and wherein the second encroachment guard structure 1002*s* is provided as a guard module 1106*n* of the multiple function modules 1106.

Example 14 is a compactor means 300, having: multiple compactor arrangements 202 as per any of examples 1 to 12, wherein the compactor arrangements 202 are arranged relative to one another such that empty containers 104 can be transported along a transport path 306 through the compactor arrangements 202.

Example 15 is a method 1200 for operating a compactor arrangement 202, the method 1200 comprising: operating the compactor arrangement 202 in a first operating mode 1001*a*, comprising: transporting empty containers 104 by means of the empty-container transport device 202*t* in a transport region 1000*t*, and selectively leading the empty containers 104 by means of a selection device 202*s* out of the transport region 1000*t* and through a feed region 1000*d* to a compactor 102 of the compactor arrangement 202; and, previously and/or subsequently, operating the compactor arrangement 202 in a second operating mode, comprising: transporting empty containers 104 by means of the empty-container transport device 202*t* in the transport region 1000*t* through the compactor arrangement 202, and safeguarding the feed region 1000*d* against an encroachment 1002*e* from the direction of the transport region 1000*t* by means of an anti-encroachment guard structure 1002*s*.

In example 16, the method 1200 as per example 15 may furthermore comprise: switching from the first operating mode 1001*a* to the second operating mode 1001*b*, the switching comprising: uninstalling the selection device 202*s*, and installing the at least one anti-encroachment guard structure 1002*s* such that this covers the feed region 1000*d* and/or is arranged in the feed region 1000*d*.

In example 17, the method 1200 as per example 15 or 16 may furthermore comprise: switching from the second operating mode 1001*b* to the first operating mode 1001*a*, the switching comprising: uninstalling the at least one anti-encroachment guard structure 1002*s*, and installing the selection device 202*s*.

In example 18, the method 1200 as per example 15 may furthermore comprise: switching from the first operating mode 1001*a* to the second operating mode 1001*b*, the switching comprising: displacing the anti-encroachment guard structure 1002*s* such that this covers the feed region 1000*d* and/or is arranged in the feed region 1000*d*.

In example 19, the method 1200 as per example 15 or 18 may furthermore comprise: switching from the second operating mode 1001*b* to the first operating mode 1001*a*, the switching comprising: displacing the anti-encroachment guard structure 1002*s* such that the feed region 1000*d* is opened up.

In example 20, the method 1200 as per any of examples 15 to 19 may furthermore comprise that the operation of the compactor arrangement 202 in the first operating mode 1001*a* furthermore comprises: operating the compactor 102 to compact the empty containers 104 which are fed to the compactor 102 through the feed region 1000*d* by means of the selection device 202*s*; and that the operation of the compactor arrangement 202 in the second operating mode 1001*b* furthermore comprises: deactivating the compactor 102.

Example 21 is a compactor arrangement 202, having: a compactor 102; an empty-container transport device 202*t* for transporting empty containers 104 in the compactor arrangement 202 in a transport region 1000*t* (e.g. above the empty-container transport device 202*t*); a feed channel 1300*k* for leading empty containers 104 from the empty-container transport device 202*t* to the compactor 102; a selection device 202*s* which is configured such that empty containers 104 can be selectively led out of the transport region 1000*t* through an opening 1300*o* into the feed channel 1300*k*; and an anti-manipulation guard device 1302. The anti-manipulation guard device 1302 may for example have the following: an anti-manipulation guard flap 1302*k*, which is mounted so as to be movable such that it is moved in the event of a leadthrough of empty containers 104 through the opening 1300*o*. Furthermore, the compactor arrangement 202 may have at least one processor which is configured to monitor a movement of the anti-manipulation guard flap 1302*k* and to operate the compactor arrangement 202 on the basis thereof.

Example 22 is a compactor arrangement 202, having: a compactor 102; an empty-container transport device 202*t* for transporting empty containers 104 in the compactor arrangement 202 in a transport region 1000*t* above the empty-container transport device 202*t*; a feed channel 1300*k* for leading empty containers 104 from the empty-container transport device 202*t* to the compactor 102; a selection device 202*s* which is configured such that empty containers 104 can be selectively led out of the transport region 1000*t* through an opening 1300*o* into the feed channel 1300*k*; and an anti-manipulation guard device 1302 having at least one sensor 1302*s* for detecting a leadthrough of empty containers 104 through the opening.

In example 23, the compactor arrangement 202 as per example 22 may furthermore comprise that the selection device 202*s* has a selection flap 1012*k* and an actuating drive 1012*a* for moving the selection flap 1012*k* into a first position 1003*a* and into a second position 1003*b*. Here, the selection device 202*s* may furthermore be configured such that, when the selection flap 1012*k* is in the first position 1301*b*, empty containers 104 being transported by means of the empty-container transport device 202*t* can be fed by means of the selection flap 1012*k* through the feed region 1000*d* to the compactor 102, and, when the selection flap 1012*k* is in the second position 1301*a*, empty containers 104 can be transported by means of the empty-container transport device 202*t* in the transport region 1000*t* through the compactor arrangement 202. Clearly, the empty containers 104 are not fed to the compactor 102 of the compactor arrangement 202 when the selection flap 1012k is in the second position 1301a.

In example 24, the compactor arrangement 202 as per example 22 or 23 may furthermore comprise that the anti-manipulation guard device 1302 has an anti-manipulation guard flap 1302k. The anti-manipulation guard flap 1302k may be mounted so as to be movable such that it is moved from a first position 1303a into a second position 1303b in the event of a leadthrough of empty containers 104 through the opening 1300o. Here, the at least one sensor 1302s may be configured to detect the detection of a leadthrough of empty containers 104 through the opening 1300o on the basis of a movement of the anti-manipulation guard flap 1302k from the first position 1303a into the second position 1303b.

In example 25, the compactor arrangement 202 as per any of examples 22 to 24 may furthermore have: at least one processor for actuating the selection device 202s on the basis of control data and for receiving sensor data from the at least one sensor 1302s. Here, the at least one processor may be configured to ascertain an expected leadthrough of empty containers 104 through the opening on the basis of the control data and to verify the expected leadthrough of empty containers 104 through the opening on the basis of the sensor data.

In example 26, the compactor arrangement 202 as per example 25 may furthermore comprise that the at least one processor is configured to generate a verification message if an expected leadthrough of empty containers 104 through the opening is verified and/or to generate a manipulation message if an expected leadthrough of empty containers 104 through the opening is not verified.

In example 27, the compactor arrangement 202 as per examples 23 and 24 may furthermore have: at least one processor which is configured to ascertain a position of the selection flap, to ascertain a position of the anti-manipulation guard flap 1302k, and, on the basis of this, to verify a leadthrough of empty containers 104 through the opening 1300o.

In example 28, the compactor arrangement 202 as per example 27 may furthermore comprise that the at least one processor is configured to output a verification message if an expected leadthrough of empty containers 104 through the opening 1300o is verified and/or to output a manipulation message if an expected leadthrough of empty containers 104 through the opening 1300o is not verified.

In example 29, the compactor arrangement 202 as per example 28 may furthermore comprise that the at least one processor is configured to output the verification message if it is ascertained that the anti-manipulation guard flap 1302k is moved at least once from the first position 1303a into the second position 1303b in the time interval between a movement of the selection flap 1012k from the second position 1301a into the first position 1301b and a subsequent movement of the selection flap 1012k from the first position 1301b to the second position 1301a.

Example 30 is a compactor arrangement 202 having: a compactor 102; an empty-container transport device 202t for transporting empty containers 104 in the compactor arrangement 202 in a transport region 1000t above the empty-container transport device 202t; a feed channel 1300k for leading empty containers 104 from the empty-container transport device 202t to the compactor 102; a selection device 202s, which is configured to lead empty containers 104 (which are to be compacted) out of the transport region 1000t through an opening 1300o into the feed channel 1300k in a first time interval and to lead empty containers 104 (which are not to be compacted) in the transport region 1000t through the compactor assembly 202 in a second time interval; an anti-manipulation guard device 1302 having an anti-manipulation guard flap 1302k, which is pivotably mounted and which covers the opening 1300o in a rest position 1303a, and at least one sensor 1302s for detecting a deflection of the anti-manipulation guard flap 1302k out of the rest position 1303a; and at least one processor which is configured to, in the first time interval, verify the passage of empty containers 104 through the opening 1300o on the basis of a deflection of the anti-manipulation guard flap 1302k detected by means of the at least one sensor 1302s.

In example 31, the compactor arrangement 202 as per example 30 may furthermore comprise that the anti-manipulation guard flap 1302k is mounted in substantially vertically freely hanging fashion. Here, the anti-manipulation guard flap 1302k may be balanced by its own mass.

In example 32, the compactor arrangement 202 as per example 30 or 31 may furthermore comprise that the anti-manipulation guard flap 1302k has or is composed of a plastic, preferably polycarbonate.

In example 33, the compactor arrangement 202 as per any of examples 30 to 32 may furthermore comprise that the anti-manipulation guard flap 1302k is configured such that empty containers 104 are prevented from being led out of the feed channel 1300k into the transport region 10001.

Example 34 is a compactor means 300, having: multiple compactor arrangements 202 as per any of examples 21 to 34, wherein the compactor arrangements 202 are arranged relative to one another such that empty containers 104 can be transported along a transport path 306 through the compactor arrangements 202.

Example 35 is a method 1400 for operating a compactor arrangement 202, the method 1400 comprising: transporting empty containers 104 by means of the empty-container transport device 202t in a transport region 1000t; and opening a selection flap 1012k of a selection device 202s in order to lead empty containers 104 out of the transport region 1000t through an opening 1300o into a feed channel 1300k for the compaction of the empty containers 104; subsequently closing the selection flap 1012k; and furthermore ascertaining a passage of empty containers 104 through the opening 1300o into the feed channel 1300k in the time window between the opening and the subsequent closure of the selection flap 1012k, and, on the basis thereof, generating an item of verification information; and furthermore, operating the compactor arrangement 202 on the basis of the item of verification information.

In example 36, the method 1400 as per example 35 may furthermore comprise that the operation of the compactor arrangement 202 on the basis of the item of verification information furthermore comprises: sending a verification message if a passage of empty containers 104 through the opening 1300o into the feed channel 1300k is ascertained in the time window between the opening and the subsequent closure of the selection flap, and/or sending a manipulation message if no passage of empty containers 104 through the opening 1300o into the supply channel 1300k is ascertained in the time window between the opening and the subsequent closure of the selection flap.

In example 37, the method 1400 as per example 35 or 36 may furthermore comprise that the ascertainment of a passage of empty containers through the opening 1300o into the feed channel 1300k comprises: ascertaining a movement of an anti-manipulation guard flap 1302*k* which is mounted so as to be movable and which, in a rest position, covers the opening 1300*o*.

Example 38 is a compactor assembly 202 having: a compactor 102; a belt-link conveyor 1502 with one or more conveying assemblies 1502*d*, 1502*g*, wherein the respective conveying assembly 1502*d* or 1502*g* has: at least two diverting rollers 1504 which are arranged at a distance from one another; a transport belt 1506 which is mounted in endlessly circulating fashion by means of the at least two diverting rollers 1504; wherein the transport belt 1506 has a multiplicity of belt links 1506*g*, wherein in each case two mutually adjacent belt links of the multiplicity of belt links 1506*g* are mechanically connected to one another by means of in each case one connecting element 1506*v*.

In example 39, the compactor arrangement 202 as per example 38 may furthermore comprise that the respective conveying assembly 1502*d* or 1502*g* furthermore has: two lateral guide rails 1510*a*, 1510*b*, which are configured such that the connecting elements 1506*v* are guided at least in certain sections by means of the two guide rails 1510*a*, 1510*b*.

In example 40, the compactor arrangement 202 as per example 39 may furthermore comprise that each of the two guide rails 1510*a*, 1510*b* has a cutout (which is for example arranged along certain sections or the entirety of an endlessly encircling path) into which the connecting elements in each case engage in certain sections for the positively locking guidance of the connecting elements.

In example 41, the compactor arrangement 202 as per example 39 or 40 may furthermore comprise that the respective conveying assembly 1502*d* or 1502*g* furthermore has: a cover 1512 which is arranged between the two guide rails 1510*a*, 1510*b* between the load strand and the return strand in order to cover the return strand on the upper side.

In example 42, the compactor arrangement 202 as per example 41 may furthermore comprise that the cover 1512 is configured such that the transport belt 1506 is supported in sliding fashion on the cover 1512.

In example 43, the compactor arrangement 202 as per any of examples 38 to 42 may furthermore comprise that a first conveying assembly 1502*d* and a second conveying assembly 1502*g* of the multiple conveying assemblies 1502*d*, 1502*g* each provide a transport surface for transporting empty containers 104 on the two transport surfaces.

In example 44, the compactor arrangement 202 as per example 43 may furthermore comprise that the first conveying assembly 1502*d* and the second conveying assembly 1502*g* are arranged relative to one another such that the two transport surfaces are oriented at an angle with respect to one another, preferably in a V shape.

In example 45, the compactor assembly 202 as per example 43 or 44 may furthermore comprise that the first conveying assembly 1502*d* has a multiplicity of belt links of a first belt link type 1506*g*-1 and wherein the second conveying assembly 1502*g* has a multiplicity of belt links of a second belt link type 1506*g*-2 which differs from the first belt link type 1506*g*-1.

In example 46, the compactor arrangement 202 as per example 45 may furthermore comprise that the first conveying assembly 1502*d* faces toward the compactor 102 and the second conveying assembly 1502*g* is averted from the compactor 102, and that the belt links of the first belt link type 1506*g*-1 have an outwardly exposed first belt link surface and wherein the belt links of the second belt link type 1506*g*-2 have an outwardly exposed second belt link surface, wherein the first belt link surface is configured so as to have a lower coefficient of friction than the second belt link surface.

In example 47, the compactor arrangement 202 as per example 46 may furthermore comprise that the belt links of the second belt link type 1506*g*-2 have an adhesion structure, wherein the adhesion structure forms the second belt link surface.

In example 48, the compactor arrangement 202 as per example 47 may furthermore comprise that the adhesion structure has a polymer, preferably an elastomer.

In example 49, the compactor arrangement 202 as per any of examples 38 to 48 may furthermore comprise that each of the belt links 1506*g* has two connecting structures 1506*s*, which are formed at mutually opposite end sections of the belt link 1506*g*, for connecting in each case two mutually adjacent belt links 1506*g* to form the transport belt 1506.

In example 50, the compactor arrangement 202 as per example 49 may furthermore comprise that the connecting structures 1506*s* are configured such that in each case one connecting structure 1506*s* of two mutually adjacent belt links 1506*g* can be connected to one another at least in positively locking fashion by means of the connecting element.

In example 51, the compactor arrangement 202 as per any of examples 38 to 50 may furthermore comprise that the respective conveying assembly 1502*d* or 1502*g* furthermore has: a drive device for separately driving the transport belt 1506 of the respective conveying assembly 1502*d*, 1502*g*.

In example 52, the compactor arrangement 202 as per any of examples 38 to 50 may furthermore comprise that the respective conveying assembly 1502*d* or 1502*g* furthermore has: a drive device for jointly driving multiple transport belts 1506 of multiple conveying assemblies 1502*d*, 1502*g*.

In example 53, the compactor arrangement 202 as per example 52 may furthermore comprise that at least one of the at least two diverting rollers 1504 has a toothing structure 1504*z*, into which the transport belt 1506 can engage in certain portions for the drive of the transport belt 1506. Here, the drive device may be configured so as to drive the at least one of the at least two diverting rollers 1504.

In example 54, the compactor arrangement 202 as per example 53 may furthermore comprise that the connecting elements 1506*v* and/or the belt links 1506*g* of the transport belt 1506 and the toothing structure 1504*z* are configured such that the connecting elements 1506*v* and/or the belt links 1506*g* can engage into the toothing structure for the drive of the transport belt 1506.

In example 55, the compactor arrangement 202 as per any of examples 38 to 54 may furthermore comprise that the respective width of the at least two diverting rollers 1504 is smaller than the width of the transport belt 1506.

In example 56, the compactor arrangement 202 as per any of examples 38 to 55 may furthermore comprise that the respective conveying assembly 1502*d* or 1502*g* is of modular configuration and has two diverting modules 1502*g*-1 and at least one linear track module 1502*g*-2, wherein in each case at least one of the at least two diverting rollers 1504 is arranged in each of the two diverting modules 1502*g*-1 and wherein the at least one track module 1502*g*-2 is arranged between the two diverting modules 1502*g*-1.

In example 57, the compactor arrangement 202 as per any of examples 38 to 56 may furthermore comprise that one of the two diverting modules 1502*g*-1 is designed as a drive module 1502*g*-*a* for the drive of the transport belt 1506.

Example 58 is a compactor arrangement 202 having: a compactor 102; a support framework 204*a* for supporting the compactor 102; an empty-container transport device 202t for transporting empty containers 104 in a transport region 1000t of the compactor arrangement 202; an assembly arrangement 1606 which is arranged above the compactor 102 and/or above the empty-container transport device 202t and which has a first cover structure 1604 and a second cover structure 1608, wherein the assembly arrangement 1606 is mounted so as to be movable (e.g. on the support framework 204a) between a first position 1600a (clearly an operating position) and a second position 1600b (clearly an assembly position), and wherein the assembly arrangement 1606 is configured such that, in the second position 1600b, the first cover structure 1604 covers the transport region 1000t on a first side and the second cover structure 1608 covers the transport region 1000t on a second side which is situated opposite the first side; and that, in the first position 1600a, the first cover structure 1604 covers the transport region 1000t on the second side. Here, the second side of the transport region 1000t may face toward the compactor 102.

In example 59, the compactor arrangement 202 as per example 58 may furthermore comprise that the assembly arrangement 1606 has a selection device 202s, which is configured to, in the first position 1600a, selectively feed empty containers 104 from the transport region 1000t to the compactor 102.

In example 60, the compactor arrangement 202 as per example 58 may furthermore comprise that the assembly arrangement 1606 has a function module arrangement 1102 which has a module receptacle 1104 and, selectively, a selection module 1106s or guard module 1106n received in the module receptacle 1104.

In example 61, the compactor arrangement 202 as per any of examples 58 to 60 may furthermore comprise that the second cover structure 1608 is pivotably mounted such that the second cover structure 1608 is in a first (e.g. horizontal) position when the assembly arrangement 1606 is in the first position 1600a, and such that the second cover structure 1608 is in a second (e.g. vertical) position when the assembly arrangement 1606 is in the second position 1600b.

Example 62 is a method for operating a compactor arrangement 202, the method comprising: transporting empty containers 104 in a transport region 1000t of the compactor arrangement 202 by means of an empty-container transport device 202t; optionally operating the compactor arrangement 202 in an operating mode or in an installation mode (clearly in two mutually different operating modes), wherein an assembly arrangement 1606 of the compactor arrangement 202 is, in the operating mode, arranged in a first position above the empty-container transport device 202t and empty containers 104 are fed selectively to a compactor 102 of the compactor arrangement 202 by means of a selection device 202s of the assembly arrangement 1606, and wherein the assembly arrangement 1606 is, in the installation mode, brought (e.g. moved) into a second position and the transport region 1000t is covered on both sides by means of two cover structures 1604, 1608 of the assembly arrangement 1606.

Example 63 is a method for operating a compactor arrangement 202, the method comprising: operating the compactor arrangement 202 in an operating mode, comprising: transporting empty containers 104 by means of the empty-container transport device 202t in a transport region 1000t, and selectively leading the empty containers 104 by means of a selection device 202s, which is part of a movably mounted assembly arrangement, out of the transport region 1000t and through a feed region 1000d to a compactor 102 of the compactor arrangement 202; and, previously and/or subsequently, operating the compactor arrangement 202 in a second operating mode, comprising: transporting empty containers 104 by means of the empty-container transport device 202t in the transport region 1000t through the compactor arrangement 202, and safeguarding the feed region 1000d against an encroachment from the direction of the transport region 1000t by means of at least one cover structure 1608, which is part of the movably mounted assembly arrangement.

In example 64, the method as per example 63 may furthermore comprise: switching from the first operating mode to the second operating mode, the switching comprising: displacing the assembly arrangement 1606 such that a first cover structure 1604 of the assembly arrangement 1606 covers the transport region 1000t on a first side, and pivoting a second cover structure 1608 of the assembly arrangement 1606 into a position in which the second cover structure 1608 covers the transport region 1000t on a second side which is situated opposite the first side. Here, the second side of the transport region 1000t may face toward the compactor 102.

The invention claimed is:

1. A compactor arrangement comprising:
a compactor for compacting empty containers;
an empty-container transport device for transporting empty containers to a subsequent compactor arrangement through a transport region;
an anti-encroachment guard structure which laterally delimits the transport region and which is provided at least in part between the transport region and the compactor, wherein the anti-encroachment guard structure defines a feed region through which empty containers can be fed laterally out of the transport region to the compactor;
a guard device having a guard plate which is configured to move rectilinearly between a first position and a second position such that, selectively, an encroachment from a direction of the transport region into the feed region is prevented when the guard plate is in the first position; and
a selection device having a selection flap pivotally moveable between a first position and a second position such that empty containers are selectively led out of the transport region and through the feed region when the selection flap is in the first position of the selection flap and when said guard plate is the second position of the guard plate, wherein the anti-encroachment guard structure, the guard plate, and the selection flap positioned adjacent to one another.

2. The compactor arrangement as claimed in claim 1, wherein the selection device includes an actuating drive configured to move the selection flap between the first position of the selection flap and the second position of the selection flap, and is furthermore configured such that, when the selection flap is in the second position of the selection flap, empty containers are transported through the transport region past the compactor by the empty-container transport device.

3. The compactor arrangement of claim 1 further comprising:
a function module arrangement which is arranged above the empty-container transport device, wherein the function module arrangement has a module configured to receive multiple function modules, wherein the selection device is one of the multiple function modules, and wherein the guard device is one of the multiple function modules.

4. The compactor arrangement of claim 3 further comprising:
an upper cover an at least partially preventing encroachment into the transport region.

5. The compactor arrangement of claim 1 further comprising:
a framework arrangement, wherein said compactor is mounted on said framework arrangement and said empty-container transport device extends into said framework arrangement, and said transport region is defined within said framework arrangement, said framework arrangement also defining a receiving space for receiving compacted empty containers, said transport device extending above said receiving space; and
a function module arrangement mounted on said framework arrangement and including a module receptacle configured to receive a plurality of modules, wherein one of said selection device and said guard device is one of said plurality of modules.

6. The compactor arrangement of claim 5 further comprising:
an upper cover mounted on said framework arrangement and configured selectively cover said plurality of modules and at least part of said transport region.

7. The compactor arrangement of claim 6 further comprising:
a lower cover mounted on said framework arrangement and configured selectively cover said receiving space, said lower cover and said upper cover adjacent to one another on said framework arrangement.

8. The compactor arrangement of claim 7 wherein said lower cover includes a plurality of cover plates connected together with hinge arrangements and foldable relative to one another through said hinge arrangements.

9. The compactor arrangement of claim 5 wherein said plurality of modules connected to said module receptacle further comprises a display module having a display configured to display a status of said compactor arrangement.

10. The compactor arrangement of claim 5 wherein said plurality of modules connected to said module receptacle further comprises a sensor module positioned at an outer edge of the module receptacle and having a sensor configured to detect a passage of an empty container.

11. The compactor arrangement of claim 5 wherein said plurality of modules connected to said module receptacle further comprises an encoder module which includes data defining a class of empty containers to be selected by said selection device, said encoder module and said selection device positioned adjacent to one another on said module receptacle.

12. The compactor arrangement of claim 5 further comprising:
a collecting vessel positioned in said receiving space, wherein encoder module further comprises a visual display configured to state display a fill level of said collecting vessel.

13. The compactor arrangement of claim 1 wherein said anti-encroachment guard structure is further defined as a display configured to state display a fill level of said compactor arrangement.

14. The compactor arrangement of claim 1 wherein said empty-container transport device further comprises:
a first conveying assembly having a plurality of belt links of a first belt link type, said first belt link type having an outwardly exposed first belt link surface, said first belt link surface having a first coefficient of friction; and
a second conveying assembly arranged relative to said first conveying assembly at an angle in a V shape, said second conveying assembly having a plurality of belt links of a second belt link type, said second belt link type having an outwardly exposed second belt link surface, said second belt link surface having a second coefficient of friction greater than said first coefficient of friction.

15. The compactor arrangement of claim 14 wherein said first belt link surface faces toward said compactor and said second belt link surface is averted from said compactor.

16. The compactor arrangement of claim 5 further comprising:
an assembly arrangement installed displaceably on said support framework above the compactor and above the empty-container transport device, said assembly arrangement moveable between an operating position and an installation position, said installation position further from said support framework than said operating position, wherein said anti-encroachment guard structure mounted on said assembly arrangement;
a cover structure pivotally mounted on said assembly arrangement and arranged at a distance from said anti-encroachment guard structure; and
wherein, when said assembly arrangement is in said operating position, said cover structure is pivoted upward so as not to impede access from said transport region into said compactor and, when said assembly arrangement is in said installation position, automatically pivots downward and laterally delimits said transport region, said cover structure and said anti-encroachment guard structure are arranged on opposite sides of said transport region when said assembly arrangement is in said installation position.

17. A method for operating a compactor arrangement comprising a compactor for compacting empty containers; an empty-container transport device for transporting empty containers to a subsequent compactor arrangement through a transport region; an anti-encroachment guard structure which laterally delimits the transport region and which is provided at least in part between the transport region and the compactor, wherein the first anti-encroachment guard structure defines a feed region through which empty containers can be fed laterally out of the transport region to the compactor; a guard device having a guard plate which is configured to move rectilinearly between a first position and a second position such that, selectively, an encroachment from a direction of the transport region into the feed region is prevented when the guard plate is in the first position;
and a selection device having a selection flap pivotally moveable between a first position and a second position such that empty containers are selectively led out of the transport region and through the feed region when the selection flap is in the first position of the selection flap and when said guard plate is the second position of the guard plate, wherein the anti-encroachment guard structure, the guard plate, and the selection flap positioned adjacent to one another, the method comprising:
operating the compactor arrangement in a first operating mode, comprising:
transporting empty containers with the empty-container transport device through the transport region, and
selectively leading the empty containers with the selection device out of the transport region and through the feed region to the compactor of the compactor arrangement; and operating the compactor arrangement in a second operating mode comprising:
   transporting empty containers by means of the empty-container transport device in the transport region through the compactor arrangement, and
   safeguarding the feed region against an encroachment from the transport region with the guard plate.

18. The method as claimed in claim 17, furthermore comprising:
   switching from the first operating mode to the second operating mode, comprising:
      uninstalling the selection device, and
      installing the guard device such that the guard device covers the feed region;
   switching from the second operating mode to the first operating mode, comprising:
      uninstalling the guard device, and
      installing the selection device.

19. The method as claimed in claim 17, furthermore comprising:
   switching from the first operating mode to the second operating mode, comprising: displacing the guard device such that this guard device covers the feed region; and
   switching from the second operating mode to the first operating mode, comprising: displacing the guard device such that the feed region is opened up.

20. The method as claimed in claim 17;
   wherein said operating the compactor arrangement in the first operating mode further comprises: operating the compactor to compact the empty containers which are fed to the compactor through the feed region by the selection device; and
   wherein said operating the compactor arrangement in the second operating mode further comprises: deactivating the compactor.

\* \* \* \* \*